(12) United States Patent
Yano

(10) Patent No.: US 8,459,722 B2
(45) Date of Patent: Jun. 11, 2013

(54) DOUBLE-OPENING DOOR DEVICE FOR VEHICLES

(76) Inventor: Takashi Yano, Tokyo (JP)

( * ) Notice: Subject to any disclaimer, the term of this patent is extended or adjusted under 35 U.S.C. 154(b) by 93 days.

(21) Appl. No.: 13/063,204

(22) PCT Filed: Sep. 11, 2009

(86) PCT No.: PCT/JP2009/065965
§ 371 (c)(1),
(2), (4) Date: Jun. 29, 2011

(87) PCT Pub. No.: WO2010/030014
PCT Pub. Date: Mar. 18, 2010

(65) Prior Publication Data
US 2011/0260496 A1 Oct. 27, 2011

(30) Foreign Application Priority Data

Sep. 12, 2008 (JP) .................. 2008-234996

(51) Int. Cl.
*B60J 5/00* (2006.01)
(52) U.S. Cl.
USPC .................. 296/146.12; 296/146.1
(58) Field of Classification Search
USPC .......... 296/146.1, 146.4, 146.12, 146.13, 296/51; 49/502
See application file for complete search history.

(56) References Cited

U.S. PATENT DOCUMENTS

| 6,997,504 | B1 | 2/2006 | Lang et al. |
| 7,097,229 | B1 | 8/2006 | Chernoff |
| 7,393,044 | B2 | 7/2008 | Enormoto |
| 7,819,465 | B2 | 10/2010 | Elliott et al. |
| 7,896,425 | B2 | 3/2011 | Elliott et al. |
| 7,905,537 | B2 | 3/2011 | Sato et al. |
| 7,931,327 | B2 | 4/2011 | Ertl |

| 2008/0231074 | A1 | 9/2008 | Suzuki et al. |
| 2010/0171336 | A1 | 7/2010 | Elliott et al. |
| 2010/0253113 | A1 | 10/2010 | Blasé |

FOREIGN PATENT DOCUMENTS

| JP | 31-8112 | 5/1956 |
| JP | 57-95215 | 6/1982 |
| JP | 58-101980 | 6/1983 |
| JP | 58-191881 | 11/1983 |
| JP | 60-61365 | 4/1985 |
| JP | 61-012071 | 4/1986 |
| JP | 63-284383 | 11/1988 |
| JP | 02-81210 | 6/1990 |
| JP | HEI 2-101983 | 8/1990 |
| JP | 02-283525 | 11/1990 |
| JP | 05-85176 | 4/1993 |
| JP | 11-301273 | 4/1993 |
| JP | 05-112129 | 5/1993 |
| JP | 09-132034 | 5/1997 |
| JP | 2004-100309 | 4/2004 |
| JP | 2007-253784 | 10/2007 |
| JP | 2007-324266 | 12/2007 |
| JP | 2008-174224 | 7/2008 |
| WO | 2005/111352 | 11/2005 |

*Primary Examiner* — Lori Lyjak
(74) *Attorney, Agent, or Firm* — Clark & Brody

(57) ABSTRACT

A long door, particularly for a four-passenger cope vehicle, is provided to allow passengers in the back seat to get in or out while the passengers in the front seat remain seated. An intermediate member stands between a door and a car body. A first connection member in which the door and the intermediate member are connected to enable rotational or horizontal motion, and a second connection member in which the intermediate member and the car body are detachably connected are provided. A control drives the second connection member located at the front or back end of the door when the front or back part of the door is opened, so that the connection between the intermediate member and the car body is released and the remaining second connection member, the intermediate member connected to that member, and the first connection member cooperate to support the weight of the door.

11 Claims, 38 Drawing Sheets

FIG. 1

| Entry/exit scenario (4 occupants are seated) | | Door type | | |
|---|---|---|---|---|
| | | Conventional 2-door | Double-opening door of prior application | Double-opening door of the present invention |
| A | Entry and exit of front-seat occupants while rear-seat occupants are seated | •Rear part of the door is opened | •Front part of the door is opened | |
| B | Entry and exit of rear-seat occupants while front-seat occupants are seated | | | •Rear part of the door is opened |
| C | Exit of front-seat occupants followed by exit of rear-seat occupants | •Rear part of the door is opened (1)Front-seat occupants exit (2)Front seats are slid forward (3)Rear-seat occupants exit | | •Front part of the door is opened (1)Front-seat occupants exit (2)Front seats are slid forward (3)Rear-seat occupants exit |
| D | Entry of rear-seat occupants followed by entry of front-seat occupants | •Rear part of the door is opened (1)Front seats are slid forward (2)Rear-seat occupants enter (3)Put front seats back to original positions (4) Front-seat occupants enter | | •Front part of the door is opened (1)Front seats are slid forward (2)Rear-seat occupants enter (3) Put front seats back to original positions (4)Front-seat occupants enter |
| E | Exit of rear-seat occupants followed by exit of front-seat occupants | | | •Rear part of the door is opened (1)Rear-seat occupants exit (2)Front seats are slid rearward (3)Front-seat occupants exit |
| F | Entry of front-seat occupants followed by entry of rear-seat occupants | | | •Rear part of the door is opened (1)Front seats are slid rearward (2)Front-seat occupants enter (3)Put front seats back to original positions (4)Rear-seat occupants enter |

FIG.2
(a)
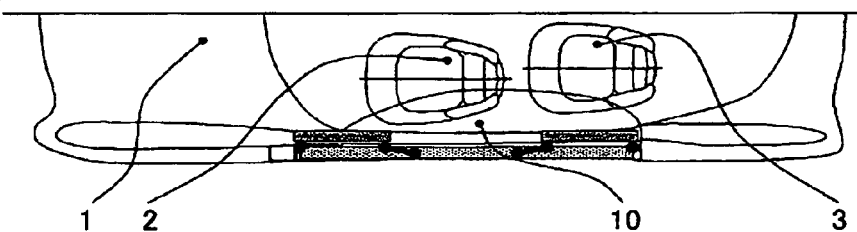
(b)
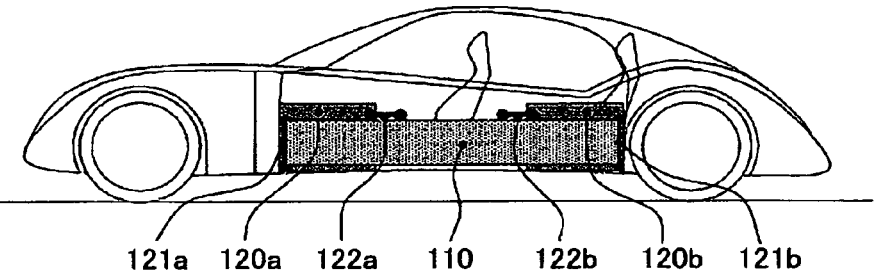
(c)
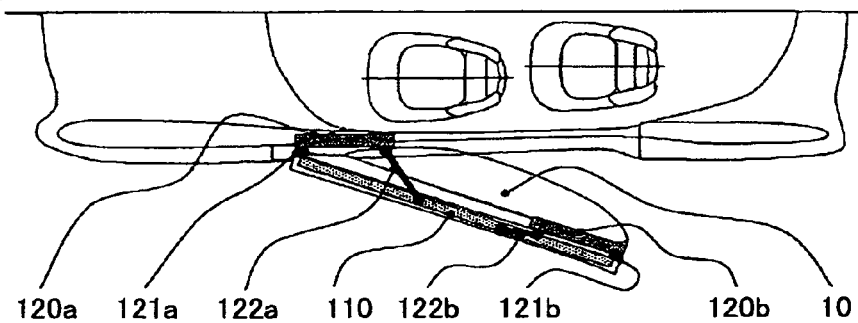
(d)
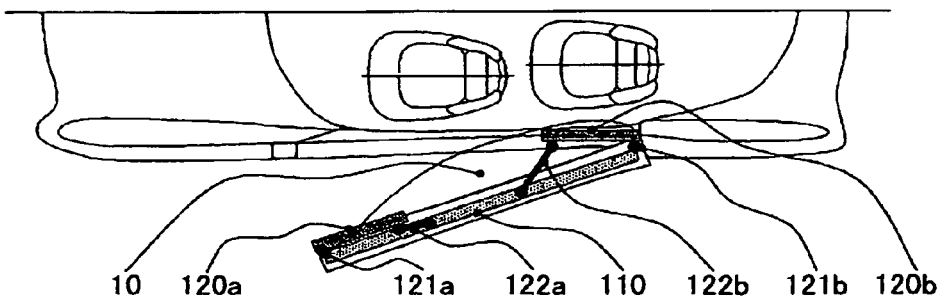

FIG.5
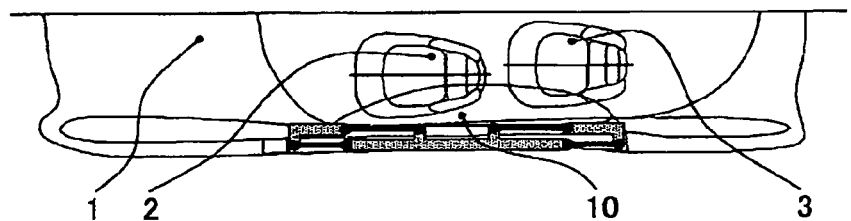
(a)
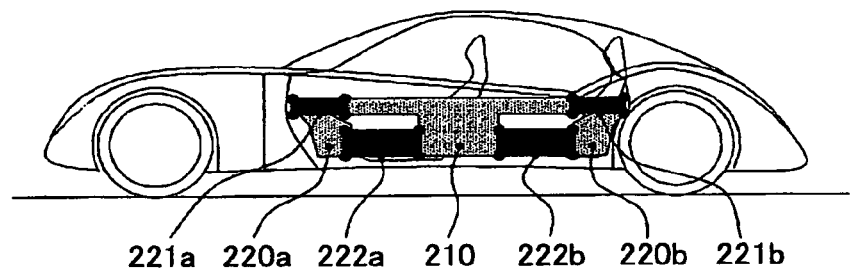
(b)
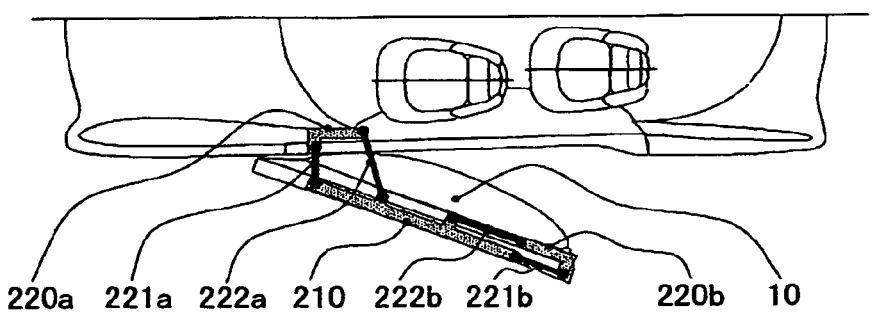
(c)
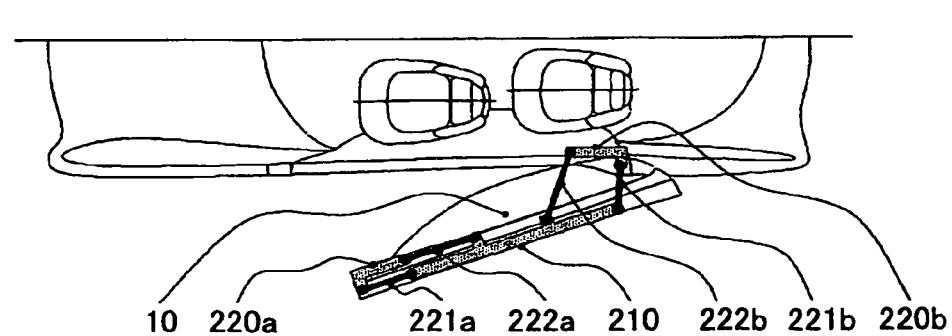
(d)

FIG.6
(a)
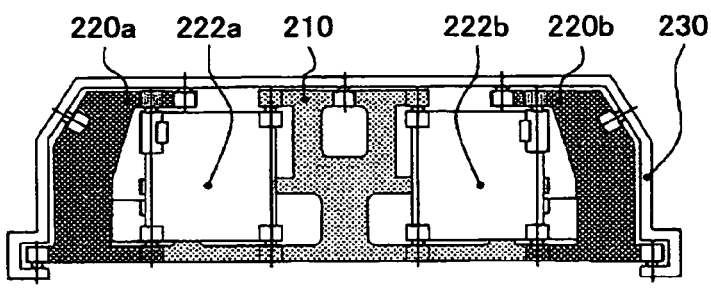
(b)
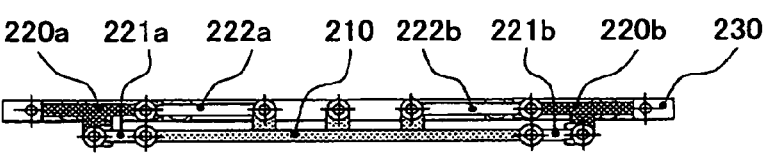
(c)
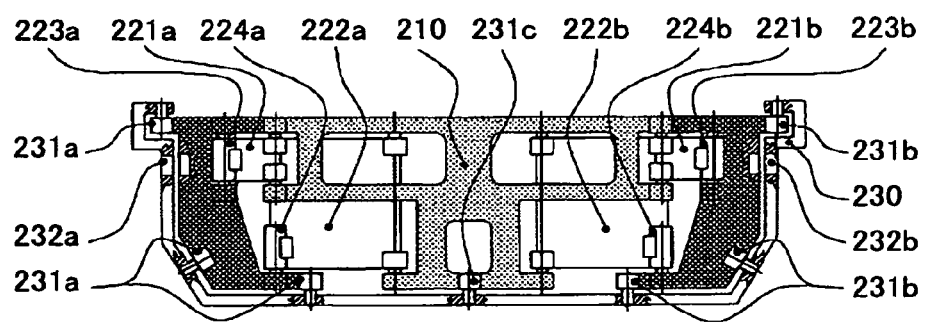
(d)
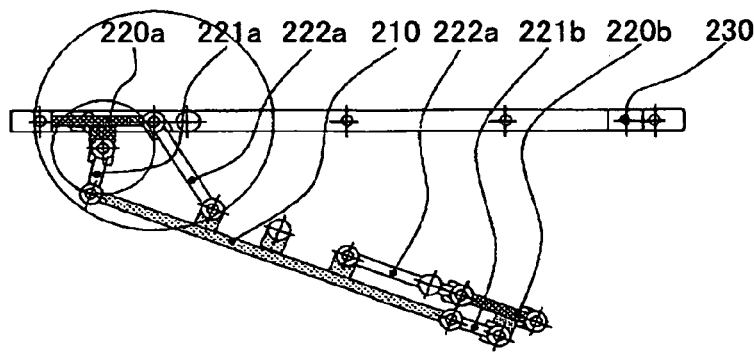

FIG.15

| Type (DOOR TYPE) | | | Model | EMBODIMENT | FIG. NO. | |
|---|---|---|---|---|---|---|
| LONG DOUBLE-OPENING DOOR (SYMMETRICAL DOUBLE OPENING) BASED ON INTERMEDIATE MEMBERS | | | | | | |
| | Single Hinge (SINGLE HINGE MECHANISM) | | 121 | 1 | | |
| | MultiLink (MULTI-JOINT LINK MECHANISM) | | 122 | 2,3,4 | | |
| | Slide (SLIDE MECHANISM) | | 123 | 5,6,7 | | |
| | Swing (HALF-OPEN SWING MECHANISM) | | 124 | 8 | | |
| | | ShortLink (SHORT LINK MECHANISM) | 1241 | | | |
| | | | Flat | 1241a | 19 | 28,29 |
| | | | Roll | 1241b | | |
| | | | NegativeRoll | 1241c | | |
| | Fullswing (FULLY-OPEN SWING MECHANISM) | | 131 | | | |
| | | LongLink (LONG LINK MECHANISM) | 1311 | 9 | | |
| | | | Flat | 1311a | 20 | |
| | | | Roll | 1311b | | 30,31 |
| | | | NegativeRoll | 1311c | | |
| | | DoubleLink A (DOUBLE LINK MECHANISM A) | 1312 | 10 | | |
| | | | Flat | 1312a | 21 | 32,33 |
| | | | Roll | 1312b | | |
| | | | NegativeRoll | 1312c | | |
| | | DoubleLink B (DOUBLE LINK MECHANISM B) | 1313 | 11 | | |
| | | | Flat | | 22 | |
| | | | Roll | 1313b | | 34,35 |
| | | | NegativeRoll | | | |
| | X2-Swing (TWO-STAGE SWING MECHANISM) | | 141 | | | |
| | | LongLink (LONG LINK MECHANISM) | 1411 | 12 | | |
| | | | Flat&Flat | 1411a | 23 | |
| | | | Flat&Roll | 1411b | | |
| | | | Roll&Flat | 1411c | | 30,31 |
| | | | Flat&NegativeRoll | 1411d | | |
| | | | NegativeRoll&Flat | 1411e | | |
| | | DoubleLink A (DOUBLE LINK MECHANISM A) | 1412 | 13 | | |
| | | | Flat&Flat | 1412a | 24 | 32,33 |
| | | | Flat&Roll | 1412b | | |
| | | | Roll&Flat | 1412c | | |
| | | | Flat&NegativeRoll | 1412d | | |
| | | | NegativeRoll&Flat | 1412e | | |
| | | DoubleLink B (DOUBLE LINK MECHANISM B) | 1413 | 14 | | |
| | | | Flat&Flat | | | |
| | | | Flat&Roll | 1413b | | 25 | 34,35 |
| | | | Roll&Flat | 1413c | | |
| | | | Flat&NegativeRoll | | | |
| | | | NegativeRoll&Flat | | | |

FIG.16

| Type (DOOR TYPE) | | Model | EMBODIMENT | FIG. NO. | | |
|---|---|---|---|---|---|---|
| Device1 | Device2 | | | | | |
| LONG DOUBLE-OPENING DOOR (ASYMMETRICAL DOUBLE OPENING) BASED ON INTERMEDIATE MEMBERS | | | | | | |
| XA-Swing (ASYMMETRICAL OPENING SWING MECHANISM) | | 131+124 | | | | |
| LongLink (LONG LINK MECHANISM) | ShortLink (SHORT LINK MECHANISM) | 1311+1241 | 15 | | | |
| Flat | Flat | 1311a+1241a | | 26 | | |
| | Roll | 1311a+1241b | | | | |
| | NegativeRoll | 1311a+1241c | | | | |
| Roll | Flat | 1311b+1241a | | | | |
| | Roll | 1311b+1241b | | 26 | 28,29 | 30,31 |
| | NegativeRoll | 1311b+1241c | | | | |
| NegativeRoll | Flat | 1311c+1241a | | | | |
| | Roll | 1311c+1241b | | | | |
| | NegativeRoll | 1311c+1241c | | | | |
| DoubleLink A (DOUBLE LINK MECHANISM) | ShortLink (SHORT LINK MECHANISM) | 1312+1241 | 16 | | | |
| Flat | Flat | 1312a+1241a | | 26 | 28,29 | 32,33 |
| | Roll | 1312a+1241b | | | | |
| | NegativeRoll | 1312a+1241c | | | | |
| Roll | Flat | 1312b+1241a | | | | |
| | Roll | 1312b+1241b | | 26 | | |
| | NegativeRoll | 1312b+1241c | | | | |
| NegativeRoll | Flat | 1312c+1241a | | | | |
| | Roll | 1312c+1241b | | | | |
| | NegativeRoll | 1312c+1241c | | | | |
| DoubleLink B (DOUBLE LINK MECHANISM) | ShortLink (SHORT LINK MECHANISM) | 1313+1241 | 17 | | | |
| Flat | Flat | | | | | |
| | Roll | | | | | |
| | NegativeRoll | | | | | |
| Roll | Flat | 1313b+1241a | | | | |
| | Roll | 1313b+1241b | | 26 | 28,29 | 34,35 |
| | NegativeRoll | 1313b+1241c | | | | |
| NegativeRoll | Flat | | | | | |
| | Roll | | | | | |
| | NegativeRoll | | | | | |

FIG.17

| Type (DOOR TYPE) | | | Model | EMBODIMENT | FIG. NO. | | |
|---|---|---|---|---|---|---|---|
| | Device1 | Device2 | | | | | |
| LONG DOUBLE-OPENING DOOR (ASYMMETRICAL ONE-WAY TWO-STAGE DOUBLE OPENING) BASED ON INTERMEDIATE MEMBERS | | | | | | | |
| XA2-Swing (Asymmetrical one-way two-stage swing link mechanism) | | | 141+124 | | | | |
| | LongLink (LONG LINK MECHANISM) | ShortLink (SHORT LINK MECHANISM) | 1411+1241 | 18 | | | |
| | | Flat&Flat Flat | 1411a+1241a | | | | |
| | | Roll | 1411a+1241b | | | | |
| | | NegativeRoll | 1411a+1241c | | | | |
| | | Flat&Roll Flat | 1411b+1241a | | | | |
| | | Roll | 1411b+1241b | | | | |
| | | NegativeRoll | 1411b+1241c | | | | |
| | | Roll&Flat Flat | 1411c+1241a | | | | |
| | | Roll | 1411c+1241b | | 27 | 28,29 | 30,31 |
| | | NegativeRoll | 1411c+1241c | | | | |
| | | Flat&NegativeRoll Flat | 1411d+1241a | | | | |
| | | Roll | 1411d+1241b | | | | |
| | | NegativeRoll | 1411d+1241c | | | | |
| | | Negative&Roll&Flat Flat | 1411e+1241a | | | | |
| | | Roll | 1411e+1241b | | | | |
| | | NegativeRoll | 1411e+1241c | | | | |
| | DoubleLink A (DOUBLE LINK MECHANISM) | ShortLink (SHORT LINK MECHANISM) | 1412+1241 | 19 | | | |
| | | Flat&Flat Flat | 1412a+1241a | | 27 | 28,29 | 32,33 |
| | | Roll | 1412a+1241b | | | | |
| | | NegativeRoll | 1412a+1241c | | | | |
| | | Flat&Roll Flat | 1412b+1241a | | | | |
| | | Roll | 1412b+1241b | | | | |
| | | NegativeRoll | 1412b+1241c | | | | |
| | | Roll&Flat Flat | 1412c+1241a | | | | |
| | | Roll | 1412c+1241b | | | | |
| | | NegativeRoll | 1412c+1241c | | | | |
| | | Flat&NegativeRoll Flat | 1412d+1241a | | | | |
| | | Roll | 1412d+1241b | | | | |
| | | NegativeRoll | 1412d+1241c | | | | |
| | | Negative&Roll&Flat Flat | 1412e+1241a | | | | |
| | | Roll | 1412e+1241b | | | | |
| | | NegativeRoll | 1412e+1241c | | | | |
| | DoubleLink B (DOUBLE LINK MECHANISM) | ShortLink (SHORT LINK MECHANISM) | 1413+1241 | 20 | | | |
| | | Flat&Flat Flat | | | | | |
| | | Roll | | | | | |
| | | NegativeRoll | | | | | |
| | | Flat&Roll Flat | 1413b+1241a | | 27 | 28,29 | 34,35 |
| | | Roll | 1413b+1241b | | | | |
| | | NegativeRoll | 1413b+1241c | | | | |
| | | Roll&Flat Flat | 1413c+1241a | | | | |
| | | Roll | 1413c+1241b | | 27 | | |
| | | NegativeRoll | 1413c+1241c | | | | |
| | | Flat&NegativeRoll Flat | | | | | |
| | | Roll | | | | | |
| | | NegativeRoll | | | | | |
| | | Negative&Roll&Flat Flat | | | | | |
| | | Roll | | | | | |
| | | NegativeRoll | | | | | |

FIG.18

| Entry/exit scenario (4 occupants are seated) | Door type Long double-opening door based on intermediate members | | | | |
|---|---|---|---|---|---|
| | Model 124 Swing mech. 8th embodiment | Model 131 Fully-open swing mech. 9th to 11th embodiments | Model 141 2-stage swing mech. 12th to 14th embodiments | Model 131+124 Symmetrical opening swing mech. 15th to 17th embodiments | Model 141+124 Asymmetrical 1-way 2-agage swing mech. 18th to 20th embodiments |
| A. Exit and entry of front-seat occupants while rear-seat occupants are seated | •Front part of the door is opened (1st state) | •Front part of the door is opened (2nd state) | •Front part of the door is opened (1st state) | •Front part of the door is opened (1st state) | •Front part of the door is opened (1st state) |
| B. Exit and entry of rear-seat occupants while front-seat occupants are seated | •Rear part of the door is opened (1st state) | •Rear part of the door is opened (2nd state) | •Rear part of the door is opened (1st state) | •Rear part of the door is opened (2nd state) | •Rear part of the door is opened (1st state) |
| C. Exit of front-seat occupants followed by exit of rear-seat occupants | •Front part of the door is opened (1st state) (1)Front-seat occupants exit (2)Front seats are slid forward | •Front part of the door is opened (2nd state) (1)Front-seat occupants exit (2)Rear-seat occupants exit | •Front part of the door is opened (2nd state) (1)Front-seat occupants exit (2) Rear-seat occupants exit | •Rear part of the door is opened (2nd state) (1)Front-seat occupants exit (2) Rear-seat occupants exit | •Rear part of the door is opened (2nd state) (1)Front-seat occupants exit (2)Rear-seat occupants exit |
| D. Entry of rear-seat occupants followed by entry of front-seat occupants | •Front part of the door is opened (1st state) (1)Front-seats are slid forward (2)Rear-seat occupants enter (3)Put front seats back to original positions | •Front part of the door is opened (2nd state) (1)Rear-seat occupants enter (2)Front-seat occupants enter | •Front part of the door is opened (2nd state) (1)Rear-seat occupants enter (2)Front-seat occupants enter | •Rear part of the door is opened (2nd state) (1)Rear-seat occupants enter (2)Front-seat occupants enter | •Rear part of the door is opened (2nd state) (1)Rear-seat occupants enter (2)Front-seat occupants enter |
| E. Exit of rear-seat occupants followed by exit of front-seat occupants | •Rear part of the door is opened (1st state) (1)Rear-seat occupants exit (2)Front seats are slid | •Rear part of the door is opened (2nd state) (1)Rear-seat occupants exit (2)Front-seat | •Rear part of the door is opened (2nd state) (1)Rear-seat occupants exit (2)Front-seat | •Rear part of the door is opened (2nd state) (1)Rear-seat occupants exit (2)Front-seat | •Rear part of the door is opened (2nd state) (1)Rear-seat occupants exit (2)Front-seat occupants exit |
| F. Entry of front-seat occupants followed by entry of rear-seat occupants | •Rear part of the door is opened (1st state) (1)Front seats are slid rearward (2)Front-seat occupants enter (3)Put front seats back to original positions | •Rear part of the door is opened (2nd state) (1)Front-seat occupants enter (2)Rear-seat occupants enter | •Rear part of the door is opened (2nd state) (1)Front-seat occupants enter (2)Rear-seat occupants enter | •Rear part of the door is opened (2nd state) (1)Front-seat occupants enter (2)Rear-seat occupants enter | •Rear part of the door is opened (2nd state) (1)Front-seat occupants enter (2)Rear-seat occupants enter |
| Comments | 1st state: State of door that enables satisfactory entry of either of front-seat and rear-seat occupants<br>2nd state: State of door that enables satisfactory entry of both of front-seat and rear-seat occupants<br>Model 131+124: Exemplified taking the case where the state of opening the front part of the door corresponds to the 1st state, and the state of opening the rear part of the door corresponds to the 2nd state<br>Model 141+124: Exemplified taking the case where the state of opening the front part of the door corresponds to the 1st state, and the state of opening the rear part of the door corresponds to the 1st and the 2nd state | | | | |

FIG.24
(a) Model 1412a
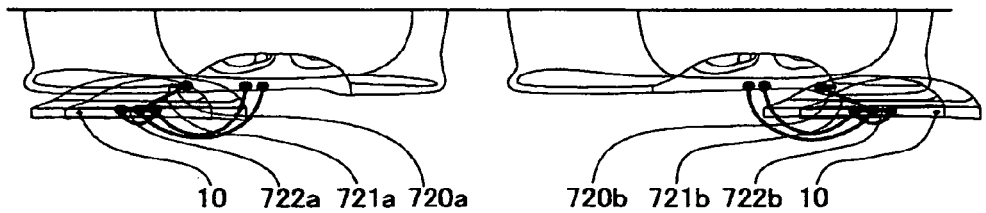
10  722a 721a 720a     720b 721b 722b 10
(b) Model 1412b
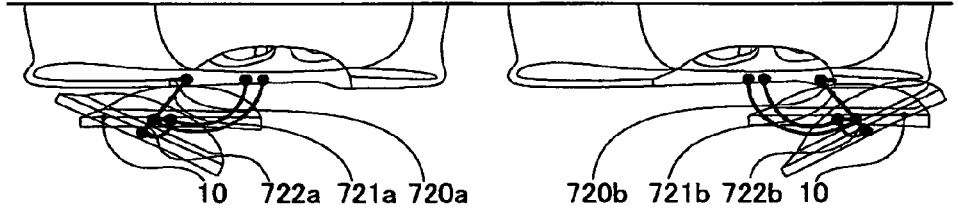
10  722a 721a 720a     720b 721b 722b 10
(c) Model 1412c
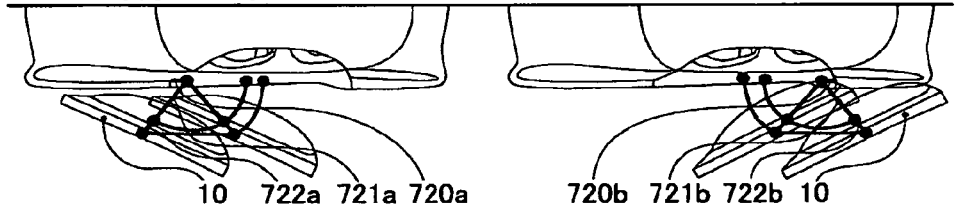
10  722a 721a 720a     720b 721b 722b 10
(d) Model 1412d
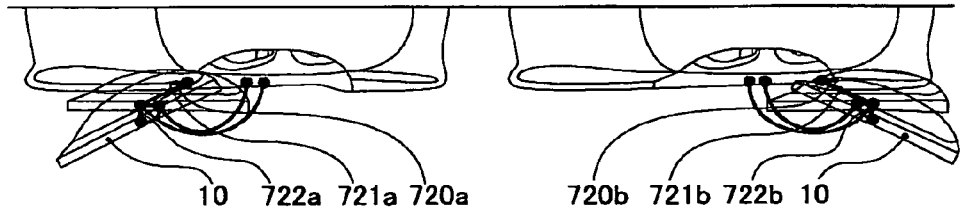
10  722a 721a 720a     720b 721b 722b 10
(e) Model 1412e
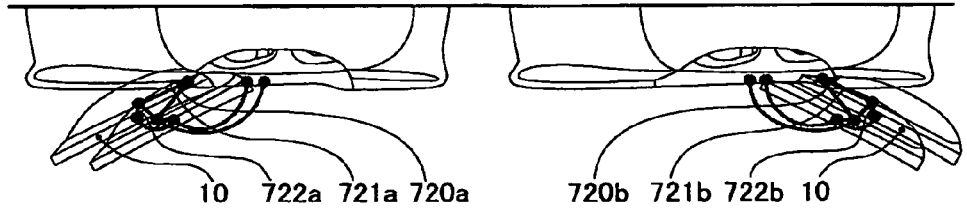
10  722a 721a 720a     720b 721b 722b 10

FIG.25
(a) Model 1413b
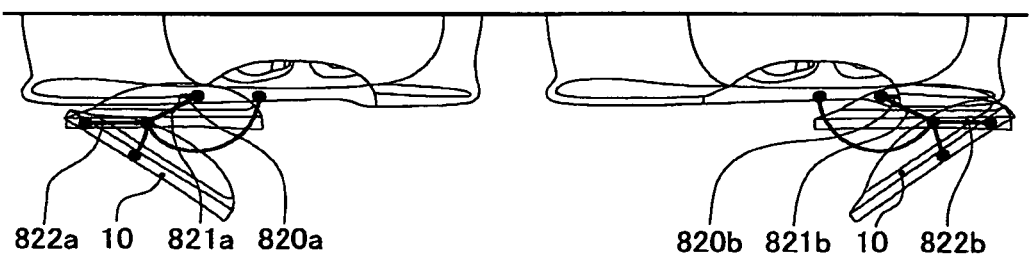
822a  10  821a  820a     820b  821b  10  822b
(b) Model 1413c
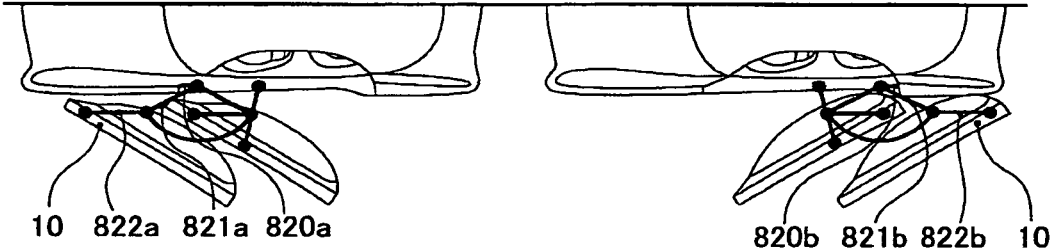
10  822a  821a  820a     820b  821b  822b  10

FIG.32
(a)
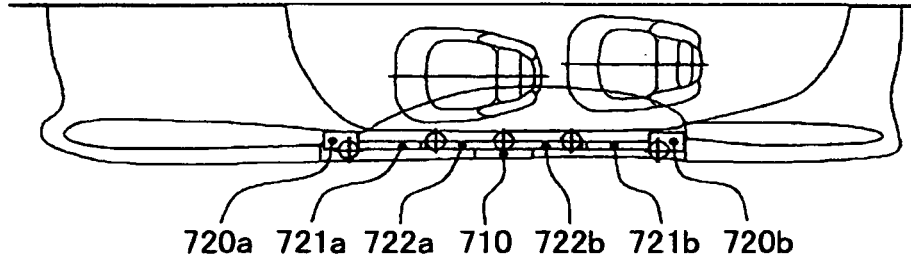
720a 721a 722a 710 722b 721b 720b
(b)
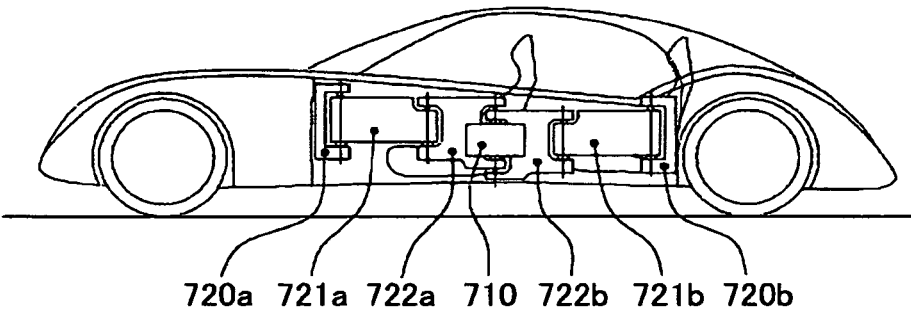
720a 721a 722a 710 722b 721b 720b
(c)
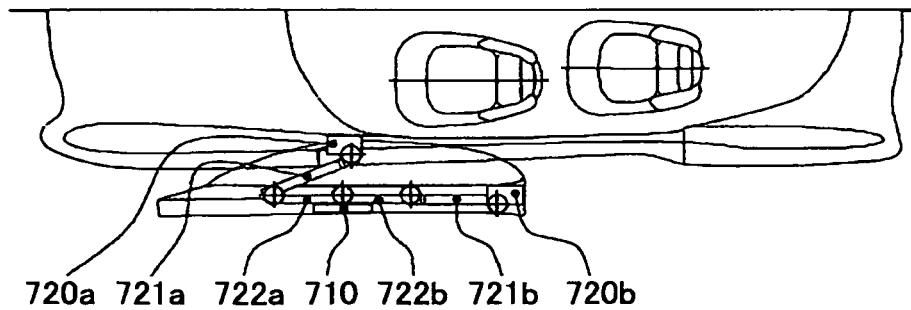
720a 721a 722a 710 722b 721b 720b
(d)
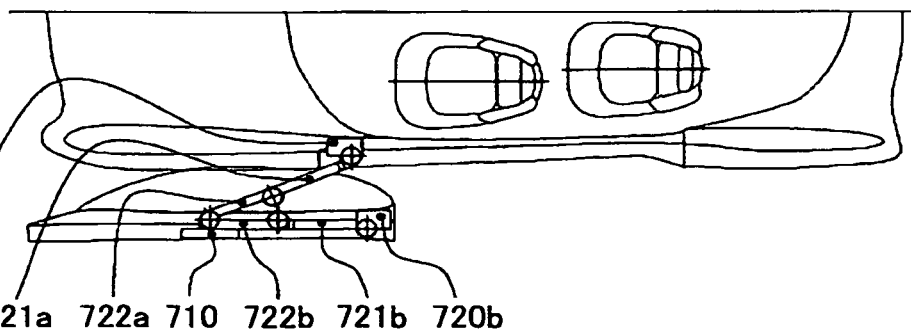
720a 721a 722a 710 722b 721b 720b

FIG.34
(a)
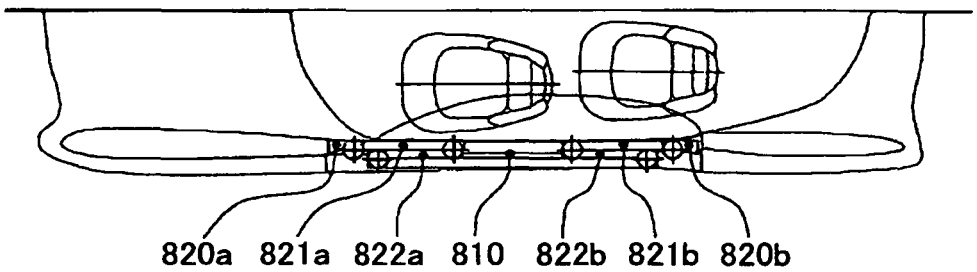
820a  821a  822a  810  822b  821b  820b
(b)
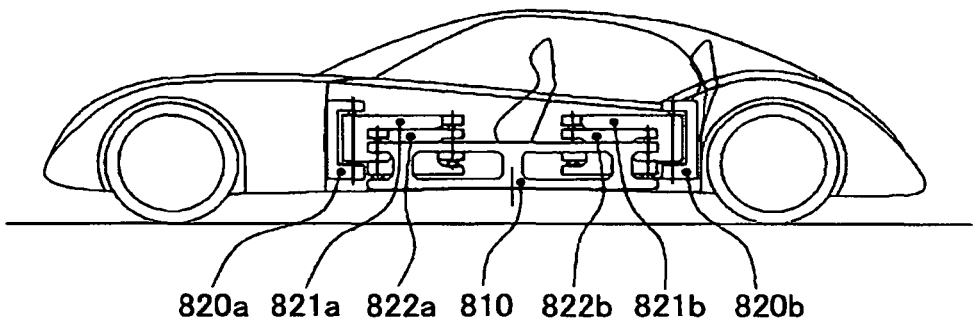
820a  821a  822a  810  822b  821b  820b
(c)
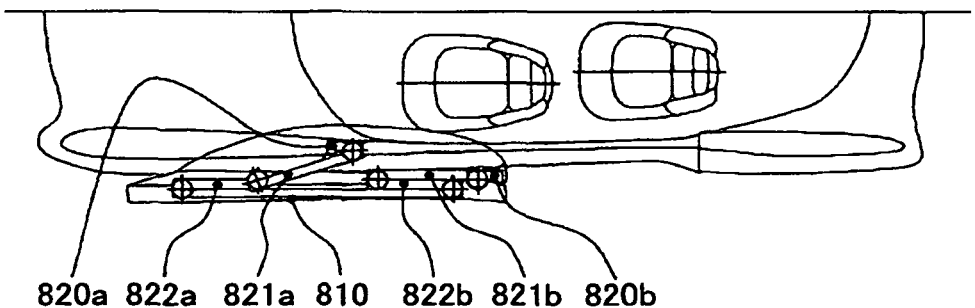
820a  822a  821a  810  822b  821b  820b
(d)
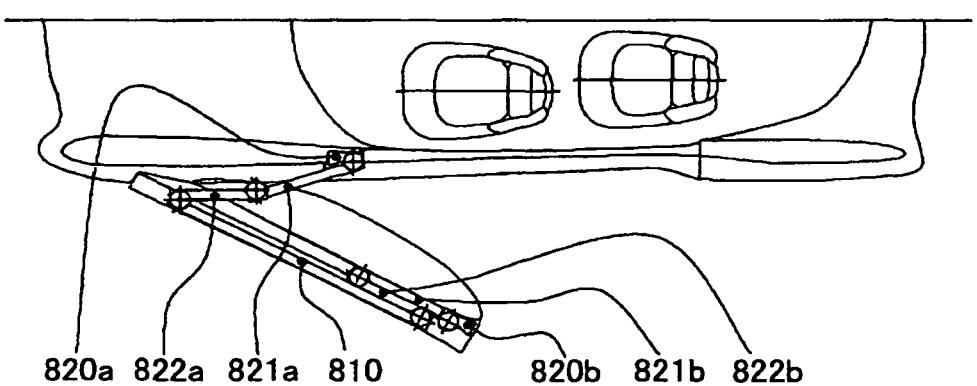
820a  822a  821a  810        820b  821b  822b

DOUBLE-OPENING DOOR DEVICE FOR VEHICLES

FIELD OF THE INVENTION

The present invention relates to vehicle doors.

BACKGROUND ART

A door device of the present invention is associated with a long double-opening door for vehicles, particularly for coupes, singly covering a range of a vehicle including two rows of front and rear seats in the longitudinal direction of the vehicle, which door allows rear-seat occupants to get out the vehicle while front-seat occupants are seated.

Of the vehicles manufactured and marketed, no vehicle has a double-opening door on the side faces of the vehicle body.

However, some patent registrations can be found regarding a double-opening door provided on the side faces of a vehicle. Let us discuss these patented double-opening doors. Patent Documents 1, 2 and 3 each deal with a technique concerning double-opening door of a normal length and the technique does not enable a rear-seat occupant to get off the vehicle while a front-seat occupant is seated.

Patent Document 1: JP-A-S58-101980

Patent Document 2: JP-A-S58-191881

Patent Document 3: JP-A-S63-284383

A long double-opening door for vehicles has three issues that have to be solved. The first issue is the rigidity against a stress, such as a wind pressure, imposed on a vehicle body in its horizontal direction when the door is opened. The second issue is the rigidity against a stress, such as the weight of a person, imposed on a vehicle body in its vertical direction when the door is opened. The third issue is the rigidity, during traveling, of the vehicle body that has a large opening to be used for the long double-opening door.

The inventor of the present invention made an invention related to a long double-opening door for vehicles, which is disclosed in Patent Document 4. Patent Document 4 deals with a technique for solving the three issues.

With the technique of Patent Document 4, when a front-seat occupant gets in/out the vehicle, a first opening/closing means provided at a front end portion of the door is released and the door is supported by a first opening/closing means (connecting means) provided at a rear end portion of the door and a second opening/closing means (connecting means) provided at a center portion of the door, in a manner of enabling opening/closing of the door. Further, when a rear-seat occupant gets in/out the vehicle, the first opening/closing means provided at a rear end portion of the door is released and the door is supported by the first opening/closing means (connecting means) provided at a front end portion of the door and the second opening/closing means (connecting means) provided at the center portion of the door, in a manner of enabling opening/closing of the door.

However, the technique of Patent Document 4 raises a fourth issue. Specifically, due to the second opening/closing member (connecting means) located at the center portion of the door, when the front-seat occupant and the rear-seat occupant get in/out the vehicle, the door has to be necessarily closed once, after either of the front-seat occupant or the rear-seat occupant has got in/out the vehicle. Otherwise, the other of the front-seat occupant or the rear-seat occupant cannot get in/out the vehicle.

Patent Document: JP-A-2007-324266

DISCLOSURE OF THE INVENTION

Issues to be Solved by the Invention

The present invention has an object of solving the first, second and third issues solved by Patent Document 4 and the new issue raised by Patent Document 4.

Means for Solving the Issues

A door device is provided here which does not use the second opening/closing member (connecting means) of Patent Document 4. The door device of the present invention includes: a door; two intermediate members each provided in the longitudinal direction of the door so as to be located between a front end portion and the vehicle body and between a rear end portion and the vehicle body; a first connecting means rotatably and parallelly movably interposed between the door and the intermediate members; and a second connecting means detachably interposed between the intermediate members and the vehicle body.

Effects of the Invention

Since the means corresponding to the second opening/closing member (connecting means) of Patent Document 4 is not provided, a rear-seat occupant can get in/out the vehicle following a front-seat occupant, or a front-seat occupant can get in/out the vehicle following a rear-seat occupant, thereby solving the fourth issue.

FIG. 1 shows a comparison table that compares entry/exit scenario between several types of doors in the case where there are four vehicle occupants. The present invention realizes the entry/exit scenarios B, E and F that have been impossible for conventional two-door vehicles and the entry/exit scenarios C, D, E and F that have been impossible in Patent Document 4. In Patent Document 4, when the entry/exit scenario C, D, E or F is required to be performed, the entry/exit scenario A or B is performed, followed by temporarily closing the door, and then the entry/exit scenario B or A is performed. In the present invention, if there is a space beside the vehicle door, the entry/exit type C, D, E or F can be selected, but if there is no space or if an easy entry/exit is desired such as for a disabled person, the entry/exit scenario A or B is performed first as in Patent Document 4, followed by temporarily closing the door, and then the entry/exit scenario B or A can be selected.

The first, second and third issues have been solved by permitting the intermediate members to have a length in the vehicle's longitudinal direction and a length in the vehicle's heightwise direction, i.e. have been solved differently from Patent Document 4. First, regarding the first issue, the first connecting means and the second connecting means have been arranged being distanced from each other in the longitudinal direction of the vehicle to provide a structure having high rigidity against the horizontal stress, such as a wind pressure, imposed on the vehicle body when the door is opened. Regarding the second issue, the first connecting means and the second connecting means have been permitted to have a length in the heightwise direction of the vehicle and arranged being distanced from each other in the longitudinal direction of the vehicle to provide a structure having high rigidity against the vertical stress, such as a person's weight, imposed on the vehicle body when the door is opened. Further, regarding the third issue, the intermediate members in the front and the rear end portions in the longitudinal direction of the door are permitted to be firmly connected to the vehicle body by the second connecting means to exert an effect of reducing the opening area in the vehicle body for the door. Then, using the first connecting means and the second connecting means that have contributed to providing the structure of high rigidity coping with the first and second issues, and using a third connecting means provided at a lower end portion at substantially the center of the door in the longitudinal direction, the rigidity of the vehicle body during traveling with the door being closed has been enhanced.

Further, by permitting the intermediate members to have a length in the longitudinal direction and a length in the heightwise direction of the vehicle, the first connecting means can be realized in various styles. These styles include, for example, the single-hinge mechanism of the first embodiment, the multi-joint link mechanism of the second embodiment and the slide opening/closing mechanism of the fifth embodiment. The fifth embodiment is associated with a cantilever slide door characterized in that no rail is required to be provided on the side of the vehicle body, i.e. the vehicle body is provided with no rail groove.

Since the intermediate members have a length in the longitudinal direction and a length in the heightwise direction of the vehicle, the first connecting means is ensured to be easily incorporated with the automatic door mechanism (motive-power drive mechanism) of the third or sixth embodiment, or the power-assist mechanism (power-assist drive mechanism) of the fourth or seventh embodiment.

Furthermore, the long double-opening door of the present invention allows new design in four-seat coupe. The length of the long double-opening door equals to the total length of the front and rear doors of a four-door vehicle, and dispenses with a pillar called "B-pillar" between the front and rear doors, with integrated window glass. Thus, the long double-opening door has realized an expansive habitable space.

BEST MODES FOR IMPLEMENTING THE INVENTION

The double-opening door device of the present invention includes a long double-opening door 10, intermediate members, a vehicle body 1, a first connecting means that connects the long double-opening door 10 and the intermediate members, and a second connecting means that connects the intermediate members and the vehicle body 1.

When a rear part of the long double-opening door 10 is opened, the second connecting means at a front end portion of the door releases the connection between the intermediate member and the vehicle body 1. Meanwhile, the first connecting means at a rear end portion of the door, an intermediate member 120b and the second connecting means cooperate with each other to support the long double-opening door 10 so that the front part can be opened/closed. On the other hand, when a rear part of the long double-opening door 10 is opened, the second connecting means at a rear end portion of the door releases the connection between the intermediate member and the vehicle body 1. Meanwhile, the first connecting means at the front end portion of the door, the intermediate member and the second connecting means cooperate with each other to support the long double-opening door 10 so that the rear part can be opened/closed.

Control means of the present invention is different between the manually-operated mechanism of the first, second or fifth embodiment, the automatic door mechanism (motive-power drive mechanism) of the third or sixth embodiment, and the power-assist mechanism (power-assist drive mechanism) of the fourth or seventh embodiment. In the embodiments of the present invention, control means are all indicated in the form of an electrical control system. Alternatively, however, a mechanical control system or a control system that is the combination of the electrical and mechanical control systems may be used

First Embodiment

The first embodiment is associated with a door device using a single-hinge mechanism. The door device is a long double-opening door device in which a first connecting means is configured by a single-hinge mechanism consisting of hinge members 121a, 121b and buffer members 122a, 122b. The buffer members 122a, 122b prevent the door from being banged closed such as by a wind pressure or prevent the hinge members 121a, 121b from being imposed with an undue stress such as by a wind pressure.

FIG. 2 shows schematic structural diagrams of a four-seat coupe installing the long double-opening door device, or illustrating a principal mechanism of the present invention in a transparent manner. FIG. 2(a) is a plan view illustrating a state where the long double-opening door 10 is closed. FIG. 2(b) is a side view (front view of the door). FIG. 2(c) is a plan view illustrating a state where the rear part of the door is opened. FIG. 2(d) is a plan view illustrating a state where the front part of the door is opened. A door-side bracket 110 is mounted on the long double-opening door 10. Intermediate members 120a, 120b are connected to the door-side bracket 110 via the hinge members 121a, 121b and the buffer members 122a, 122b of the hinge mechanism. FIG. 2(c) illustrates that the intermediate member 120b, the hinge member 121b and the buffer member 122b are opened integrally with the long double-opening door 10 and therefore the entry/exit of a rear-seat occupant is not prevented. FIG. 2(d) illustrates that the intermediate member 120a, the hinge member 121a and the buffer member 122a do not prevent the entry/exit of a front-seat occupant.

FIG. 3 more specifically illustrates the configuration of the first embodiment. FIG. 3(a) is a plan view illustrating the long double-opening door device. FIG. 3(b) is a front view (outer side of the door). FIG. 8(c) is a plan view illustrating a state where the rear part of the long double-opening door 10 is opened realizing a first state. FIG. 3(d) is a plan view illustrating a state where the door is opened realizing a second state. When there is a space and the entry/exit scenario C, D, E or F of the entry/exit comparison table is performed, the long double-opening door 10 is opened to an extent of the second state. The door-side bracket 110 and the intermediate members 120a, 120b are connected by the first connecting means that is the hinge mechanism consisting of the hinge members 121a, 121b and the buffer members 122a, 122b. Connection to a body-side bracket 130 is established by the second connecting means, i.e. two lock solenoids (front side) 131a and two lock solenoids (rear side) 131b.

Of the three issues of the long double-opening door device for vehicles set forth above, the first issue that is the rigidity against a horizontal stress, such as a wind pressure, imposed on the vehicle body when the door is opened, is coped with by the structure shown in FIG. 3. Specifically, FIG. 3 illustrates that the structure can exert a high rigidity with the sufficiently large length of the intermediate members 120a, 120b in the longitudinal direction of the vehicle, and the distance ensured accordingly between the hinge members 121a, 121b and the buffer members 122a, 122b, which distance is required for the buffer members 122a, 122b to function.

The second issue that is the rigidity against a vertical stress, such as a person's weight, imposed on the vehicle body when the door is opened, is also coped with by the structure shown in FIG. 3. Specifically, FIG. 3 illustrates that the structure can exert a high rigidity with the sufficiently large length of the intermediate members 120a, 120b in the heightwise direction of the vehicle, and the sufficiently large length given accordingly to the hinge members 121a, 121b in the heightwise direction.

The third issue that is the rigidity, during traveling, of the vehicle body that has a large opening to be used for the long double-opening door device, is also coped with by the structure shown in FIG. 3. Specifically, FIG. 3 illustrates that the structure can exert high rigidity with: the sufficiently large length of the intermediate members 120a, 120b in the heightwise direction of the vehicle; the sufficiently large length given accordingly to the hinge members 121a, 121b in the heightwiswe direction; substantially a single plane configured by the door-side bracket 110, hinge members 121a, 121b, intermediate members 120a, 120b, lock solenoids 131a, 131b and the body-side bracket 130, in a state where the door is closed to provide an integrated structure of the door and the vehicle body for the enhancement of the rigidity of the vehicle body; and the direct connection between the door-side bracket 110 and the body-side bracket 130 via a lock solenoid 131c to provide a further integrated body of the door and the vehicle body.

FIG. 13(b) illustrates a remote door key 410 and a door switch 411 provided thereon, used in the first embodiment. FIG. 13(c) illustrates retractable door handles 500a, 500b.

FIG. 4 shows a control unit for opening/closing the door according to the first embodiment. Referring to FIGS. 3, 4 and 13, the control for opening the rear part of the long double-opening door 10 is described. First, upon operation of the door switch 411 of the remote door key 410, door handle sensors 501a, 501b are permitted to receive an input signal. Then, when an input signal is received by the door handle sensor (rear side) 501b, a operation part 133 processes the input signal, while a control part 134 drives the lock solenoid (rear side) 131b provided at the intermediate member (rear side) 120b and drives the lock solenoid (center) 131c provided at the door-side bracket 110 to pull out pins from the body-side bracket 130, thereby allowing the long double-opening door 10 to be opened/closed. When the door handle (rear side) 500b is pulled, the door is opened. The lock solenoid (front side) 131a and the lock solenoid (rear side) 131b cannot be simultaneously operated and therefore the long double-opening door 10 will not fall.

The control for closing, the rear part of the long double-opening door 10 is described. When the door handle (rear side) 500b is pushed, the door is closed. When door-position sensors 132a, 132b sense that the long double-opening door 10 is in a closed state, the lock solenoid (rear side) 131b and the lock solenoid (center) 131c are driven to insert the pins into the body-side bracket 130, thereby fixing the long double-opening door 10 to the body-side bracket 130.

The control for opening and closing the front part of the long double-opening door 10 can be described in the same manner as the control for opening and closing the rear part, respectively, by replacing the members referred to as (rear side) with the members referred to as (front side), or vice versa. The electrical control system of the present embodiment may be replaced by a mechanical control system.

Second Embodiment

The second embodiment is associated with a door device using a multi-joint link mechanism. The door device is a long double-opening door device having a first connecting means configured by a multi-joint link mechanism which consists of rotatable first links 221a, 221b and second links 222a, 222b having a different length. Compared to the long double-opening door device configured by a hinge mechanism according to the first embodiment, the long double-opening door 10 is rotatably moved while being parallelly translated when the door is opened and therefore the opening is enlarged to thereby facilitate the entry/exit.

FIG. 5 illustrates schematic structural diagrams of a four-seat coupe installing the long double-opening door device, or illustrating a principal mechanism of the present invention in a transparent manner. FIG. 5(a) is a plan view illustrating a state where the long double-opening door 10 is closed. FIG. 5(b) is a side view (front view of the door). FIG. 5(c) is a plan view illustrating a state where the rear part of the door is opened. FIG. 5(d) is a plan view illustrating a state where the front part of the door is opened. A door-side bracket 210 is mounted on the long double-opening door 10. Intermediate members 220a, 220b are connected to the door-side bracket 210 via the first links 221a, 221b and the second links 222a, 222b of the multi-joint link mechanism. FIG. 5(c) illustrates that the intermediate member (rear side) 220b, the first link (rear side) 221b and the second link (rear side) 222b are opened integrally with the long double-opening door 10, and thus the entry/exit of a rear-seat occupant will not be prevented. Also, FIG. 5(d) illustrates that the intermediate member (front side) 220a, the first link (front side) 221a and the second link (front side) 222a will not prevent the entry/exit of a front-seat occupant FIG. 6 more specifically illustrates the configuration of the second embodiment. FIG. 6(a) is a back view (inner side of the door, shown upside down). FIG. 6(b) is a plan view. FIG. 6(c) is a front view (outer side of the door). FIG. 6(d) is a plan view of the long double-opening door 10 in a state where the rear side is opened. The door-side bracket 210 is connected to the intermediate members 220a, 220b via the multi-joint link mechanism consisting of the first links 221a, 221b and the second links 222a, 222b.

Regarding the first issue, mentioned above, of the long double-opening door device for vehicles, FIG. 6 illustrates that: the intermediate members 220a, 220b have a sufficient length in the longitudinal direction of the vehicle; and, accordingly, the first links 221a, 221b are well distanced from the second links 222a, 222b, thereby imparting a high rigidity to the structure.

Regarding the second issue, FIG. 6 illustrates that: the intermediate members 220a, 220b have a sufficient length in the heightwise direction of the vehicle; and, accordingly, the first links 221a, 221b and the second links 222a, 222b have a sufficient length in the heightwise direction, thereby ensuring high rigidity in the structure.

Regarding the third issue, FIG. 6 illustrates that: the intermediate members 120a, 120b have a sufficient length in the heightwise direction of the vehicle; accordingly, the hinge members 121a, 121b have a sufficient length in the heightwise direction; the door-side bracket 110, hinge members 121a, 121b, intermediate members 120a, 120b, lock solenoids 131a, 131b and body-side bracket 130 configure substantially a single plane to thereby enhance the rigidity of the vehicle body as a structure integrating the door and the vehicle body; and the lock solenoid 131c directly connects the door-side bracket 110 and the body-side bracket 130 to provide a structure further integrating the door and the vehicle body, thereby imparting a high rigidity to the structure.

Third Embodiment

The third embodiment is associated with a door device using a multi-joint link mechanism and an automatic door mechanism (motive-power drive mechanism). The configuration is shown in FIG. 6. The first links 221a, 221b and the second links 222a, 222b are mounted with first rotary actuators 223a, 223b and second rotary actuators 224a, 224b. The multi-joint link mechanism may also be driven by a single rotary actuator using a known motive-power transmission mechanism.

FIG. 13(a) illustrates an appearance diagram of a remote controller 400 used for the automatic door mechanism (motive-power drive mechanism). A right-front door switch 401a and a right-rear door switch 401b are seesaw switches each consisting of an open button and a close button. The remote control means 400 has a grip portion on which a safety switch 402 is mounted. When the remote control means 400 is not correctly gripped, the door switches 401a, 401b cannot be operated.

FIG. 7 illustrates a control unit for opening/closing the door according to the third embodiment. Referring to FIGS. 6, 7 and 13, hereinafter is described the control for opening the rear part of the long double-opening door 10. First, upon operation of the door switch (rear to side) 401b of the remote controller 400, a operation part 233 processes the input signal, while a control part 234 drives lock solenoids (rear side) 231b provided at the intermediate member (rear side) 220b and a lock solenoid (center) 231c provided at the door-side bracket 210. As a result, pins are pulled out of a body-side bracket 230 to enable opening/closing of the long double-opening door 10. Since lock solenoids (front side) 231a and the lock solenoids (rear side) 231b cannot be simultaneously operated, the long double-opening door 10 will not fall. Subsequently, the first rotary actuator (front side) 223a provided at the first link (front side) 221a and the second rotary actuator (front side) 224a provided at the second link (front side) 222a are cooperatively controlled to open the rear part of the long double-opening door 10.

Hereinafter is described the control for closing the rear part of the long double-opening door 10. First, when an in-vehicle console or the door switch (rear side) 401b of the remote controller 400 is operated, the operation part 233 processes the input signal, while the control part 234 cooperatively controls the first rotary actuator (front side) 223a provided at the first link (front side) 221a and the second rotary actuator (front side) 224a provided at the second link (front side) 222a to close the rear part of the long double-opening door 10. Subsequently, when door-position sensors 232a, 232b sense that the long double-opening door 10 is in a closed state, the lock solenoids (rear side) 231b and the lock solenoid (center) 231c are driven to insert the pins into the body-side bracket 230. As a result, the long double-opening door 10 is fixed to the body-side bracket 230.

The control for opening the front part and the control for closing the front part of the long double-opening door 10 can be described in the same way as the control for opening the rear part and the control for closing the rear part, respectively, by replacing the members referred to as (front side) with the members referred to as (rear side), or vice versa.

Fourth Embodiment

The fourth embodiment is associated with a door device using a multi-joint link mechanism and a power-assist mechanism (power-assist drive mechanism).

FIG. 13(b) illustrates a remote door key 410 and a door switch 411 provided thereon, used in the fourth embodiment. FIG. 13(c) illustrates retractable door handles 500a, 500b. FIG. 13(b) illustrates an appearance diagram of the remote door key 410 used in the fourth embodiment. The door switch 411 is a seesaw switch consisting of an open button and a close button. FIG. 13(c) illustrates an appearance diagram of the long double-opening door 10 mounting the retractable door handles 500a, 500b, and the vehicle.

FIG. 14 illustrates structural diagrams of the retractable door handles 500a, 500b. FIGS. 14(a) and 13(d) are side views illustrating an extended state. FIG. 14(b) is a side view illustrating a retracted state. FIGS. 14(c) and 14(e) are back views (inner side of the door). The retractable door handles 500a, 500b are extended and retracted by door handle actuators 503a, 503b. Door handle sensors 501a, 501b are mounted in between the retractable door handles 500a, 500b and the door handle actuators 503a, 503b to sense an opening-direction stress 510 and a closing-direction stress 511 of the retractable door handles 500a, 500b, by converting the stresses into an opening-direction input 512 and a closing-direction input 513, respectively.

FIG. 8 illustrates a control unit for opening/closing the door according to the third embodiment. Referring to FIGS. 6, 8, 13 and 14, hereinafter is described the control for opening the rear part of the long double-opening door 10. First, when the door switch 411 of the remote door key 410 is operated, the operation part 233 processes the input signal, while the control part 234 controls the door handle actuators 503a, 503b. As a result, both of or either optional one of the retractable door handles 500a, 500b are/is extended so as to be operable. Then, when the door handle sensor (rear side) 501b detects the opening-direction stress 510 of the retractable door handle (rear side) 500b as the opening-direction input 512, the signal is processed by the operation part 232 for transmission to the control part 233. Meanwhile, the control part 233 drives the lock solenoids (rear side) 231b provided at the intermediate member (rear side) 220b and the lock solenoid (center) 231c provided at the door-side bracket 230 to pull the pins out of the body-side bracket 230, whereby the long double-opening door 10 can be opened/closed. Further, the first rotary actuator (front side) 223a provided at the first link (front side) 221a and the second rotary actuator (front side) 224a provided at the second link (front side) 222a are cooperatively controlled to perform rear-side opening-direction assist drive at a speed suitable for the detected opening-direction input 512. When detection of the opening-direction input 512 is stopped, the rear-side opening-direction assist drive is stopped. The operation part 232, if it simultaneously detects the operation of the front and rear door handle sensors 501a, 501b, selects one which is assumed to have been operated the earliest. Also, if one of the front and rear sides of the long double-opening door 10 is opened, the operation part 232 inhibits control associated with the opening-direction assist drive of the other one.

The control for closing the rear part of the long double-opening door 10 is described. When the door handle sensor (rear side) 501b detects the closing-direction stress 511 of the retractable door handle (rear side) 500b as the opening-direction input 513, the signal is processed by the operation part 232 for transmission to the control part 233. Meanwhile, the control part 233 cooperatively controls the first rotary actuator (front side) 223a provided at the first link (front side) 221a and the second rotary actuator (front side) 224a provided at the second link (front side) 222a to perform rear-side opening-direction assist drive at a speed suitable for the detected closing-direction input 513. When the door position sensors 232a, 232b detect that the long double-opening door 10 is in a closed state, the lock solenoids (rear side) 231b and the lock solenoid (center) 231c are driven to insert the pins into the body-side bracket 230 to thereby fix the long double-opening door 10 to the body-side bracket 230.

The control for opening the front part and the control for closing the front part of the long double-opening door 10 can be described in the same way as the control for opening the rear part and the control for closing the rear part, respectively, by replacing the members referred to as (front side) with the members referred to as (rear side), or vice versa.

Regarding the timing for performing the assist drive, there are two approaches. The first approach is to fully perform the assist drive ranging from a closed state to an opened state of the long double-opening door 10. The second approach is to perform opening-direction assist drive ranging from a closed state to a half-closed state of the long double-opening door 10 and to perform closing-direction assist drive ranging from a half-closed state to a closed state of the door. In the latter approach, the assist drive is performed only over the ranges in which physical strength is required.

Fifth Embodiment

The fifth embodiment is associated with a door device using a slide opening/closing mechanism. The door device is a long double-opening door device having a first connecting means configured by a slide opening/closing mechanism which consists of first slide actuators 321a, 321b, second slide actuators 322a, 322b, a first rail 311 and a second rail 312. Compared to the long double-opening door device configured by the hinge mechanism according to the first embodiment, the long double-opening door 10 is mainly operated with parallel translation when it is opened and therefore entry/exit in a narrow parking space is more facilitated.

FIG. 9 illustrates schematic structural diagrams of a four-seat coupe installing the long double-opening door device, or illustrates a principal mechanism of the present invention in a transparent manner. FIG. 9(a) is a plan view illustrating a state where the long double-opening door 10 is closed. FIG. 9(b) is a side view (front view of the door). FIG. 9(c) is a plan view illustrating a transient state in opening the rear side. FIG. 9(d) is a plan view illustrating a state where the rear side is opened. A door-side bracket 310 is mounted on the long double-opening door 10. Intermediate members 320a, 320b are connected to the door-side bracket 310 via the first slide actuators 321a, 321b, the second slide actuators 322a, 322b, the first rail 311 and the second rail 312. FIG. 6(d) illustrates that the entry/exit of a rear-seat occupant is not prevented by the intermediate member (rear side) 220b, the first slide actuator (rear side) 321b and the second slide actuator (rear side) 322b.

FIG. 10 more specifically illustrates the configuration of the second embodiment. FIG. 10(a) is a back view (inner side of the door, shown upside down) of the long double-opening door device. FIG. 10(b) is a plan view. FIG. 10(c) is a front view (outer side of the door). FIG. 6(d) is a plan view illustrating a transient state in opening the rear side of the long double-opening door 10. FIG. 6(e) is a plan view illustrating a state where the rear side of the long double-opening door 10 is opened.

Sixth Embodiment

The sixth embodiment is associated with a door device using a slide opening/closing mechanism and an automatic door mechanism (motive-power drive mechanism). The configuration is shown in FIG. 10. The first slide actuators 321a, 321b and the second slide actuators 322a, 322b slidably engage with the first rail 311 and the second rail 312 to drive the first rail 311 and the second rail 312 by linear motors in a slidable direction. The first rail 311 and the second rail 312 are mounted on the door-side bracket 310. The first slide actuators 321a, 321b and the second slide actuators 322a, 322b are connected to the intermediate members 320a, 320b via a multi-joint link consisting of first links 323a, 323b, second links 324a, 324b and third links 325a, 325b. The multi-joint link has a function of vertically pushing out the first slide actuators 321a, 321b and the second slide actuators 322a, 322b toward a door surface. Further, the first links 323a, 323b and the second links 324a, 324b are connected via connecting links 326a, 326b, while the first links 323a, 323b and the third links 325a, 325b are connected via connecting shafts 327a, 327b, to thereby function as a multi-joint link. The second links 324a, 324b are mounted with rotary actuators 328a, 328b.

The first links 323a, 323b, the second links 324a, 324b and the third links 325a, 325b are well shortened and made parallel to a door plane in the vicinity thereof in a state where the door is closed. The first slide actuators 321a, 321b and the second slide actuators 322a, 322b are fixed to the first rail 311 and the second rail 312. Accordingly, the door-side bracket 310, the intermediate members 320a, 320b and the body-side bracket 310 are integrated to form a structure having high rigidity.

Similar to the third embodiment, the sixth embodiment uses the remote controller 400 shown in FIG. 13(a).

FIG. 11 illustrates a control unit for opening/closing the door of the sixth embodiment. Referring to FIGS. 10, 11 and 13, hereinafter is described the control for opening the rear part of the long double-opening door 10. First, when the door switch (rear side) 410b of the remote controller 400 is operated, an operation part 333 processes the input signal. Meanwhile, a control part 334 drives lock solenoids (rear side) 331b provided at the intermediate member (rear side) 320b to pull pins out of the body-side bracket 330 to thereby allow the long double-opening door 10 to be opened/closed. Since lock solenoids (front side) 331a and the lock solenoids (rear side) 331b cannot be simultaneously operated, the long double-opening door 10 will not fall. Then, the rotary actuator (front side) 328a and the rotary actuator (rear side) 328b are cooperatively controlled to rotate the first links 323a, 323b, the second links 324a, 324b and the third links 325a, 325b. As a result, the long double-opening door 10 is pushed out and, at the same time, slightly parallelly translated to bring the door into the state shown in FIG. 10(d). Further, the first slide actuator (front side) 321a and the second slide actuator (front side) 322a are cooperatively controlled to parallelly translate the first rail 311 and the second rail 312 in the forward direction to bring the door into the state shown in FIG. 10(e)

The control for closing the rear part of the long double-opening door 10 is described. First, when the door switch (rear side) 401b of the remote controller 400 is operated, the operation part 333 processes the input signal. Meanwhile, the control part 334 cooperatively controls the first slide actuator (front side) 321a and the second slide actuator (front side) 322a. As a result, the first rail 311 and the second rail 312 are parallelly translated in the rearward direction to bring the door into the state shown in FIG. 10(d). Then, the rotary actuator (front side) 328a and the rotary actuator (rear side) 328b are cooperatively controlled to rotate the first links 323a, 323b, the second links 324a, 324b and the third links 325a, 325b. As a result, the long double-opening door 10 is pulled in and, at the same time, slightly parallelly translated in the rearward direction to bring the door into the state shown in FIG. 10(b). Further, the lock solenoids (rear side) 331b are driven to insert the pins into the body-side bracket 330 to thereby fix the long double-opening door 10 to the body-side bracket 330.

The control for opening the front part and the control for closing the front part of the long double-opening door 10 can be described in the same way as the control for opening the rear part and the control for closing the rear part, respectively, by replacing the members referred to as (front side) with the members referred to as (rear side), or vice versa.

Seventh Embodiment

The seventh embodiment is associated with a door device using a slide opening/closing mechanism and a power-assist mechanism (power-assist drive mechanism).

Similar to the fourth embodiment, the seventh embodiment uses the remote key 410 shown in FIG. 13(b).

FIG. 14 illustrates structural diagrams of the retractable door handles 500a, 500b. FIG. 14(a) and FIG. 13(d) are side views each illustrating an extended state. FIG. 14(b) is a side view illustrating a retracted state. FIGS. 14(c) and 14(e) are back views (inner side of the door). The retractable door handles 500a, 500b are extended and retracted by the door handle actuators 503a, 503b. Door handle sensors 502a, 502b are mounted in between the retractable door handles 500a, 500b and the door handle actuators 503a, 503b to detect an opening-direction stress 515 and a closing-direction stress 516 of the retractable door handles 500a, 500b by converting them into an opening-direction input 517 and a closing-direction input 518, respectively.

FIG. 11 illustrates a control unit for opening/closing the door according to the sixth embodiment. Referring to FIGS. 10, 11, 13 and 14, hereinafter is described the control for opening the rear part of the long double-opening door 10. First, when the door switch 411 of the remote door key 410 is operated, the operation part 333 processes the input signal. Meanwhile, the control part 334 controls the door handle actuators 503a, 503b. As a result, both of or either optional one of the retractable door handles 500a, 500b are/is extended so as to be operable. Then, when the door handle sensor (rear side) 502b detects the opening-direction stress 515 of the retractable door handle (rear side) 500b as the opening-direction input 517, the signal is processed by the operation part 333 and transmitted to the control part 334. The control part 334 then drives the lock solenoids (rear side) 331b provided at the intermediate member (rear side) 320b. As a result, the pins are pulled out of the body-side bracket 330 to allow the long double-opening door 10 to be opened/closed. Since the lock solenoids (front side) 331a and the lock solenoids (rear side) 331b cannot be simultaneously operated, the long double-opening door 10 will not fall. Further, the rotary actuator (front side) 328a and the rotary actuator (rear side) 328b are cooperatively operated to rotate the first links 323a, 323b, the second links 324a, 324b and the third links 325a, 325b. As a result, the long double-opening door 10 is pushed out and, at the same time, slightly parallelly translated in the forward direction to bring the door into the state shown in FIG. 10(d). Further, the first slide actuator (front side) 321a and the second slide actuator (front side) 322a are cooperatively controlled to perform assist drive by which the first rail 311 and the second rail 312 are parallelly translated in the forward directly at a speed suitable for the detected opening-direction input 517. Thus, the door is brought into the state shown in FIG. 10(e). When detection of the opening-direction input 517 is stopped, the rear-side opening-direction assist drive is stopped.

The control for closing the rear part of the long double-opening door 10 is described. First, when the door handle sensor (rear side) 502b detects the closing-direction stress 516 of the retractable door handle (rear side) 500b as the opening-direction input 518, the signal is processed by the operation part 333 and transmitted to the control part 334. The control part 334 then cooperatively controls the first slide actuator (front side) 321a and the second slide actuator (front side) 322a to perform assist drive by which the first rail 311 and the second rail 312 are parallelly translated in the rearward direction. As a result, the door is brought into the state shown in FIG. 10(d). When detection of the closing-direction input 518 is stopped, the rear-side closing-direction assist drive is stopped. Then, the rotary actuator (front side) 328a and the rotary actuator (rear side) 328b are cooperatively controlled to rotate the first links 323a, 323b, the second links 324a, 324b and the third links 325a, 325b. As a result, the long double-opening door 10 is pulled in and, at the same time, slightly parallelly translated in the rearward direction to bring the door into the state shown in FIG. 10(b). Further, the lock solenoids (rear side) 331b are driven to insert the pins into the body-side bracket 330 to thereby fix the long double-opening door 10 to the body-side bracket 330.

The control for opening the front part and the control for closing the front part of the long double-opening door 10 can be described in the same way as the control for opening the rear part and the control for closing the rear part, respectively, by replacing the members referred to as (front side) with the members referred to as (rear side), or vice versa.

Regarding the timing for performing the assist drive, there are two approaches. The control is similar to the one set forth in the fourth embodiment.

The eighth to twentieth embodiments are each associated with a long double-opening door device based on intermediate members and using a swing mechanism. FIGS. 15, 16 and 17 show mechanism comparison tables concerning the eighth to twentieth embodiments. For each mechanism, model number, embodiment number and figure number are added. Each of the mechanisms shown in FIGS. 16 and 17 is a combination of the mechanisms shown in FIG. 15 and accordingly each of the model numbers is indicated as a combination of the model numbers shown in FIG. 15. No model number is given for those mechanisms which do not structurally constitute. Hereinafter, a model number is used to specify a mechanism.

FIG. 18 is a comparison table (2) of entry/exit scenarios for various door mechanisms in the case where there are four vehicle occupants. In Model 124, the opening state of the door is in the first state (state suitable for the entry/exit of either the front-seat occupants or the rear-seat occupants). In the entry/exit scenarios A and B, the door is closed once and the other side of the door is opened to perform entry/exit of the front-seat occupants and the rear-seat occupants. In the entry/exit scenarios C, D, E and F, the front seats or the rear seats are slid to perform entry/exit of the front-seat occupants and the rear-seat occupants.

In Model 131, the opening state of the door is in the second state (state suitable for the simultaneous entry/exit of the front-seat occupants and the rear-seat occupants). In the entry/exit scenarios C, D, E and F, the entry/exit of the front-seat occupants and the rear-seat occupants is performed without sliding the front seats or the rear seats. In the case where the front-seat occupants get out the vehicle first, the entry/exit scenario C is selected. In the case where the rear-seat occupants get out the vehicle first, the entry/exit scenario E is selected. In the case where the front-seat occupants get in the vehicle first, the entry/exit scenario F is selected. In the case where the rear-seat occupants get in the vehicle first, the entry/exit scenario D is selected.

In Model 141, either of the first state and the second state of the opening state of the door is available. In the entry/exit scenarios C, D, E and F, the opening state of the door is in the second state. In the entry/exit scenarios A and B, the opening state of the door is in the first state. Accordingly, the door is not required to be unnecessarily widely opened and therefore the door can be opened in a narrow parking space.

In Model 131+124, either one of the front and rear parts of the door is opened according to Model 131, and the other one is opened according to Model 124. Let us take as an example the case where the rear part of the door is opened according to Model 131 and the front part is opened according to Model 124. In the entry/exit scenarios C, D, E and F, the rear part of the door is opened to realize the second state. In the entry/exit scenario A, the front part of the door is opened to realize the first state. In the entry/exit scenario B, the rear part of the door is opened to realize the second state. Compared to Model 131, Model 124 can reduce time taken for opening/closing the door and does not necessitate the door to be unnecessarily widely opened. Thus, Model 124 is suitable for the case where there is a high probability of entry/exit involving only the front seats, as in a coupe.

In Model 141+124, either one of the front and rear parts of the door is opened according to Model 141, and the other one is opened according to Model 124. Let us take as an example the case where the rear part of the door is opened according to Model 141 and the front part is opened according to Model 124. In the entry/exit scenarios C, D, E and F, the rear part of the door is opened to realize the second state. In the entry/exit scenarios A and B, the door is opened to realize the first state. Since Model 124 structurally more simplified and lighter than Model 141, Model 141+124 enables entry/exit similar to that of Model 141 but is lighter than Model 141.

Eighth Embodiment

The eighth embodiment is associated with a long double-opening door (symmetrical double opening) based on intermediate members and using the swing mechanism of Model 124. Model 124 includes Model 1241 that is a long double-opening door (symmetrical double opening) based on intermediate members and using a single-link swing mechanism. Model 1241 includes Models 1241a, 1241b and 1241c that depend on the angle of the door in an opened state.

FIG. 19 illustrates by (a), (b) and (c) movement explanatory diagrams concerning Models 1241a, 1241b and 1241c of the eighth embodiment, or illustrates a state where the long double-opening door 10 has been opened to realize the first state (state suitable for the entry/exit of either the front-seat occupants or the rear-seat occupants). FIG. 19(d) illustrates a relationship of a rotation angle θ1 634a of links 621a, 621b to intermediate members 620a, 620b, and a relationship of a rotation angle θ2 634b of the long double-opening door 10 to the links 621a, 621b. In Model 1241a, θ1+θ2=0 is established. Accordingly, the long double-opening door 10 is opened in its front or rear part, and the opened door is parallel to the door in a closed state. In Model 1241b, θ1+θ2>0 is established. Accordingly, the long double-opening door 10, when its front part is opened, is moved rearward while being rotated in the direction of opening the front part, and, when its rear part is opened, is moved forward while being rotated in the direction of opening the rear part. In Model 1241c, θ1+θ2<0 is established. Accordingly, the long double-opening door 10, when its front part is opened, is moved rearward while being rotated in the direction of opening the rear part, and, when its rear part is opened, is moved forward while being rotated in the direction of opening the front part. Model 1241a is suitable for the case where there is only a small space by the side of the vehicle body 1. Models 1241b and 1241c are suitable for the case where there is only a small space by the front and the rear of the vehicle body 1.

FIG. 28 illustrates schematic diagrams of a four-seat coupe installing Model 1241a, 1241b or 1241c of the eighth embodiment, or illustrates the principal mechanism of the present invention in a transparent manner. FIG. 28 exemplifies the case where the long double-opening door 10 is opened in its rear part (if the front part is opened, the opening process is completely symmetrical). FIG. 28(a) is a plan view illustrating a closed state of the long double-opening door 10. FIG. 28(b) is a side view (front view of the door). FIG. 28(c) is a plan view illustrating a state where the rear part of the door is opened in Model 1241a. FIG. 28(d) is a plan view illustrating a state where the rear part of the door is opened in Model 1241b. FIG. 28(e) is a plan view illustrating a state where the rear part of the door is opened in Model 1241c. A door-side bracket 610 is mounted on the long double-opening door 10. The intermediate members 620a, 620b are connected to the door-side bracket 610 via links 621a, 621b. FIG. 28 illustrates that the rear-side intermediate member 620b and the link (rear side) 621b of the long double-opening door 10 are opened integrally with the long double-opening door 10 so as not to prevent the entry/exit of the rear-seat occupants.

FIG. 29 specifically illustrates structural diagrams of Model 1241a, 1241b or 1241c of the eighth embodiment. FIG. 29(a) is a back view (inner side of the door) of the long double-opening door device. FIG. 29(b) is a plan view illustrating the long double-opening door device. FIG. 29(c) is a front view (outer side of the door). FIG. 29(d) is a plan view illustrating a state where the rear part of the long double-opening door 10 is opened in Model 1241a and illustrating that θ1+θ2=0 is established. FIG. 29(e) is a plan view illustrating a state where the rear part of the long double-opening door 10 is opened in Model 1241b and illustrating that θ1+θ2>0 is established. FIG. 29(f) is a plan view illustrating a state where the rear part of the long double-opening door 10 is opened in Model 1241c and illustrating that θ1+θ2=<0 is established. The intermediate members 620a, 620b and the door-side bracket 610 are connected via a first connecting means, i.e. the links 621a, 621b, first rotary actuators 623a, 623b and second rotary actuators 624a, 624b. Meanwhile, the intermediate members 620a, 620b and a body-side bracket 630 are connected via a second connecting means, i.e. lock solenoids 631a, 631b and lock pins 632a, 632b. Further, a lock solenoid 631c directly connects the door-side bracket 610 and the body-side bracket 630 to form a truss structure 650 of a substantially triangular shape together with the lock solenoids 631a, 631b and the lock pins 632a, 632b. Thus, FIG. 29 illustrates that a structure of high rigidity is provided in which the door and the vehicle body are integrated.

Ninth Embodiment

The ninth embodiment is associated with a long double-opening door (symmetrical double opening) based on intermediate members and using a long single-link large-opening swing mechanism of Model 1311. The door opening state corresponds to the second state (state suitable for the simultaneous entry/exit of front-seat occupants and rear-seat occupants). Specifically, the entry/exit of front-seat occupants and rear-seat occupants is enabled without sliding the front seats or the rear seats. Model 1311 includes Models 1311a, 1311b and 1311c that depend on the angle of the door in an opened state.

FIG. 20 illustrates movement explanatory diagrams of Models 1311a, 1311b and 1311c of the ninth embodiment, i.e. illustrating the long double-opening door 10 in an opened state realizing the second state.

FIG. 30 illustrates by (a), (b) and (d) (except FIG. 30(c)) schematic diagrams of a four-seat coupe installing Model 1311b, i.e. illustrating a principal mechanism of the present invention in a transparent manner. FIG. 30 exemplifies the case where the rear part of the long double-opening door 10 is opened. When the front part is opened, the opening process is completely symmetrical. The configuration is the same as that of Model 1241.

FIG. 31 more specifically illustrates by (a), (b), (c) and (e) (except FIG. 30(d)) structural diagrams of Model 1311b according to the ninth embodiment. FIG. 31(a) is a back view (inner side of the door) of a long double-opening door device. FIG. 31(b) is a plan view. FIG. 31(c) is a front view (outer side of the door). FIG. 31(e) is a plan view illustrating a state where the rear part of the long double-opening door 10 of Model 1311b is opened. FIG. 31 illustrates that, when the first rotary actuators 623a, 623b rotate the links 621a, 621b by θ1 634a, and the second rotary actuators 624a, 624b rotate the door-side bracket 610 by θ2 634b, θ1+θ2>0 is established. Compared to Model 1241, the length of the links 621a, 621b can be made shorter than the longitudinal length of the long double-opening door 10 by a factor of ½, by coaxially arranging the second rotary actuators 624a, 624b. Models 1311a and 1311c can be treated in the same way as Model 1311b by changing θ1 634a and θ2 634b. Further, the lock solenoid 631c directly connects the door-side bracket 610 and the body-side bracket 630 to form the truss structure 650 of a substantially triangular shape together with the lock solenoids 631a, 631b and the lock pins 632a, 632b. Thus, FIG. 31 illustrates that a structure of high rigidity is provided in which the door and the vehicle body are integrated.

Tenth Embodiment

The tenth embodiment is associated with a long double-opening door (symmetrical double opening) based on intermediate members and using a double-link A large-opening swing mechanism of Model 1312. Model 1312 includes Model 1312a, 1312b and 1312c that depend on the angle of the door in an opened state.

FIG. 21 illustrates by (a), (b) and (c) movement explanatory diagrams of Model 1312a, 1312b and 1312c, i.e. illustrating the second state (state suitable for simultaneous entry/exit of front-seat occupants and rear-seat occupants) of the long double-opening door 10. FIG. 21(d) illustrates a relationship of a rotation angle θ1 734a of first links 721a, 721b to intermediate members 720a, 720b, a relationship of a rotation angle θ2 734a of second links 722a, 722b to the first links 721a, 721b, and a relationship of a rotation angle θ3 734c of the long double-opening door 10 to the second links 722a, 722b. In Model 1312a, θ1+θ2+θ3=0 is established. Accordingly, the long double-opening door 10 is opened when its front part or rear part is opened, and the opened door is parallel to the door in a closed state. In Model 1312b, θ2+θ2+θ3>0 is established. Accordingly, the long double-opening door 10, when its front part is opened, is moved rearward while being rotated in the direction of opening the front part, and, when its rear part is opened, is moved forward while being rotated in the direction of opening the rear part. In Model 1312c, θ1+θ2+θ3<0 is established. Accordingly, the long double-opening door 10, when its front part is opened, is moved rearward while being rotated in the direction of opening the rear part, and, when its rear part is opened, is moved forward while being rotated in the direction of opening the front part. Compared to Models 1311a, 1311b and 1311c, use of a double link can reduce the space by the side of the vehicle body 1, which is required for the opening/closing of the long double-opening door 10.

FIG. 32 illustrates schematic diagrams of a four-seat coupe installing Model 1312a, i.e. illustrates a principal mechanism of the present invention in a transparent manner. FIG. 32(c) illustrates a transient state in opening the rear part of the long double-opening door 10. FIG. 32 exemplifies the case where the rear part of the long double-opening door 10 is opened, but when the front part is opened, the opening process is completely symmetrical.

FIG. 33 more specifically illustrates structural diagrams of Model 1312a according to the tenth embodiment. FIG. 33(a) is a back view (inner side of the door) of a long double-opening door device. FIG. 33(b) is a plan view. FIG. 33(c) is a front view (outer side of the door). FIG. 31(d) is a plan view illustrating a transient state in opening the rear part of the long double-opening door 10 of Model 1312a. FIG. 33(e) is a plan view illustrating a state where the rear part of the long double-opening door 10 of Model 1312a is opened. FIG. 33(d) illustrates that, when first rotary actuators 723a, 723b rotate the first links 721a, 721b by θ1 734a and second rotary actuators 724a, 724b rotate the second links 722a, 722b by θ2 734b, θ1+θ2=0, θ3=0 and θ1+θ2+θ3=0 are established. FIG. 33(e) illustrates that, when the second rotary actuators 724a, 724b are rotated in a direction opposite to the direction shown in 31(d) by θ2 734b and third actuators 725a, 725b rotate a door-side bracket 710 by θ3 734c, θ1+θ3=0, θ2=0 and θ1+θ2+θ3=0 are established. Models 1312b and 1312c can be treated in the same way as Model 1312a by changing θ1 734a, θ2 734b and θ3 734c. Further, a lock solenoid 731c directly connects the door-side bracket 710 and a body-side bracket 730 to form a substantially triangular truss structure 750 together with lock solenoids 731a, 731b and lock pins 732a, 732b. Thus, FIG. 33 illustrates that a structure of high rigidity is provided in which the door and the vehicle body are integrated.

Eleventh Embodiment

The eleventh embodiment is associated with a long double-opening door (symmetrical double opening) based on intermediate members and using a double-link B large-opening swing mechanism of Model 1313. Model 1313 only includes Model 1313b.

FIG. 22(a) illustrates a movement explanatory diagram of Model 1313b according to the eleventh embodiment, i.e. illustrates the second state (state suitable for the simultaneous entry/exit of front-seat occupants and rear-seat occupants) of the long double-opening door 10. FIG. 22(b) illustrates a relationship of a rotation angle θ1 834a of first links 821a, 821b to intermediate members 820a, 820b, a relationship of a rotation angle θ2 834b of second links 822a, 822b to the first links 821a, 821b, and a relationship of a rotation angle θ3 834c of the long double-opening door 10 to the second links 822a, 822b. In Model 1313b, θ1+θ2=0 and θ1+θ2+θ3>0 are established. Accordingly, the long double-opening door 10, when its front part is opened, is moved rearward while being rotate in the direction of opening the front part, and, when its rear part is opened, is moved forward while being rotated in the direction of opening the rear part. In the state where the long double-opening door 10 is closed, the first links 821a, 821b and the second links 822a, 822b are folded and therefore the length resulting from the addition of the first links 821a, 821b and the second links 822a, 822b becomes large. Compared to Models 1311a, 1311b and 1311c, the opening of the long double-opening door 10 is enlarged and the space by the side of the vehicle body 1, which is required for the opening/closing, is reduced.

FIG. 34 illustrates schematic diagrams of a four-seat coupe installing Model 1313b according to the eleventh embodiment, i.e. illustrates a principal mechanism of the present invention in a transparent manner. FIG. 34(c) illustrates a transient state in opening the rear part of the long double-opening door 10. FIG. 34 exemplifies the case where the rear part of the long double-opening door 10 is opened, but in the case where the front part is opened, the opening process is completely symmetrical.

FIG. 35 more specifically illustrates structural diagrams of Model 1313b according to the eleventh embodiment. FIG. 35(a) is a back view (inner side of the door) of a long double-opening door device. FIG. 35(b) is a plan view. FIG. 35(c) is a front view (outer side of the door). FIG. 35(d) is a plan view illustrating a transient state in opening the rear part of the long double-opening door 10. FIG. 35(e) is a plan view illustrating a state where the rear part of the long double-opening door 10 is opened. FIG. 35(d) illustrates that, when first rotary actuators 823a, 823b rotate first links 821a, 821b by $\theta 1$ 834a and second rotary actuators 824a, 824b rotate second links 822a, 822b by $\theta 2$ 834b, $\theta 1+\theta 2=0$, $\theta 3=0$ and $\theta 1+\theta 2+\theta 3=0$ are established. FIG. 35(e) illustrates that, when third rotary actuators 825a, 825b rotate a door-side bracket 810 by $\theta 3$ 834c, $\theta 1+\theta 2=0$, $\theta 3>0$ and $\theta 1+\theta 2+\theta 3>0$ are established. Further, a lock solenoid 731c directly connects a door-side bracket 710 to a body-side bracket 730 to form a substantially triangular truss structure 750 together with lock solenoids 731a, 731b and lock pins 732a, 732b. Thus, FIG. 35 illustrates that a structure of high rigidity is provided in which the door and the vehicle body are integrated.

Twelfth Embodiment

The twelfth embodiment is associated with a long double-opening door (symmetrical double opening) based on intermediate members and using a long single-link two-stage swing mechanism of Model 1411. The opened state of Model 1411 can be selected from the first state (state suitable for the entry/exit of either front-seat occupants or rear-seat occupants) and the second state (state suitable for the simultaneous entry/exit of rear-seat occupants and rear-seat occupants). Model 1411 includes Models 1411a, 1411b, 1311c, 1411d and 1411e that depend on the angle of the door in the first state and the second state.

FIG. 23 illustrates movement explanatory diagrams of Models 1411a, 1411b, 1411c, 1411d and 1411e, i.e. illustrates the first state and the second state of the long double-opening door 10.

FIG. 30 illustrates schematic diagrams of a four-seat coupe installing Model 1411c according to the twelfth embodiment, i.e. illustrates a principal mechanism of the present invention in a transparent manner. FIG. 30(c) illustrates the first state and FIG. 30(d) illustrates the second state. FIG. 30 exemplifies the case where the rear part of the long double-opening door 10 is opened, but in the case where the front part is opened, the opening process is completely symmetrical. The configuration is the same as that of Model 1241 or 1311.

FIG. 31 more specifically illustrates structural diagrams of Model 1411c according to the twelfth embodiment. FIG. 31(a) is a back view to (inner side of the door) of a long double-opening door device. FIG. 31(b) is a plan view. FIG. 31(c) is a front view (outer side of the door). FIG. 31(d) is a plan view illustrating the first state. FIG. 31(e) is a plan view illustrating the second state. Thus, FIG. 31 shows that $\theta 1$ 634a and $\theta 2$ 634b establish a relation $\theta 1+\theta 2>0$. Models 1411a, 1411b, 1411d and 1411e can be treated in the same way as Model 1411c by changing $\theta 1$ 634a and $\theta 2$ 634b. Further, the lock solenoid 631c directly connects the door-side bracket 610 and the body-side bracket 630 to form the substantially triangular truss structure 650 together with the lock solenoids 631a, 631b and the lock pins 632a, 632b. Thus, FIG. 31 illustrates that a structure of high rigidity is provided in which the door and the vehicle body are integrated.

Thirteenth Embodiment

The thirteenth embodiment is associated with a long double-opening door (symmetrical double opening) based on intermediate members and using a double-link A two-stage swing mechanism of Model 1412. The opened state of Model 1412 can be selected from the first state (state suitable for the entry/exit of either front-seat occupants or rear-seat occupants) and the second state (state suitable for the simultaneous entry/exit of front-seat occupants and rear-seat occupants). Model 1412 includes Models 1412a, 1412b, 1412c, 1412d and 1412e that depend on the angle of the door in the first state and the second state.

FIG. 24 illustrates movement explanatory diagrams of Models 1412a, 1412b, 1412c, 1412d and 1412e according to the thirteenth embodiment, i.e. illustrates the first state and the second state of the long double-opening door 10. Compared to Models 1411a, 1411b, 1411c, 1411d and 1411e, use of a double link can reduce the space by the side of the vehicle body 1, which is required for the opening/closing of the long double-opening door 10.

FIG. 32 illustrates schematic diagrams of a four-seat coupe installing Model 1412a according to the thirteenth embodiment, i.e. illustrates a principal mechanism of the present invention in a transparent manner. FIG. 32(c) illustrates the first state. FIG. 32(d) illustrates the second state. FIG. 32 exemplifies the case where the rear part of the long double-opening door 10 is opened, but in the case where the front part is opened, the opening process is completely symmetrical. The configuration is the same as that of Model 1312.

FIG. 33 more specifically illustrates structural diagrams of Model 1412a according to the thirteenth embodiment. FIG. 33(a) is a back view (inner side of the door) of a long double-opening door device. FIG. 33(b) is a plan view. FIG. 33(c) is a front view (outer side of the door). FIG. 33(d) is a plan view illustrating the first state. FIG. 33(e) is a plan view illustrating the second state. FIG. 33(d) illustrates that, when the first rotary actuators 723a, 723b rotate the first links 721a, 721b by $\theta 1$ 734a, and the second rotary actuators 724a, 724b rotate the second links 722a, 722b by $\theta 2$ 734b, $\theta 1+\theta 2=0$, $\theta 3=0$ and $\theta 1+\theta 2+\theta 3=0$ are established. FIG. 33(e) illustrates that, when the second rotary actuators 724a, 724b is rotated in the direction opposite to the direction shown in 31(d) by $\theta 2$ 734b and the third rotary actuators 725a, 725b rotate the door-side bracket 710 by $\theta 3$ 734c, $\theta 1+\theta 3=0$, $\theta 2=0$ and $\theta 1+\theta 2+\theta 3=0$ are established. Models 1412b and 1412c can be treated in the same way as Model 1412a by changing $\theta 1$ 734a, $\theta 2$ 734b and $\theta 3$ 734c. Further, the lock solenoid 731c directly connects the door-side bracket 710 and the body-side bracket 730 to form the substantially triangular truss structure 750 together with the lock solenoids 731a, 731b and the lock pins 732a, 732b. Thus, FIG. 33 illustrates that a structure of high rigidity is provided in which the door and the vehicle body are integrated.

Fourteenth Embodiment

The fourteenth embodiment is associated with a long double-opening door (symmetrical double opening) based on intermediate members and using a double-link B two-stage swing mechanism of Model 1413. The opened state of Model 1413 can be selected from the first state (state suitable for the entry/exit of either front-seat occupants or rear-seat occupants) and the second state (state suitable for the simultaneous entry/exit of front-seat occupants and rear-seat occupants). Model 1413 includes Models 1413*b* and 1413*c*.

FIG. 25(*a*) illustrates a movement explanatory diagram of Model 1413*b* according to the fourteenth embodiment. The long double-opening door 10 is parallelly translated to realize the first state and then rotated to realize the second state. FIG. 25(*b*) illustrates a movement explanatory diagram of Model 1413*c*. The long double-opening door 10 is rotated to realize the first state (state suitable for the entry/exit of either front-seat occupants or rear-seat occupants), and parallelly translated to realize the second state (state suitable for the simultaneous entry/exit of front-seat occupants and rear-seat occupants). Compared to Models 1411*a*, 1411*b*, 1411*c*, 1411*d* and 1411*e*, Models 1413*b* and 1413*c* can enlarge the opening of the long double-opening door 10 and reduce the space by the side of the vehicle body 1, which is required for the opening/closing of the door.

FIG. 34 illustrates schematic diagrams of a four-seat coupe installing Model 1413*b* according to the fourteenth embodiment, i.e. illustrates a principal mechanism of the present invention in a transparent manner. FIG. 34 exemplifies the case where the rear part of the long double-opening door 10 is opened, but in the case where the front part is opened, the opening process is completely symmetrical. The configuration is the same as that of Model 1313.

FIG. 35 more specifically illustrates structural diagrams of Model 1413*b* according to the fourteenth embodiment. FIG. 35(*a*) is a back view (inner side of the door) of a long double-opening door device. FIG. 35(*b*) is a plan view. FIG. 35(*c*) is a front view (outer side of the door). FIG. 35(*e*) is a plan view illustrating a transient state in opening the rear part of the long double-opening door 10. FIG. 35(*e*) is a plan view illustrating the first state (state suitable for the entry/exit of either front-seat occupants or rear-seat occupants). FIG. 35(*d*) illustrates that, when the first rotary actuators 823*a*, 823*b* rotate the first links 821*a*, 821*b* by $\theta 1$ 834*a* and the second rotary actuators 824*a*, 824*b* rotate the second links 822*a*, 822*b* by $\theta 2$ 834*b*, $\theta 1 + \theta 2 = 0$, $\theta 3 = 0$ and $\theta 1 + \theta 2 + \theta 3 = 0$ are established. FIG. 35(*e*) illustrates that, when the third rotary actuators 825*a*, 825*b* rotate the door-side bracket 810 by $\theta 3$ 834*c*, $\theta 1 + \theta 2 = 0$, $\theta 3 > 0$ and $\theta 1 + \theta 2 + \theta 3 > 0$ are established. Further, the lock solenoid 831*c* directly connects the door-side bracket 810 and the body-side bracket 830 to form the substantially triangular truss structure 850 together with the lock solenoids 831*a*, 831*b* and the lock pins 832*a*, 832*b*. Thus, FIG. 35 illustrates that a structure of high rigidity is provided in which the door and the vehicle body are integrated.

Fifteenth Embodiment

The fifteenth embodiment is associated with a long double-opening door (asymmetrical double opening) based on intermediate members and using an asymmetrical opening swing mechanism which is a combination of a long single-link mechanism and a single-link mechanism of Model 1311+1241. In Model 1311+1241, either one of the front side and the rear side of Model 1311 has been replaced by Model 1241, considering that Model 1311 is heavier than Model 1241 and that there is a low necessity of mounting a model on both of the front side and the rear side of the long double-opening door. Model 1311+1241 includes Models 1311*a*+1241*a*, 1311*a*+1241*b*, 1311*a*+1241*c*, 1311*b*+1241*a*, 1311*b*+1241*b*, 1311*b*+1241*c*, 1311*c*+1241*a*, 1311*c*+1241*b* and 1311*c*+1241*c* that depend on the combination of the mechanisms mounted on the front side and the rear side of the long double-opening door. The operation of the models, and the schematic configuration and the specific structure of a four-seat coupe installing each of the models can all be described with a combination of two models. These models are partially explained.

FIG. 26(*a*) illustrates a movement explanatory diagram of Model 1311*a*+1241*a*. In the model, Model 1311*a* is mounted on the front side and Model 1241*a* is mounted on the rear side of the long double-opening door 10. When the front part is opened, Model 1241*a* is operated and when the rear side is opened, Model 1311*a* is operated. FIG. 26(*b*) illustrates a movement explanatory diagram of Model 1311*b*+1241*b*. In the model, Model 1311*b* is mounted on the front side and Model 1241*b* is mounted on the rear side of the long double-opening door 10. When the front part is opened, Model 1241*b* is operated and when the rear side is opened, Model 1311*b* is operated. The operations of Models 1241*a* and 1241*b* are as described in the eighth embodiment, and the operations of Models 1311*a* and 1311*b* are as described in the ninth embodiment.

Schematic diagrams illustrating a four-seat coupe installing Model 1311*b*+1241*b* correspond to the combination of the configuration diagrams of (a), (b) and (d) of FIG. 30 and the configuration diagrams of (a), (b) and (d) of FIG. 28. The configuration of Model 1241*b* is as described in the eighth embodiment and the configuration of Model 1311*b* is as described in the ninth embodiment.

Specific structural diagrams of Model 1311*b*+1241*b* correspond to the combination of the structural diagrams of (a), (b), (c) and (e) of FIG. 31 and the structural diagrams of (a), (b), (c) and (e) of FIG. 29.

Sixteenth Embodiment

The sixteenth embodiment is associated with a long double-opening door (asymmetrical double opening) based on intermediate members and using an asymmetrical opening swing mechanism which is the combination of a double-link A mechanism and a single-link mechanism of Model 1312+1241. In Model 1312+1241, either one of the front side and the rear side of Model 1312 has been replaced by Model 1241, considering that Model 1312 is heavier than Model 1241 and that there is a low necessity of mounting a model on both of the front side and the rear side of the long double-opening door. Model 1312+1241 includes Models 1312*a*+1241*a*, 1312*a*+1241*b*, 1312*a*+1241*c*, 1312*b*+1241*a*, 1312*b*+1241*b*, 1312*b*+1241*c*, 1312*c*+1241*a*, 1312*c*+1241*b* and 1312*c*+1241*c* that depend on the combination of the mechanisms mounted on the front side and the rear side of the long double-opening door. The operation of the models, and the schematic configuration and the specific structure of a four-seat coupe installing each of the models can all be described with a combination of two models. These models are partially described.

FIG. 26(*c*) illustrates a movement explanatory diagram of Model 1312*a*+1241*a*. In the model, Model 1312*a* is mounted on the front side and Model 1241*a* is mounted on the rear side of the long double-opening door 10. When the front part is opened, Model 1241*a* is operated and when the rear side is opened, Model 1312*a* is operated. FIG. 26(*d*) illustrates a movement explanatory diagram of Model 1312*b*+1241*b*. In the model, Model 1312*b* is mounted on the front side and Model 1241*b* is mounted on the rear side of the long double-opening door 10. When the front part is opened, Model 1241*a* is operated and when the rear side is opened, Model 1312a is operated. The operations of Models 1241a and 1241b are as described in the eighth embodiment, and the operations of Models 1312a and 1312b are as described in the tenth embodiment.

Schematic diagrams illustrating a four-seat coupe installing Model 1312a+1241a correspond to the combination of the configuration diagrams of (a), (b), (c) and (d) of FIG. 32 and the configuration diagrams of (a), (b) and (c) of FIG. 28. The configuration of Model 1241a is as described in the eighth embodiment and the configuration of Model 1312a is as described in the tenth embodiment.

Specific structural diagrams of Model 1312a+1241a correspond to the combination of the structural diagrams of (a), (b), (c), (d) and (e) of FIG. 33 and the structural diagrams of (a), (b), (c) and (d) of FIG. 29. The structure of Model 1241a is as described in the eighth embodiment, and the structure of Model 1312a is as described in the tenth embodiment.

Seventeenth Embodiment

The seventeen embodiment is associated with a long double-opening door (asymmetrical double opening) based on intermediate members and using an asymmetrical opening swing mechanism which is a combination of a double-link B mechanism and a single-link mechanism of Model 1313+1241. In Model 1313+1241, either one of the front side and the rear side of Model 1313 has been replaced by Model 1241, considering that Model 1313 is heavier than Model 1241 and that there is a low necessity of mounting a model on both of the front side and the rear side of the long double-opening door. Model 1313+1241 includes Models 1313b+1241a, 1313b+1241b and 1313b+1241c that depend on the combination of the mechanisms mounted on the front side and the rear side of the long double-opening door. The operation of the models, and the schematic configuration and the specific structure of a four-seat coupe installing each of the models can all be described with a combination of two models. These models are partially described.

FIG. 26(e) illustrates a movement explanatory diagram of Model 1313b+1241b. In the model, Model 1313b is mounted on the front side and Model 1241b is mounted on the rear side of the long double-opening door 10. When the front part is opened, Model 1241b is operated and when the rear side is opened, Model 1313b is operated. The operation of Model 1241b is as described in the eighth embodiment, and the operation of Model 1313b is as described in the eleventh embodiment.

Schematic structural diagrams of a four-seat coupe installing Model 1313b+1241b correspond to the combination of the schematic diagrams of (a), (b), (c) and (d) of FIG. 34 and the schematic diagrams of (a), (b) and (d) of FIG. 28. The configuration of Model 1241b is as described in the eighth embodiment and the configuration of Model 1313b is as described in the eleventh embodiment.

Specific structural diagrams of Model 1313b+1241b correspond to the combination of the structural diagrams of (a), (b), (c), (d) and (e) of FIG. 35 and the structural diagrams of (a), (b), (c) and (e) of FIG. 29. The structure of Model 1241b is as described in the eighth embodiment, and the structure of Model 1313b is as described in the eleventh embodiment.

Eighteenth Embodiment

The eighteenth embodiment is associated with a long double-opening door (asymmetrical double opening) based on intermediate members and using an asymmetrical one-way two-stage swing mechanism which is a combination of a long single-link mechanism and a single-link mechanism of Model 1411+1241. Model 1411+1241 includes Models 1411a+1241a, 1411a+1241b, 1411a+1241c, 1411b+1241a, 1411b+1241b, 1411b+1241c, 1411c+1241a, 1411c+1241b, 1411c+1241c, 1411d+1241a, 1411d+1241b, 1411d+1241c, 1411e+1241a, 1411e+1241b and 1411e+1241c that depend on the combination of the mechanisms mounted on the front side and the rear side of the long double-opening door. The operation of the models, and the schematic configuration and the specific structure of a four-seat coupe installing each of the models can all be described with a combination of two models. These models are partially described.

FIG. 27(a) illustrates a movement explanatory diagram of Model 1411c+1241b according to the eighteenth embodiment. In the model, Model 1411c is mounted on the front side and Model 1241b is mounted on the rear side of the long double-opening door 10. When the front part is opened, Model 1241b is operated and when the rear side is opened, Model 1411c is operated. The operation of Model 1241b is as described in the eighth embodiment, and the operation of Model 1411c is as described in the twelfth embodiment.

Schematic structural diagrams of a four-seat coupe installing Model 1411c+1241b correspond to the combination of the schematic diagrams of (a), (b), (c) and (d) of FIG. 30 and the schematic diagrams of (a), (b) and (d) of FIG. 28. The configuration of Model 1241b is as described in the eighth embodiment and the configuration of Model 1411c is as described in the twelfth embodiment.

Specific structural diagrams of Model 1411c+1241b correspond to the combination of the structural diagrams of (a), (b), (c), (d) and (e) of FIG. 31 and the structural diagrams of (a), (b), (c) and (e) of FIG. 29. The structure of Model 1241b is as described in the eighth embodiment, and the structure of Model 1411c is as described in the twelfth embodiment.

Ninteenth Embodiment

The nineteenth embodiment is associated with a long double-opening door (asymmetrical double opening) based on intermediate members and using an asymmetrical one-way two-stage swing mechanism which is a combination of a double-link mechanism A and a single-link mechanism of Model 1412+1241. Model 1412+1241 includes Models 1412a+1241a, 1412a+1241b, 1412a+1241c, 1412b+1241a, 1412b+1241b, 1412b+1241c, 1412c+1241a, 1412c+1241b, 1412c+1241c, 1412d+1241a, 1412d+1241b, 1412d+1241c, 1412e+1241a, 1412e+1241b and 1412e+1241c that depend on the combination of the mechanisms mounted on the front side and the rear side of the long double-opening door. The operation of the models, and the schematic configuration and the specific structure of a four-seat coupe installing each of the models can all be described with a combination of two models. These models are partially described.

FIG. 27(b) illustrates a movement explanatory diagram of Model 1412a+1241a according to the nineteenth embodiment. In the model, Model 1412a is mounted on the front side and Model 1241a is mounted on the rear side of the long double-opening door 10. When the front part is opened, Model 1241a is operated and when the rear side is opened, Model 1412a is operated. The operation of Model 1241a is as described in the eighth embodiment, and the operation of Model 1412a is as described in the thirteenth embodiment.

Schematic diagrams of a four-seat coupe installing Model 1412a+1241a correspond to the combination of the schematic diagrams of (a), (b), (c) and (d) of FIG. 32 and the schematic diagrams of (a), (b) and (c) of FIG. 28. The configuration of Model 1241a is as described in the eighth embodiment and the configuration of Model 1412a is as described in the thirteenth embodiment.

Specific structural diagrams of Model 1412a+1241a correspond to the combination of the structural diagrams of (a), (b), (c), (d) and (e) of FIG. 33 and the structural diagrams of (a), (b), (c) and (d) of FIG. 29. The structure of Model 1241a is as described in the eighth embodiment, and the structure of Model 1412a is as described in the thirteenth embodiment.

Twentieth Embodiment

The twentieth embodiment is associated with a long double-opening door (asymmetrical double opening) based on intermediate members and using an asymmetrical one-way two-stage swing mechanism which is a combination of a double-link B mechanism and a single-link mechanism of Model 1413+1241. Model 1413+1241 includes Models 1413b+1241a, 1413b+1241b, 1413b+1241c, 1413c+1241a, 1413c+1241b and 1413c+1241c that depend on the combination of the mechanisms mounted on the front side and the rear side of the long double-opening door. The operation of the models, and the schematic configuration and the specific structure of a four-seat coupe installing each of the models can all be described with a combination of two models. These models are partially described.

FIG. 27(c) illustrates a movement explanatory diagram of Model 1413b+1241a according to the twentieth embodiment. In the model, Model 1413b is mounted on the front side and Model 1241a is mounted on the rear side of the long double-opening door 10. When the front part is opened, Model 1241a is operated and when the rear side is opened, Model 1413b is operated. FIG. 27(d) illustrates a movement explanatory diagram of Model 1413c+1241b. In the model, Model 1413c is mounted on the front side and Model 1241b is mounted on the rear side of the long double-opening door 10. When the front part is opened, Model 1241b is operated and when the rear side is opened, Model 1413c is operated. The operation of Model 1241a is as described in the eighth embodiment, and the operation of Model 1413b or 1413c is as described in the fourteenth embodiment.

Schematic diagrams of a four-seat coupe installing Model 1413b+1241a correspond to the combination of the schematic diagrams of (a), (b), (c) and (d) of FIG. 34 and the schematic diagrams of (a), (b) and (d) of FIG. 28. The configuration of Model 1241a is as described in the eighth embodiment and the configuration of Model 1413b is as described in the fourteenth embodiment.

Specific structural diagrams of Model 1413b+1241a correspond to the combination of the structural diagrams of (a), (b), (c), (d) and (e) of FIG. 35 and the structural diagrams of (a), (b), (c) and (e) of FIG. 29. The structure of Model 1241a is as described in the eighth embodiment, and the structure of Model 1413b is as described in the fourteenth embodiment.

Referring now to FIGS. 36, 37, 38 and 39, hereinafter is described an opening/closing control of the long double-opening door 10 according to the eighth to the twentieth embodiments. FIG. 36 illustrates a configuration diagram of motive-power drive control system common to the eighth to the twentieth embodiments. FIG. 37 illustrates flow diagrams (1) for motive-power drive control that is a control for opening the long double-opening door 10. FIG. 38 illustrates flow diagrams (2) for motive-power drive control that is a control for closing the long double-opening door 10. FIG. 39 illustrates an appearance diagram of a remote controller.

FIG. 36 illustrates a configuration diagram of motive-power drive control system for all of the models, i.e. Models 124, 131, 141, 131+124 and 141+124. Since the configuration is bilaterally symmetrical, FIG. 36 indicates only the right side of the configuration. Operation parts 635, 735, 835 perform a predetermined operation upon reception of an input signal from the switch of a controller 900 or from door-position sensors 633a, 733a, 833a, 633b, 733b, 833b to output the results of the operation to control parts 636, 736, 836. The door-position sensors 633a, 733a, 833a, 633b, 733b, 833b have a function of detecting that the long double-opening door 10 is correctly closed. The control parts 636, 736, 836 have a function of controlling the lock solenoids 631a, 731a, 831a, 631b, 731b, 831b, 631c, 731b, 831c as well as the first rotary actuators 623a, 723a, 823a, 623b, 723b, 823b, the second rotary actuators 624a, 724a, 824a, 624b, 724b, 824b and the third rotary actuators 725a, 825a, 725b, 725b. The rotary actuators each incorporate a rotary encoder to enable rotation by a designated angle.

FIG. 37 illustrates flow diagrams for controlling the motive-power drive mechanisms of Models 124, 131, 141, 131+124, 141+124. Since the flow diagrams are each bilaterally symmetrical, FIG. 37 indicates only the right sides of the diagrams. FIG. 37(a) illustrates an open switch detection flow 911 for detecting the instruction for opening the long double-opening door 10, the flow being installed in the control parts 635, 735, 835. With this flow, an operated switch is identified to start a door control flow corresponding to the identified switch. FIG. 37(b) illustrates one of the door control flows installed in the control parts 636, 736, 836. Specifically, FIG. 37(b) illustrates a RR1 OPEN door control flow 912a for opening the right rear of the long double-opening door 10 to realize the first state (state suitable for the entry/exit of either front-seat occupants or rear-seat occupants). FIG. 37(c) illustrates a close switch detection flow 913 for detecting the instruction for closing the long double-opening door 10, the flow being installed in the control parts 635, 735, 835. FIG. 37(d) illustrates a RR1 CLOSE door control flow 914a for closing the right rear of the long double-opening door 10, the flow being installed in the control parts 636, 736, 836.

FIG. 38 illustrates an appearance diagram of the remote controller 900 used for the automatic door mechanism (motive-power drive mechanism) for any one of the models, i.e. Models, 124, 131, 141, 131+124, 141+124. Switches 902a, 902b, 902c, 902d are used for the operation of opening the right long double-opening door 10, while switches 902e, 902f, 902g, 902h are used for the operation of opening the left long double-opening door 10. The switches 902a, 902c, 902f, 902g open the door to realize the first state, while the switches 902b, 902d, 902e, 902h open the door to realize the second state. A switch 902i is used for the operation of closing the long double-opening door 10 that has been opened. The switches are all adapted to function while being depressed and stop functioning when released. The remote controller 900 has a grip portion on which a safety switch 901 is mounted. When the safety switch 901 is not correctly held, none of the switches can be operated. In Models 124, 131, 141, 131+124, 141+124, unnecessary switches, if any, among the switches 902a, 902b, 902c, 902d, 902e, 902f, 902g, 902h are not mounted.

Referring to FIGS. 36, 37 and 38, hereinafter is described the control for opening the rear part of the right long double-opening door 10 in Model 1241. When the RR1 switch 902c of the remote controller 900 is depressed in a state where the safety switch 901 is being depressed, the operation part 635 detects this using the open switch detection flow 911. The control part 636 drives the lock solenoid (rear side) 631b provided at the intermediate part (rear side) 620b and the lock solenoid (center) 631*c* provided at the door-side bracket 610, using the RR1 OPEN door control flow 912*a*. As a result, the pins are pulled out of the body-side bracket 630 to allow the long double-opening door 10 to be opened/closed. The lock solenoid (rear side) 631*b* and the lock solenoid (front side) 631*a* cannot be simultaneously operated and therefore the long double-opening door 10 will not fall. The control part 636 controls the first rotary actuator (front side) 623*a* to rotate and drive the first link (front side) 621*a* and also controls the second rotary actuator (front side) 624*a* to rotate and drive the long double-opening door 10 to thereby open the long double-opening door 10 realizing the first state.

Regarding the control for opening the rear part of the right long double opening door 10 in Models 1311 and 1411, hereinafter are described differences of the control from the control of Model 1241. When the RR1 switch 902*c* or the RR2 switch 902*d* is depressed, the control part 636 opens the long double-opening door 10, in Model 1311, to realize the second state, using the RR1 OPEN door control flow 912*a* or the RR2 OPEN door control flow. In Model 1411, upon depression of the switch 902*c*, the door is opened to realize the first state and, upon depression of the switch 902*d*, the door is opened to realize the second state, using the flow. In Models 1241, 1311 and 1411 as well, the similar description is applicable to the control for opening the front part of the right long double-opening door 10, the control for opening the rear part of the left long double-opening door 10, and the control for opening the front part of the left long double-opening door 10. Also, the differences between all of the models belonging to Models 1241, 1311 and 1411 depend on the difference between the rotation angle θ1 of the first rotary actuators 623*a*, 623*b* and the rotation angle θ2 of the second rotary actuators 624*a*, 624*b*.

Referring to FIGS. 36 and 37, hereinafter is described the control for opening the rear part of the right long double-opening door 10 in Models 1312 and 1313. When the RR2 switch 902*d* of the remote controller 900 is depressed while the safety switch 901 is being depressed, the operation parts 735, 835 each detect this using the open switch detection flow 911. Meanwhile, the control parts 736, 836 drive the lock solenoids (rear side) 731*b*, 831*b* provided at the intermediate members (rear side) 720*b*, 820*b* and the lock solenoids (center) 731*c*, 831*c* provided at the door-side brackets 710, 810, using the RR2 OPEN door control flow. As a result, the pins are pulled out of the body-side brackets 730, 830 to allow the long double-opening door 10 to be opened/closed. Then, the first rotary actuators (front side) 723*a*, 823*a* are controlled to rotate and drive the first links (front side) 721*a*, 821*a*, the second rotary actuators (front side) 724*a*, 824*a* are controlled to rotate and drive the second links (front side) 722*a*, 822*a*, and the third rotary actuators (front side) 725*a*, 825*a* are controlled to rotate and drive the long double-opening door 10, whereby the long double-opening door 10 is opened realizing the second state.

Regarding the control for opening the rear part of the right long double-opening door 10 in Models 1412 and 1413, hereinafter are described the differences of the control from the control of Model 1241. When the RR1 switch 902*c* is depressed, the control parts 736, 836 open the right long double-opening door 10 to realize the first state (state suitable for the entry/exit of either front-seat occupants or rear-seat occupants). When the RR2 switch 902*d* is depressed, the control parts 736, 836 open the door to realize the second state. In Models 1312, 1313, 1412 and 1413, the same description is applicable to the control for opening the front part of the right long double-opening door 10, the control for opening the rear part of the left long double-opening door 10 and the control for opening the front part of the left long double-opening door 10. Also, the differences between all of the models belonging to Models 1312, 1313, 1412 and 1413 depend on the difference between the rotation angle θ1 of the first rotary actuators (front side) 723*a*, 823*a*, the rotation angle θ2 of the second rotary actuators (front side) 724*a*, 824*a* and the third rotary actuators (front side) 725*a*, 825*a*.

Referring to FIGS. 36, 37 and 38, hereinafter is described the control for closing the rear part of the right long double-opening door 10 in Models 1241, 1311, 1312, 1313, 1411, 1412 and 1413. When the CLOSE switch 902*i* is depressed in the state, for example, where the rear part of the right long double-opening door 10 is opened realizing the first state, the control parts 636, 736, 836 close the long double-opening door 10 using the RR1 CLOSE door control flow 914*a*. In Models 1241, 1311, 1312, 1313, 1411, 1412 and 1413, the same description is also applicable to the control for closing the front part of the right long double-opening door 10, the control for closing the rear part of the left long double-opening door 10 and the control for closing the front part of the left long double-opening opening door 10. Also, the differences between all of the models belonging to Models 1241, 1311, 1312, 1313, 1411, 1412 and 1413 depend on the difference between the rotation angles θ1 640*a*, 740*a*, 840*a* of the first rotary actuators, the rotation angles θ2 640*b*, 740*b*, 840*b* of the second rotary actuators, and the rotation angles θ2 640*c*, 840*c* of the third rotary actuators.

The controls of Models 1311+1241, 1312+1241, 1313+1241, 1411+1241, 1412+1421 and 1413+1421 are each the combination of the controls of Models 1241, 1311, 1312, 1313, 1411, 1412 and 1413. In the models, the control for opening the rear part of the long double-opening door 10 is the same as Models 1311, 1312, 1313, 1411, 1412 and 1413, and the control for opening the front part is the same as Model 1241.

INDUSTRIAL APPLICABILITY

Besides coupes in particular, the door device of the present invention exerts effect in cabriolets and small hatchbacks. In the former cars, a high-rigidity and low-weight design is available using the doors as a part of the vehicle structure. In the latter cars, a variety of luggage can be loaded in the space of the vehicle, owing to the combination of the large door opening area and the seat-folding mechanism.

BRIEF DESCRIPTION OF THE DRAWINGS

FIG. 1 illustrates an entry/exit scenarios comparison table (1);

FIG. 2 illustrates schematic diagrams of a four-seat coupe installing a long double-opening door device (single-hinge mechanism) based on intermediate members;

FIG. 5 illustrates appearance diagrams of a four-seat coupe installing a long double-opening door device (multi-joint link mechanism) based on intermediate members;

FIG. 6 illustrates structural diagrams of a long double-opening door device (multi-joint link mechanism) based on intermediate members;

FIG. 15 illustrates a mechanism comparison table of long double-opening doors (symmetrical double opening) based on intermediate members;

FIG. 16 illustrates a mechanism comparison table of long double-opening doors (asymmetrical double opening) based on intermediate members;

FIG. 17 illustrates a mechanism comparison table of long double-opening doors (symmetrical one-way two-stage double opening) based on intermediate members;

FIG. 18 illustrates an entry/exit scenario comparison table (2);

FIG. 24 illustrates movement explanatory diagrams of Models 1412*a*, 1412*b*, 1412*c*, 1412*d* and 1412*e*;

FIG. 25 illustrates movement explanatory diagrams of Models 1413*b* and 1413*c*;

FIG. 32 illustrates schematic diagrams of a four-seat coupe installing Model 1312*a* or 1412*a*;

FIG. 34 illustrates schematic diagrams of a four-seat coupe installing Model 1313*b* or 1413*b*;

EXPLANATION OF REFERENCES

Figure 3:
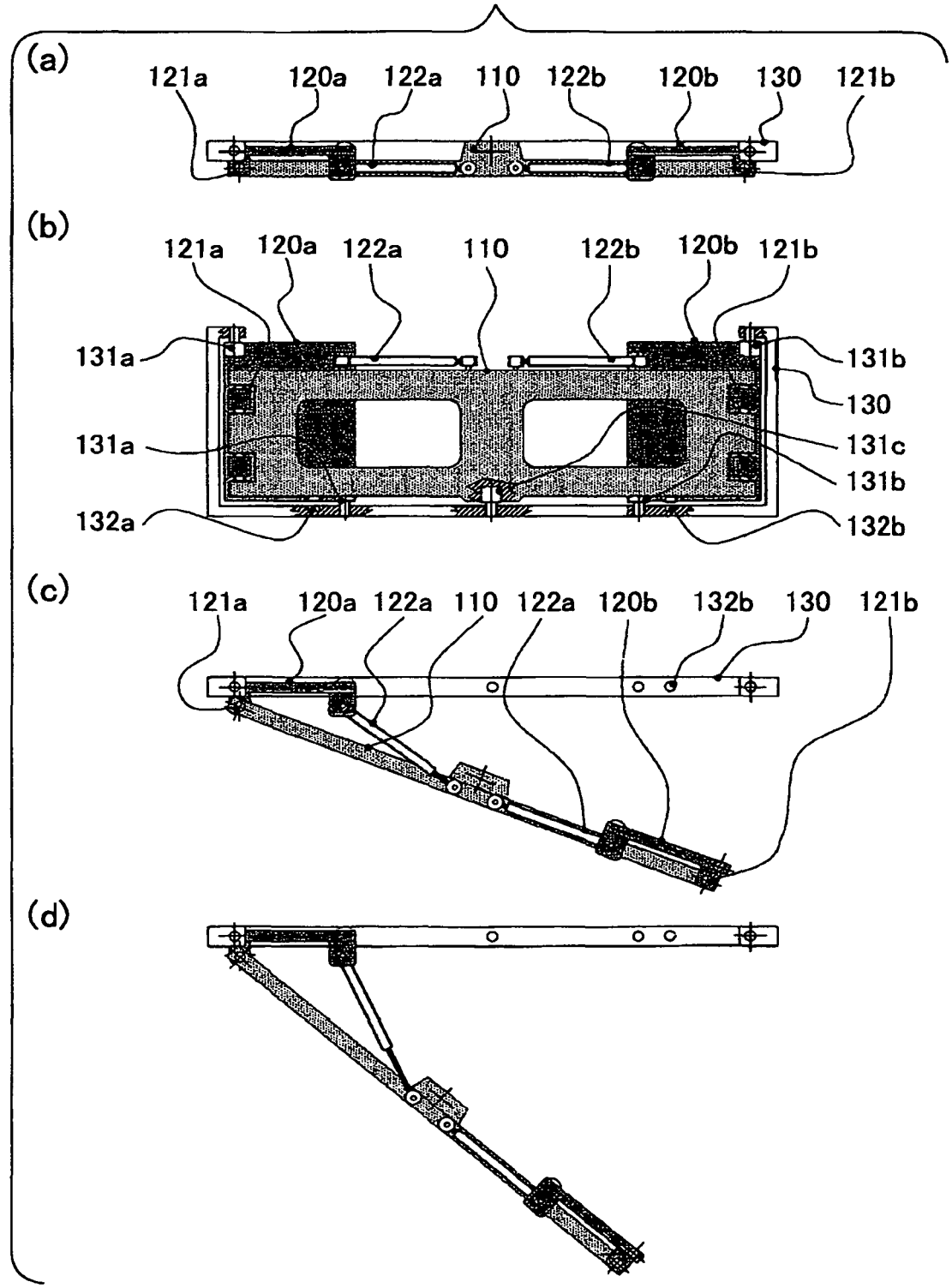
FIG. 3 illustrates structural diagrams of a long double-opening door device (single-hinge mechanism) based on intermediate members.
Figure 4:
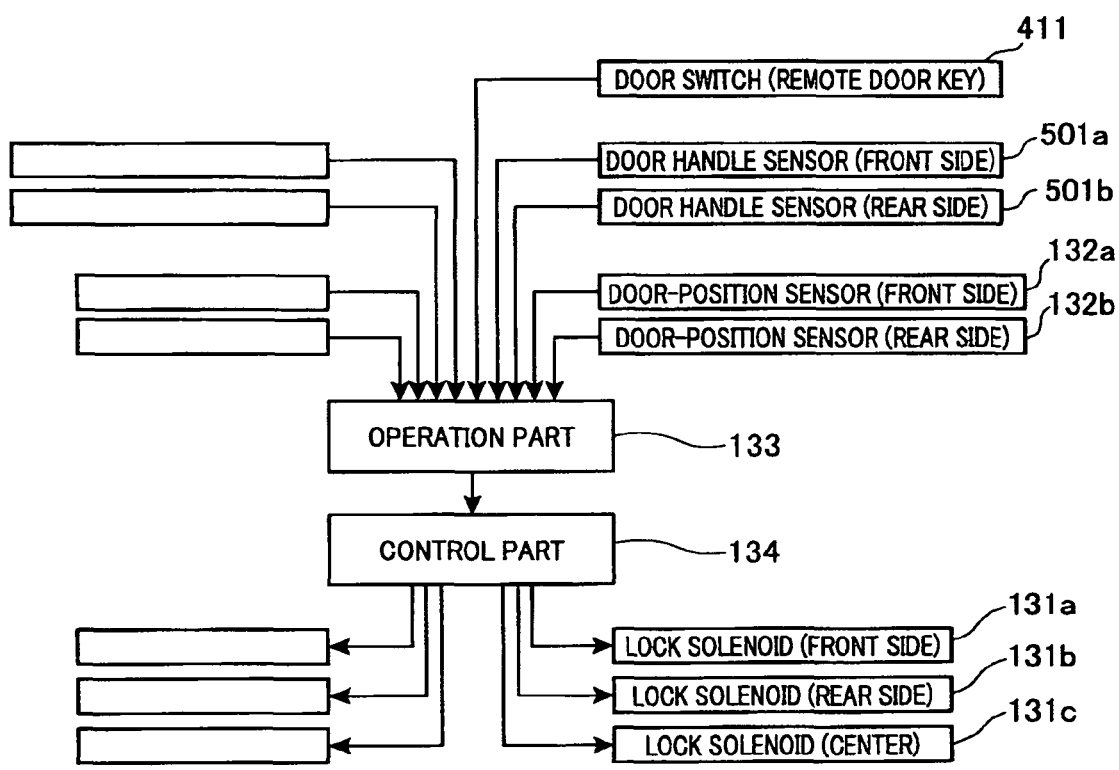
FIG. 4 illustrates a configuration diagram of a control system for a long double-opening door device (single-hinge mechanism) based on intermediate members.
Figure 7:
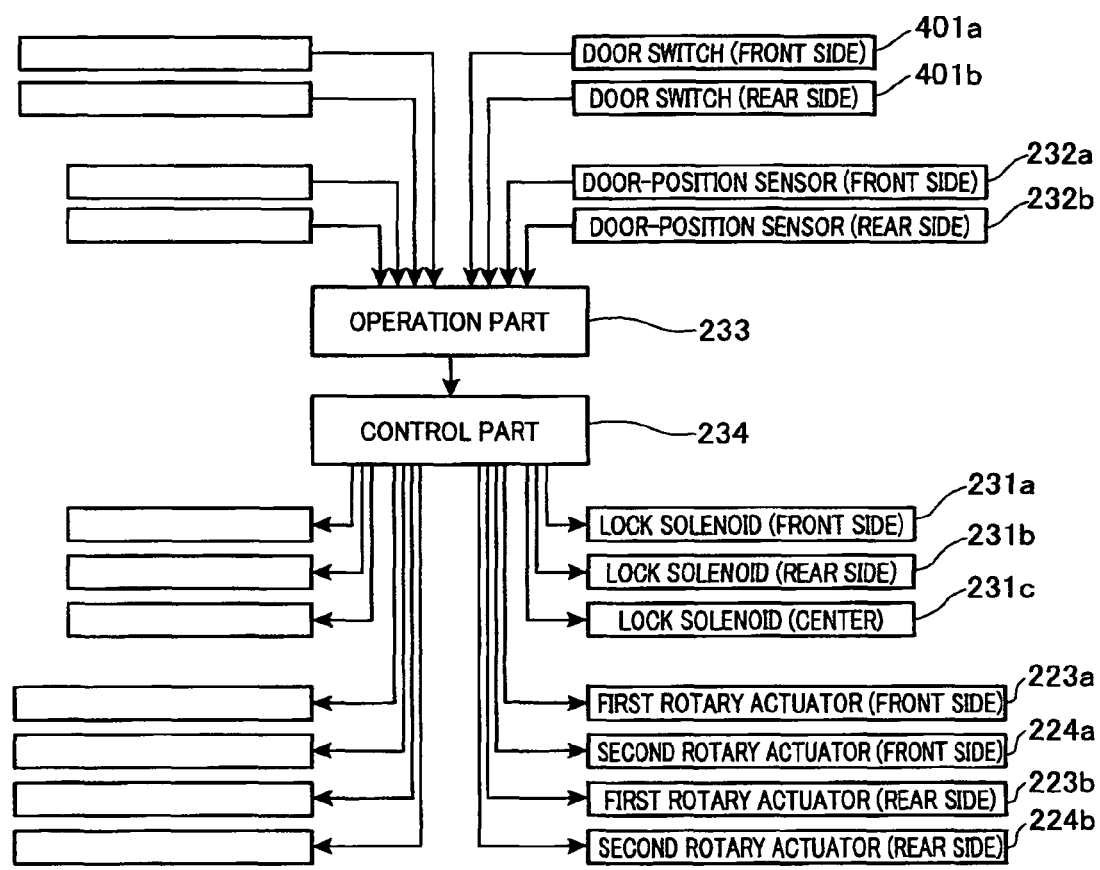
FIG. 7 illustrates a configuration diagram of a control system for a long double-opening door device (multi-joint link mechanism and motive-power drive mechanism) based on intermediate members.
Figure 8:
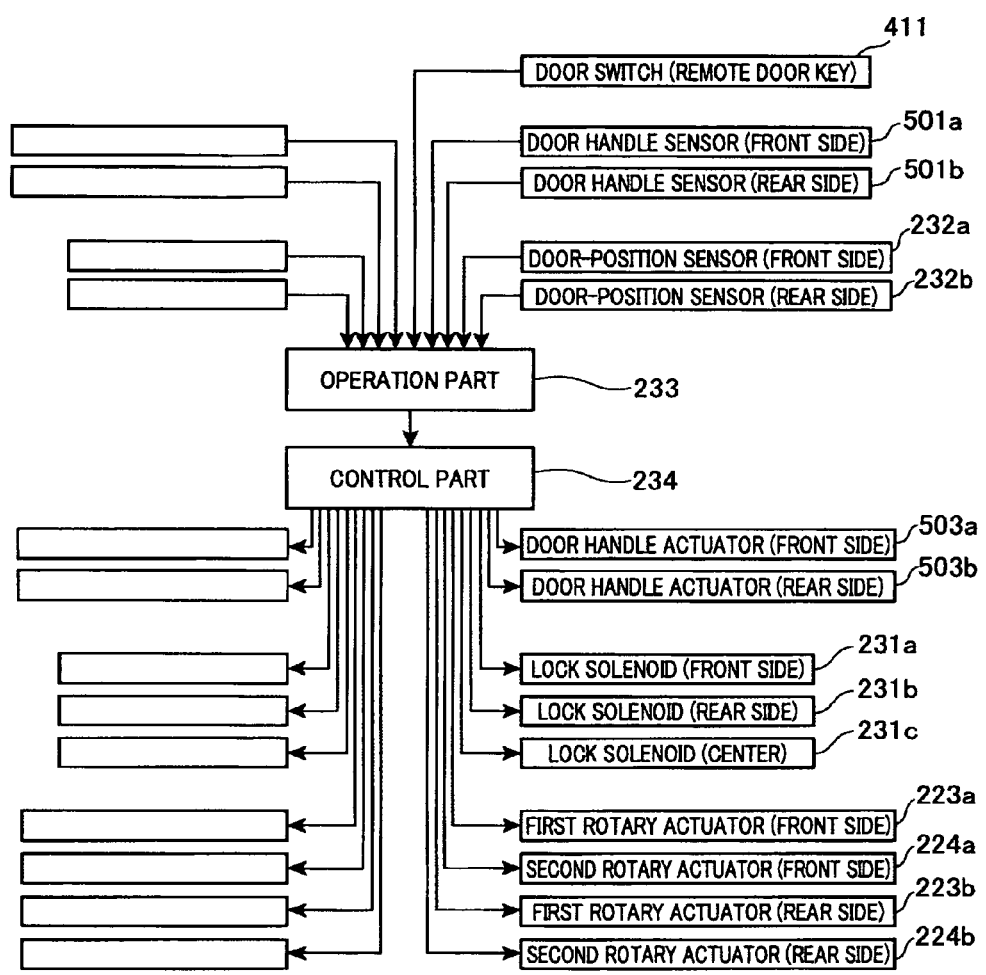
FIG. 8 illustrates a configuration diagram of a control system for a long double-opening door device (multi-joint link mechanism and assist-drive mechanism) based on intermediate members.
Figure 9:
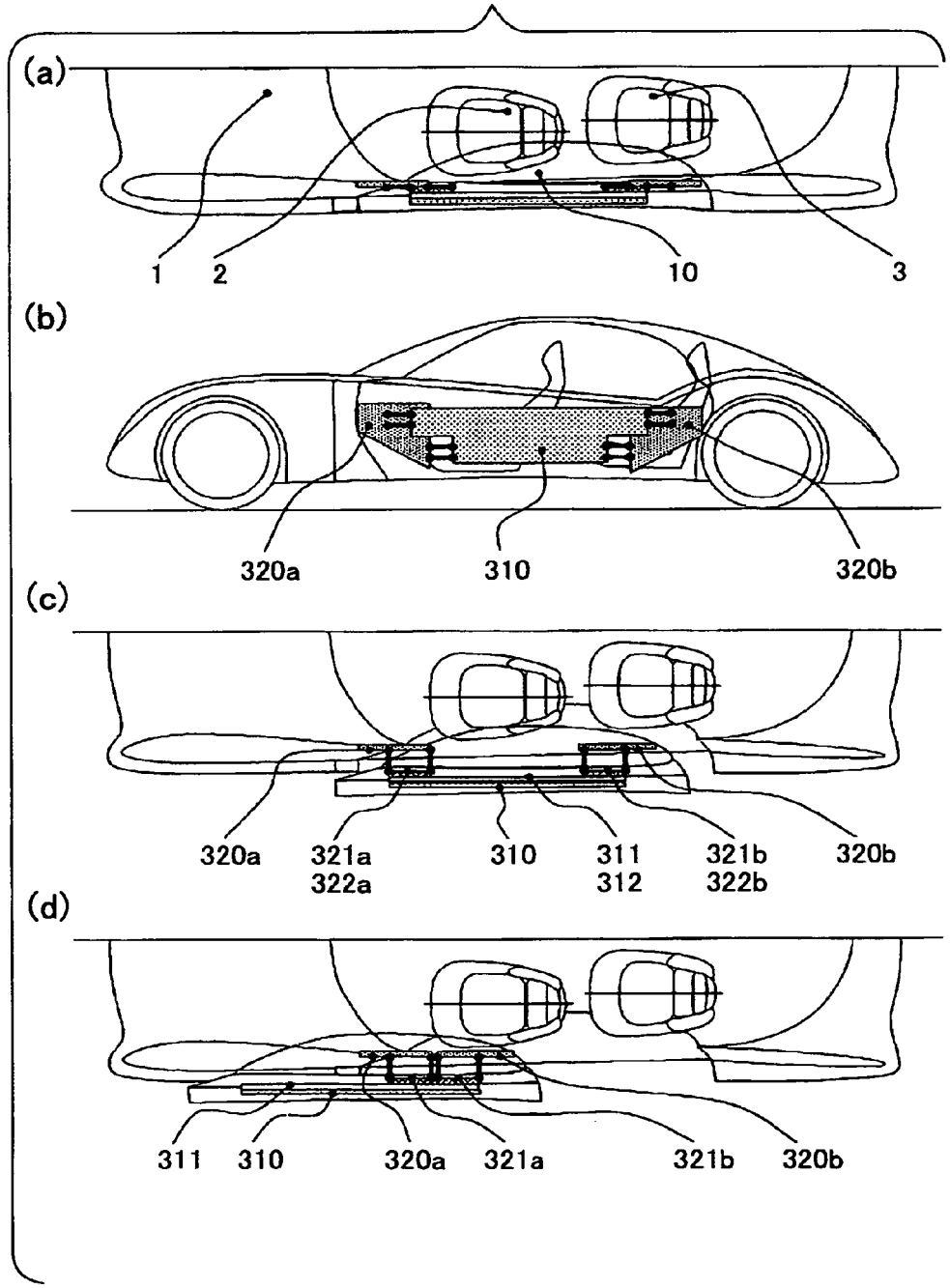
FIG. 9 illustrates schematic diagrams of a four-seat coupe installing a long double-opening door device (slide mechanism) based on intermediate members.
Figure 10:
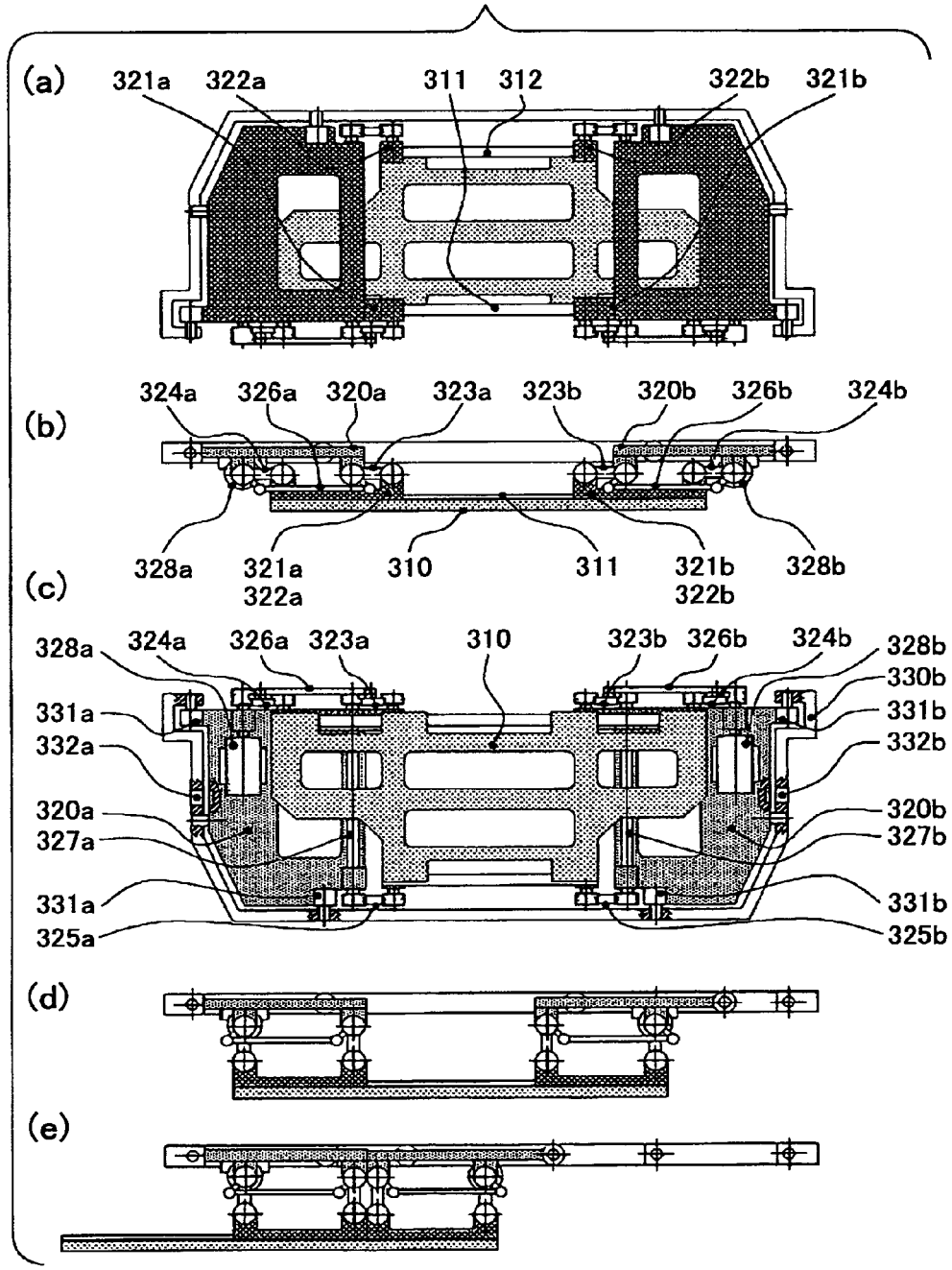
FIG. 10 illustrate structural diagrams of a four-seat coupe installing a long double-opening door device (slide mechanism) based on intermediate members.
Figure 11:
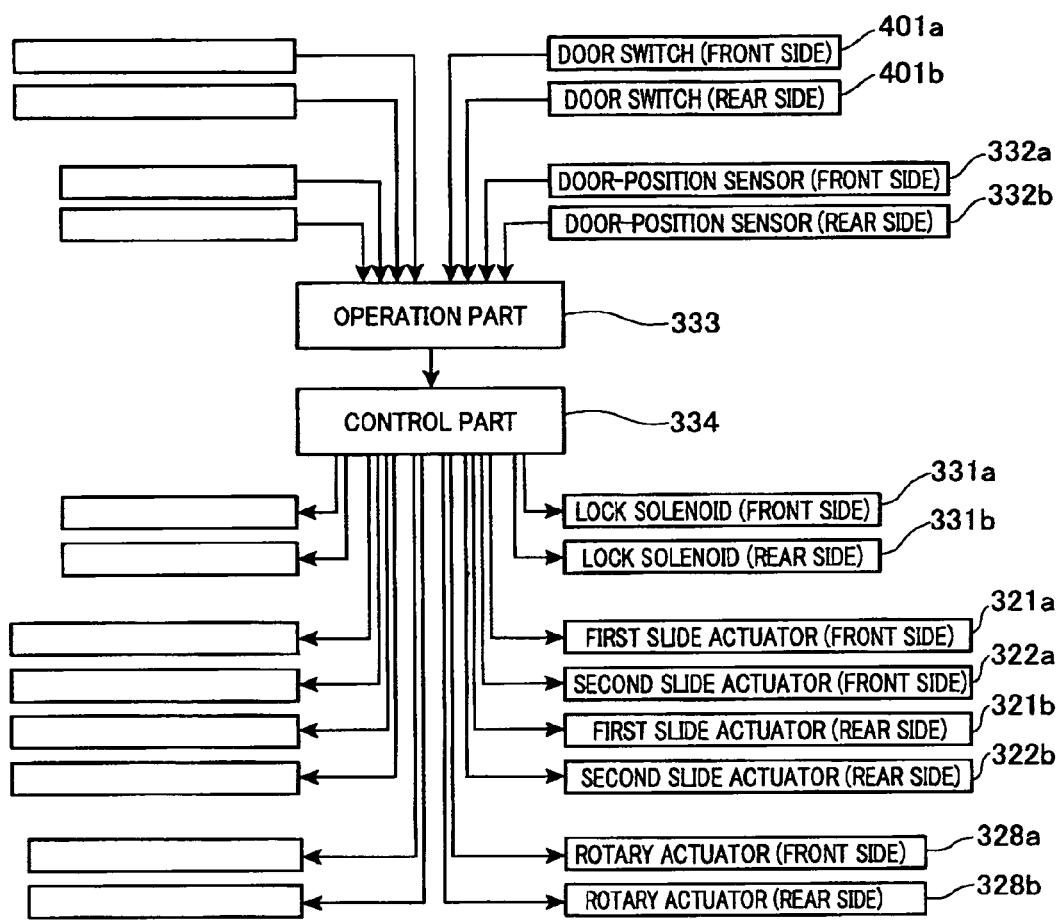
FIG. 11 illustrates a configuration diagram of a control system for a long double-opening door device (slide mechanism and motive-power drive mechanism) based on intermediate members.
Figure 12:
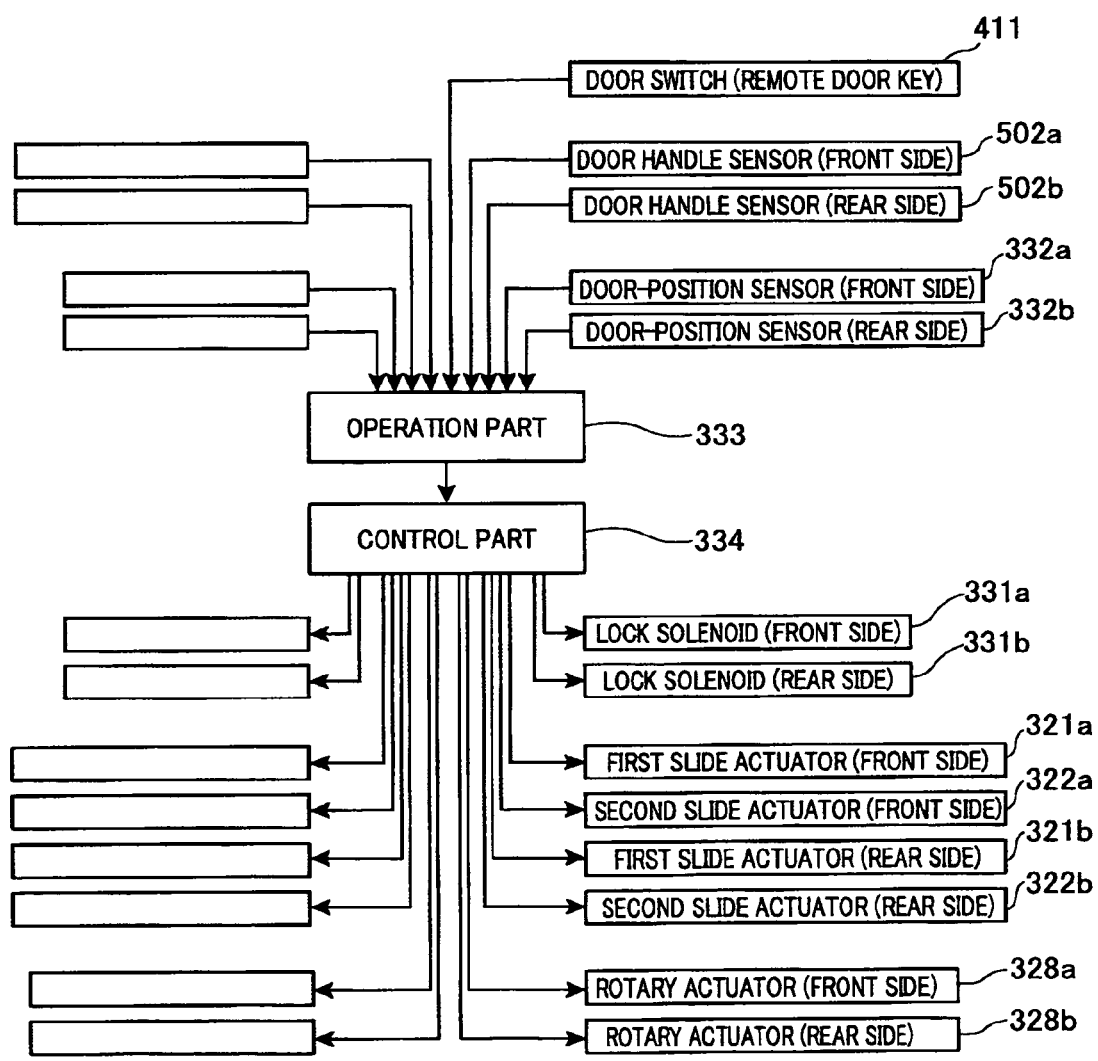
FIG. 12 illustrates a configuration diagram of a control system for a long double-opening door device (slide mechanism and assist-drive mechanism)
Figure 13:
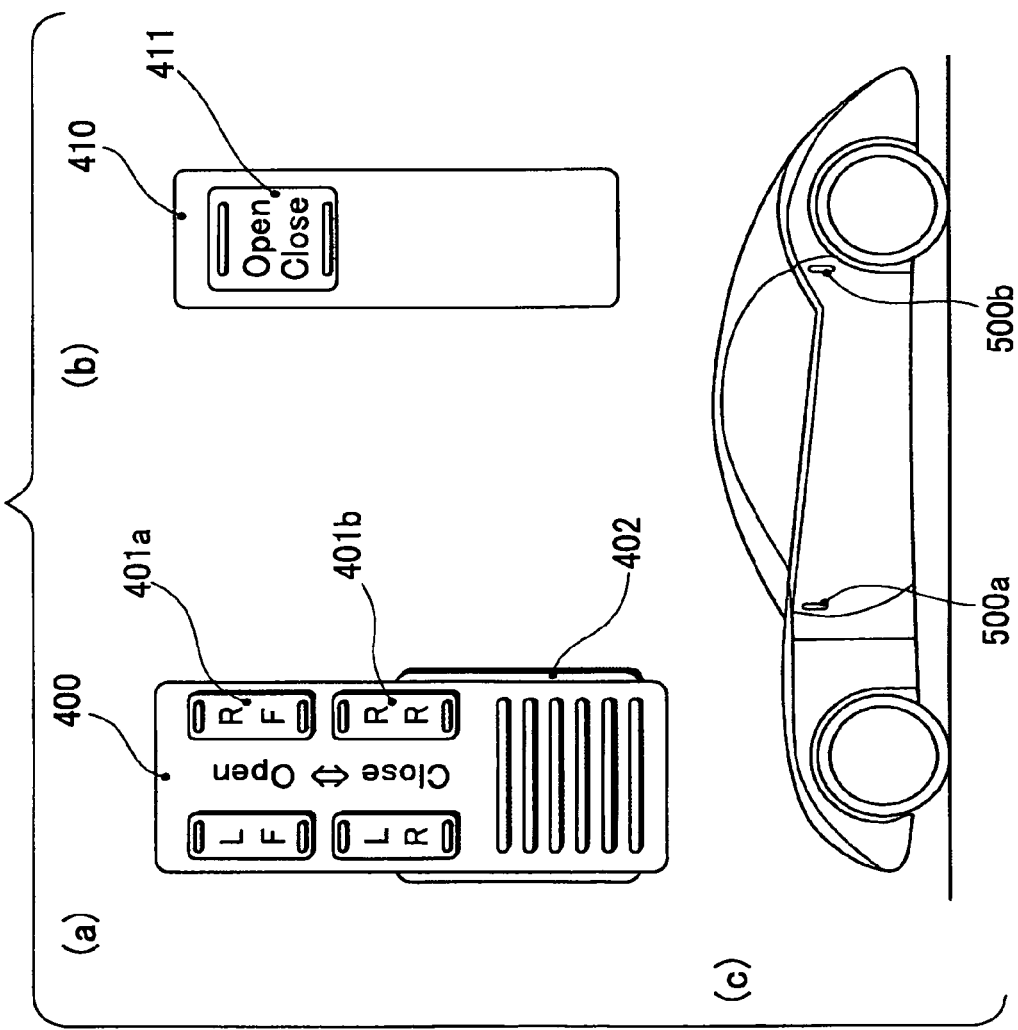
FIG. 13 illustrates appearance diagrams of a remote controller, a remote key and a coupe.
Figure 14:
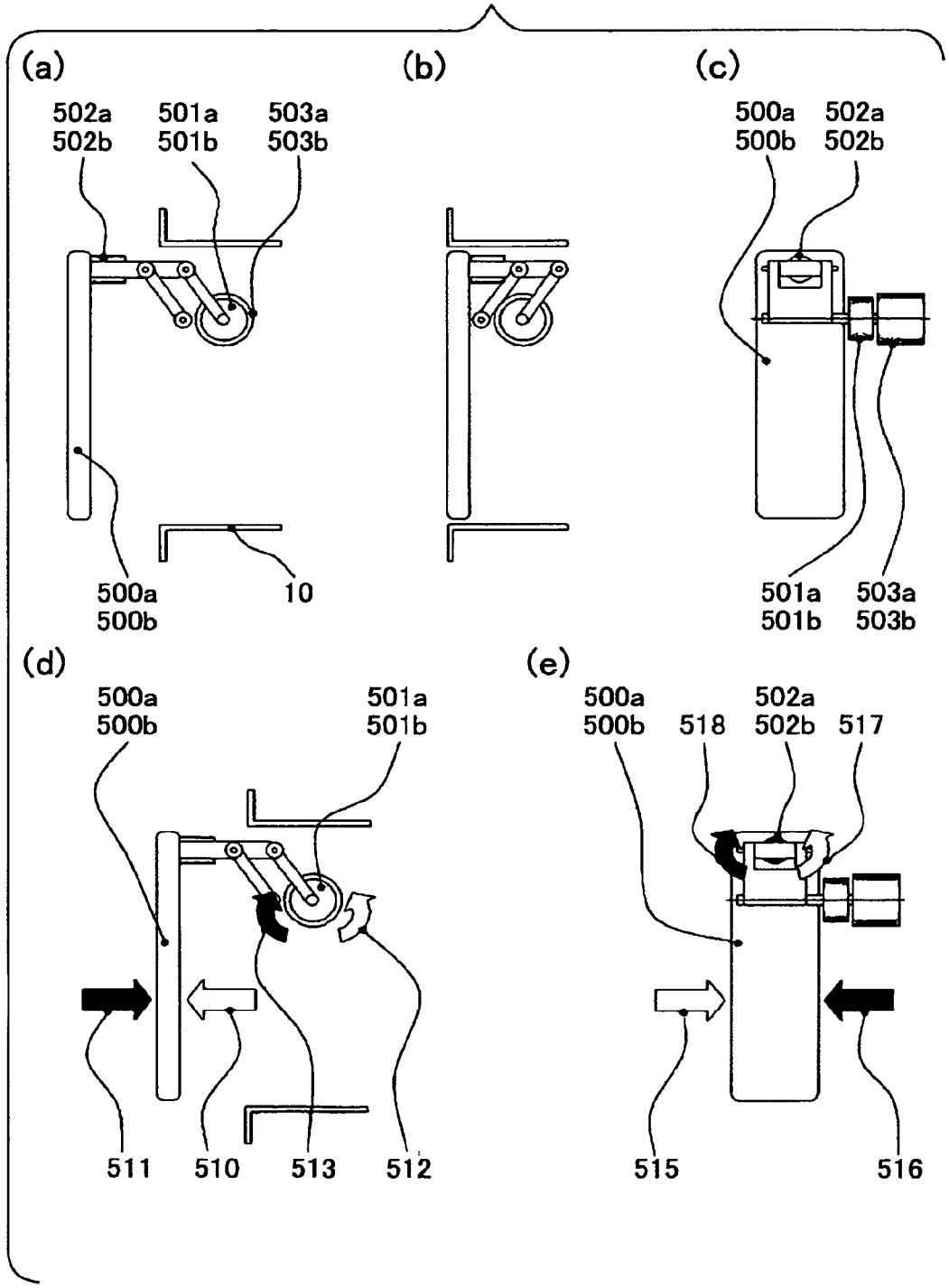
FIG. 14 illustrates structural diagrams of a retractable door handle.
Figure 19:
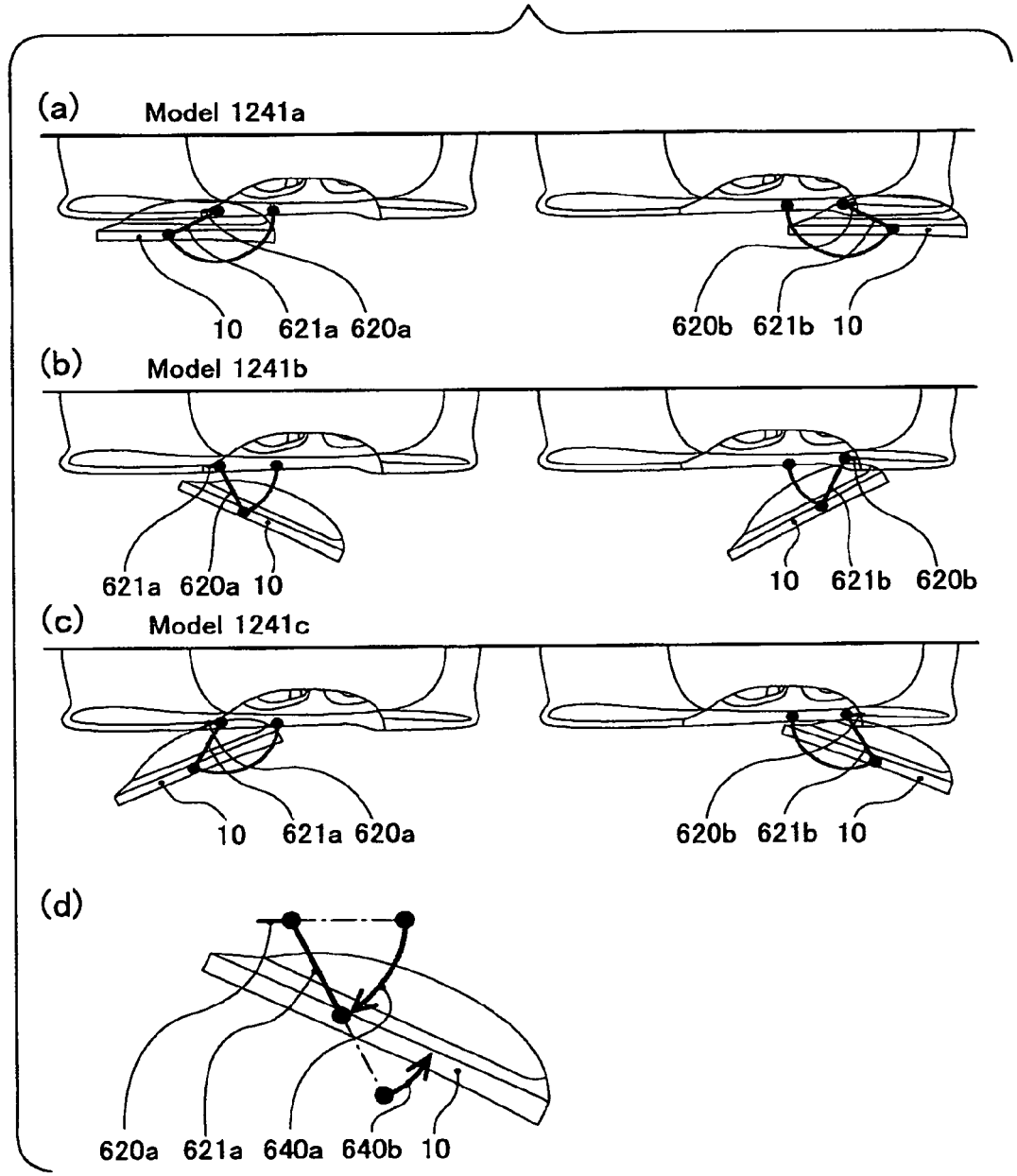
FIG. 19 illustrates movement explanatory diagrams of Models 1241*a*, 1241*b* and 1241*c*.
Figure 20:
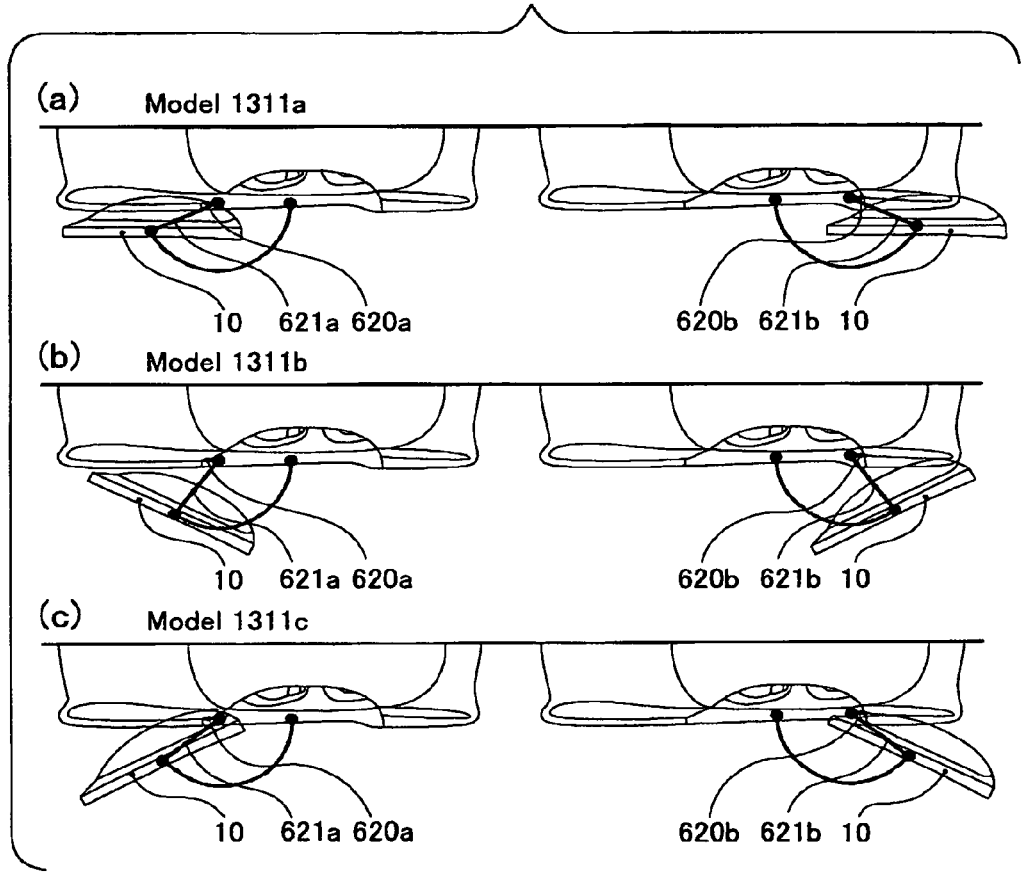
FIG. 20 illustrates movement explanatory diagrams of Models 1311*a*, 1311*b* and 1311*c*.
Figure 21:
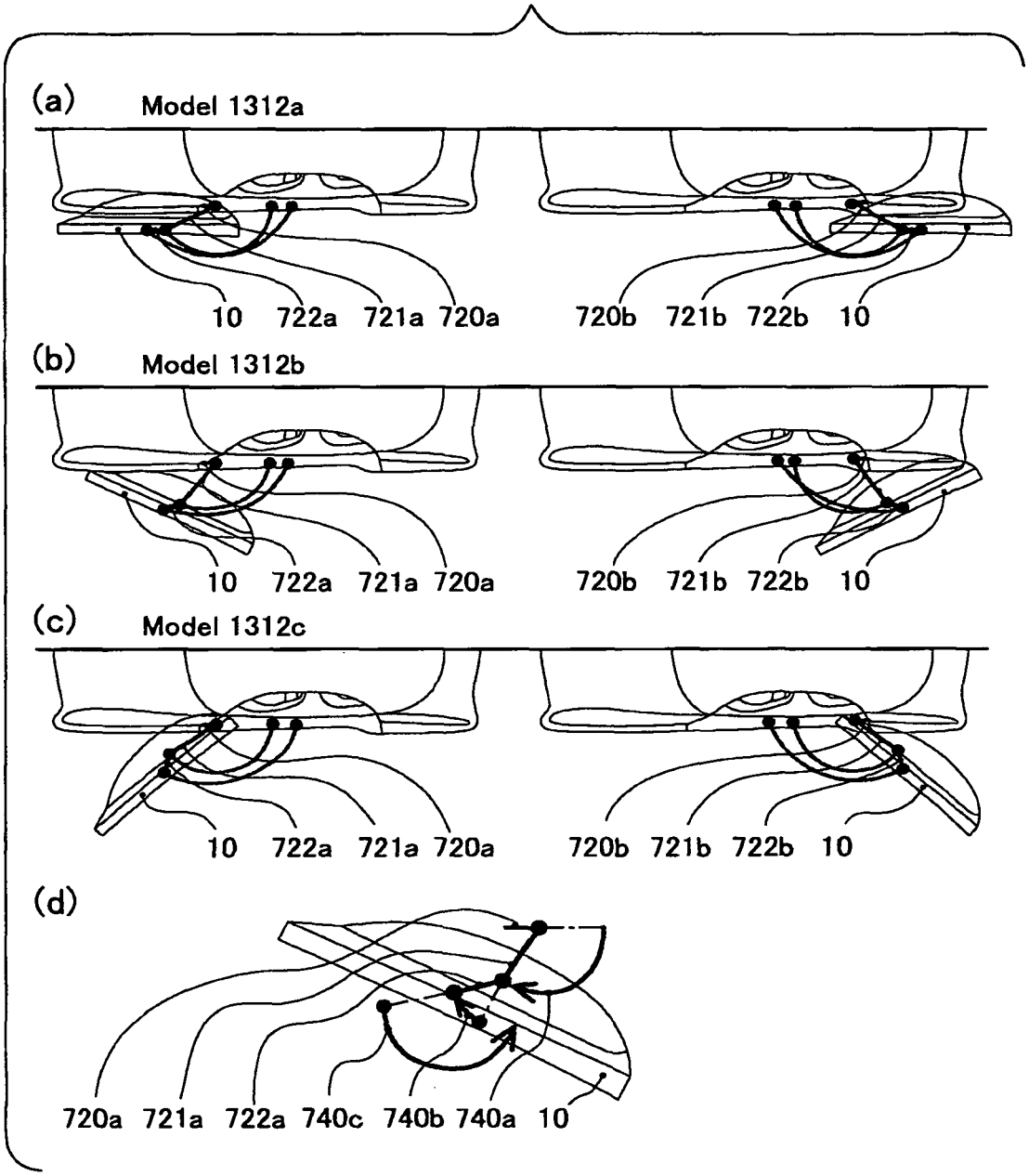
FIG. 21 illustrates movement explanatory diagrams of Models 1312*a*, 1312*b* and 1312*c*.
Figure 22:
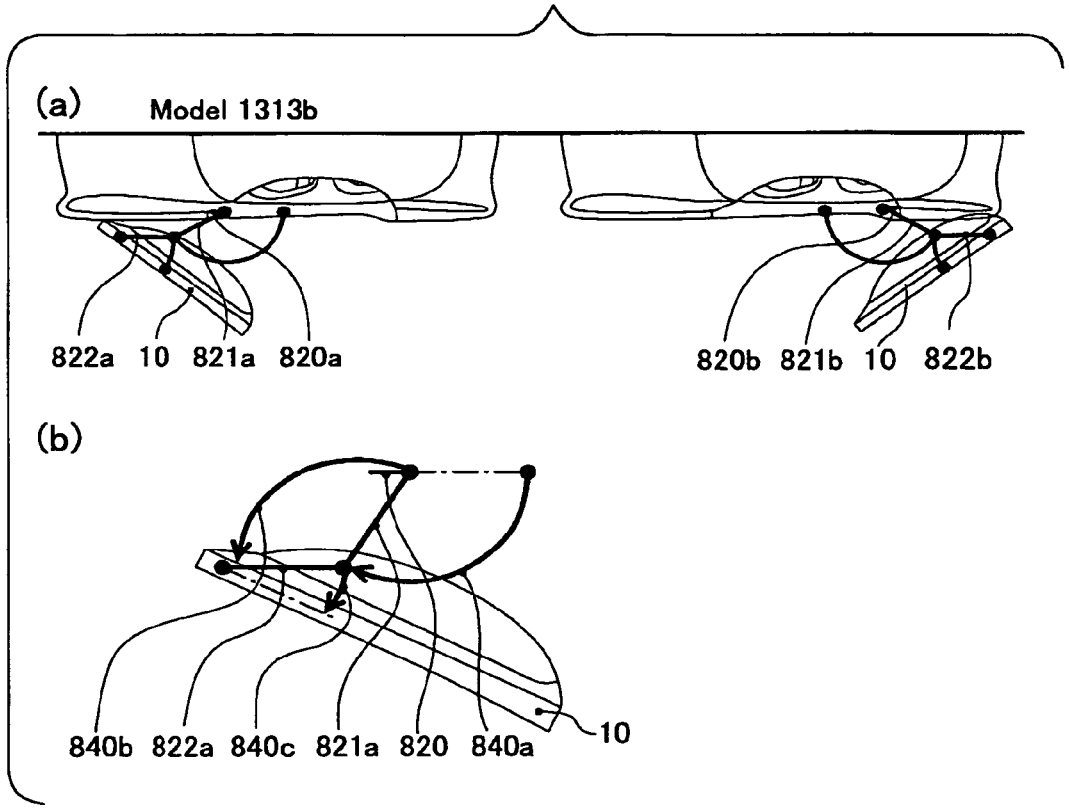
FIG. 22 illustrates movement explanatory diagrams of Model 1313*b*.
Figure 23:
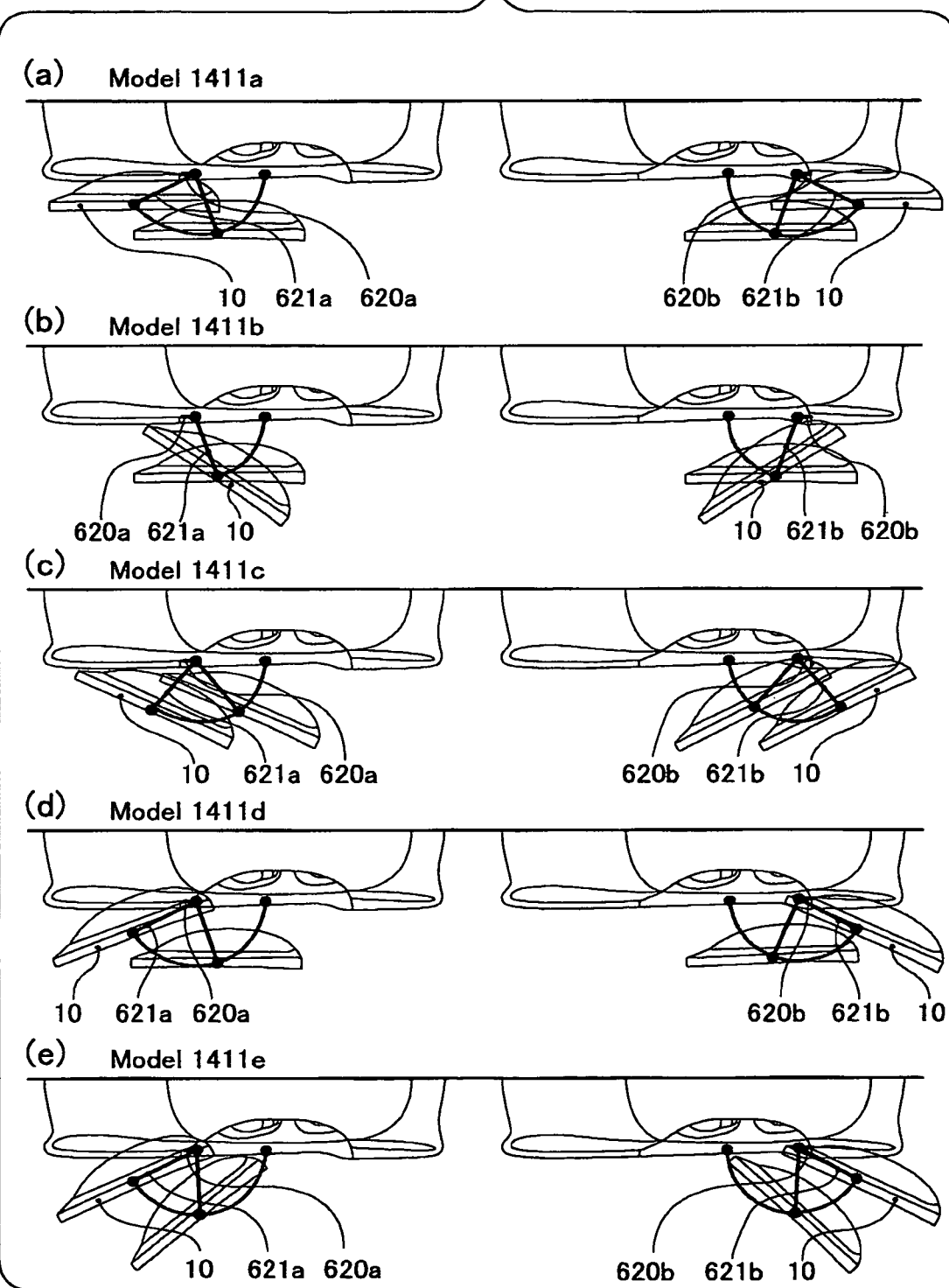
FIG. 23 illustrates movement explanatory diagrams of Models 1411*a*, 1411*b*, 1411*c*, 1411*d* and 1411*e*.
Figure 26:
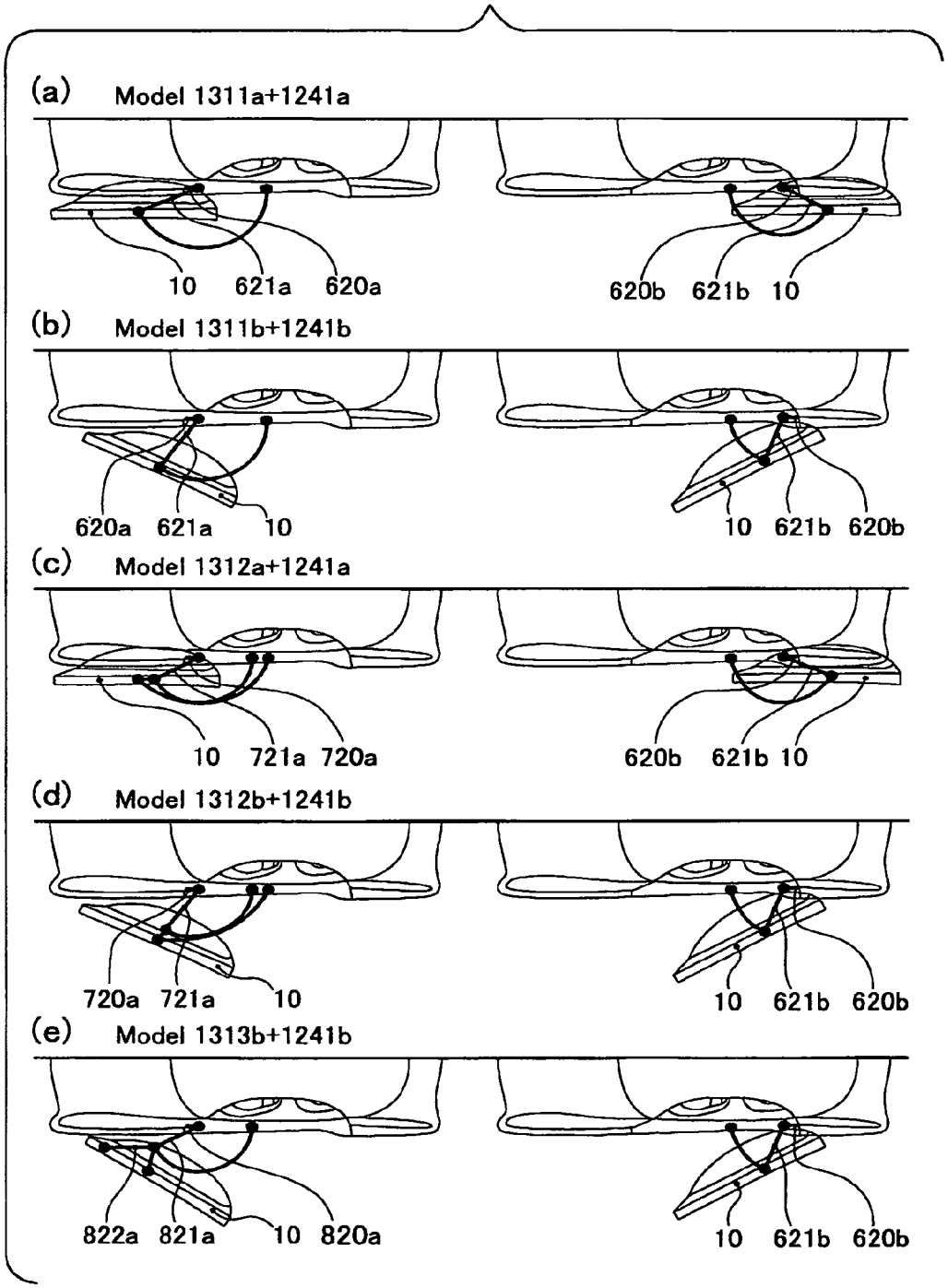
FIG. 26 illustrates movement explanatory diagrams of Models 1311*a*+1241*a*, 1311*b*+1241*b*, 1312*a*+1241*a*, 1312*b*+1241*b* and 1313*b*+1241*b*.
Figure 27:
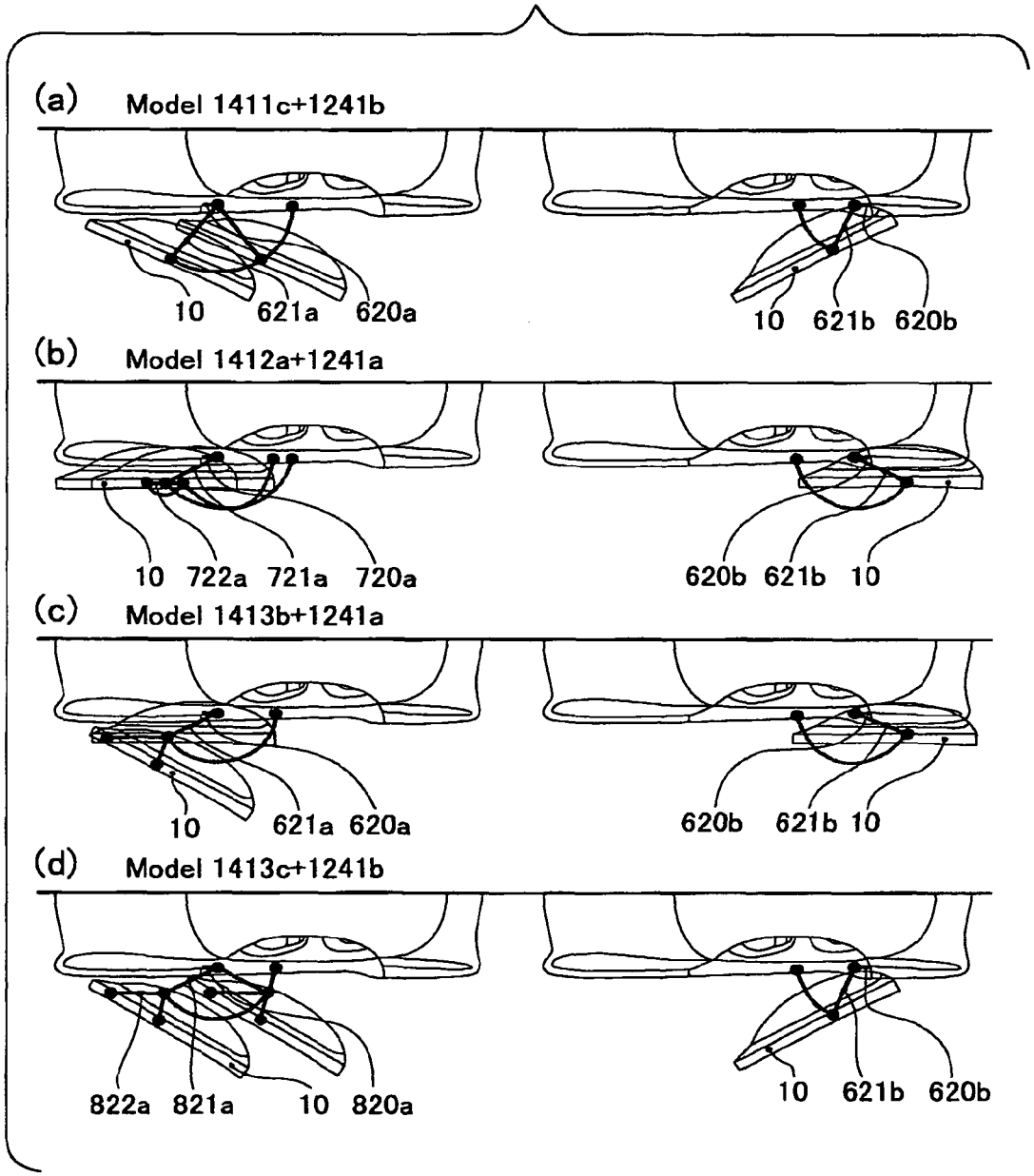
FIG. 27 illustrates movement explanatory diagrams of Models 1411*c*+1241*b*, 1412*a*+1241*a*, 1413*b*+1241*a* and 1413*c*+1241*b*.
Figure 28:
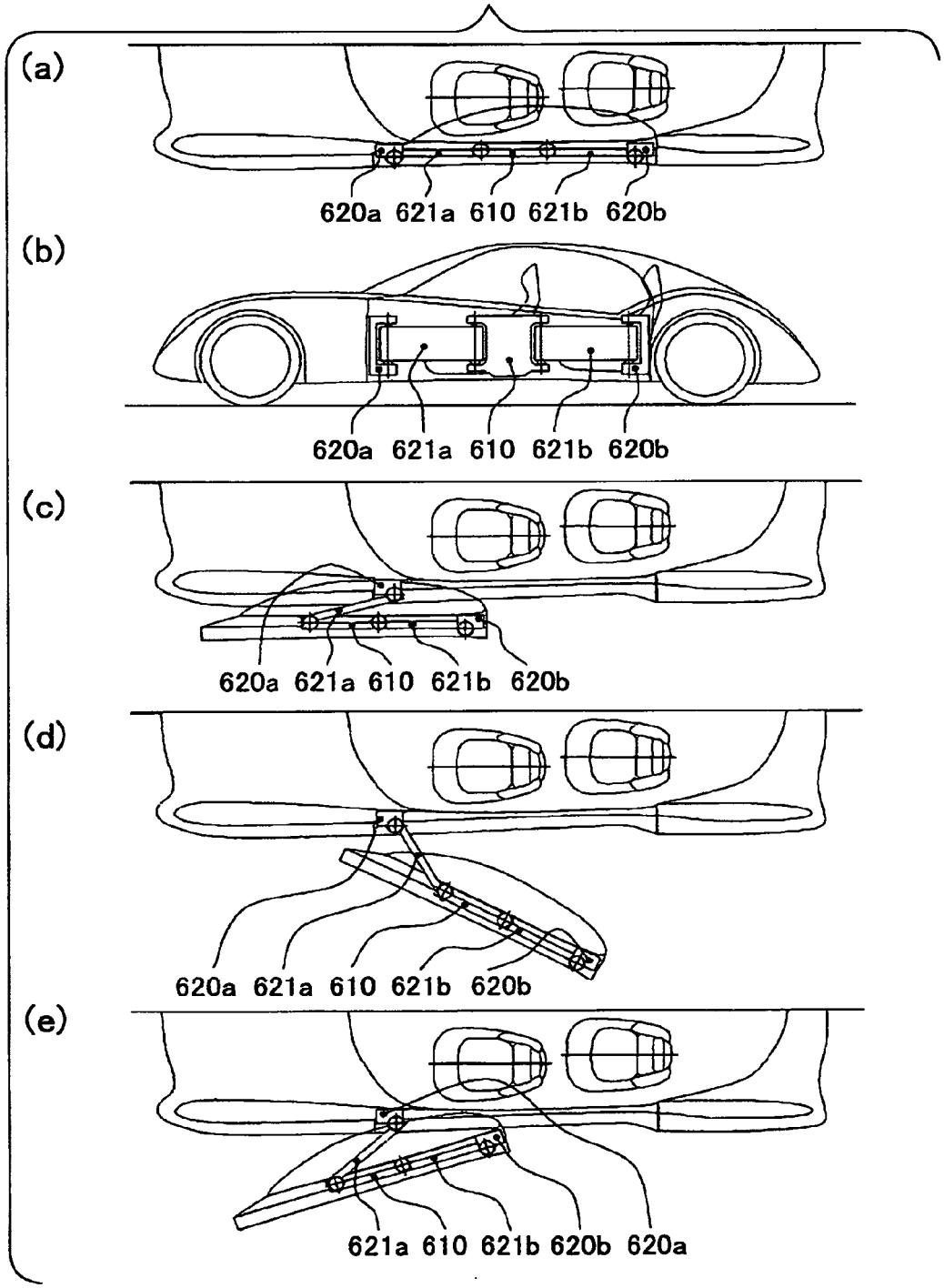
FIG. 28 illustrates schematic diagrams of a four-seat coupe installing Model 1241*a*, 1241*b* or 1241*c*.
Figure 29:
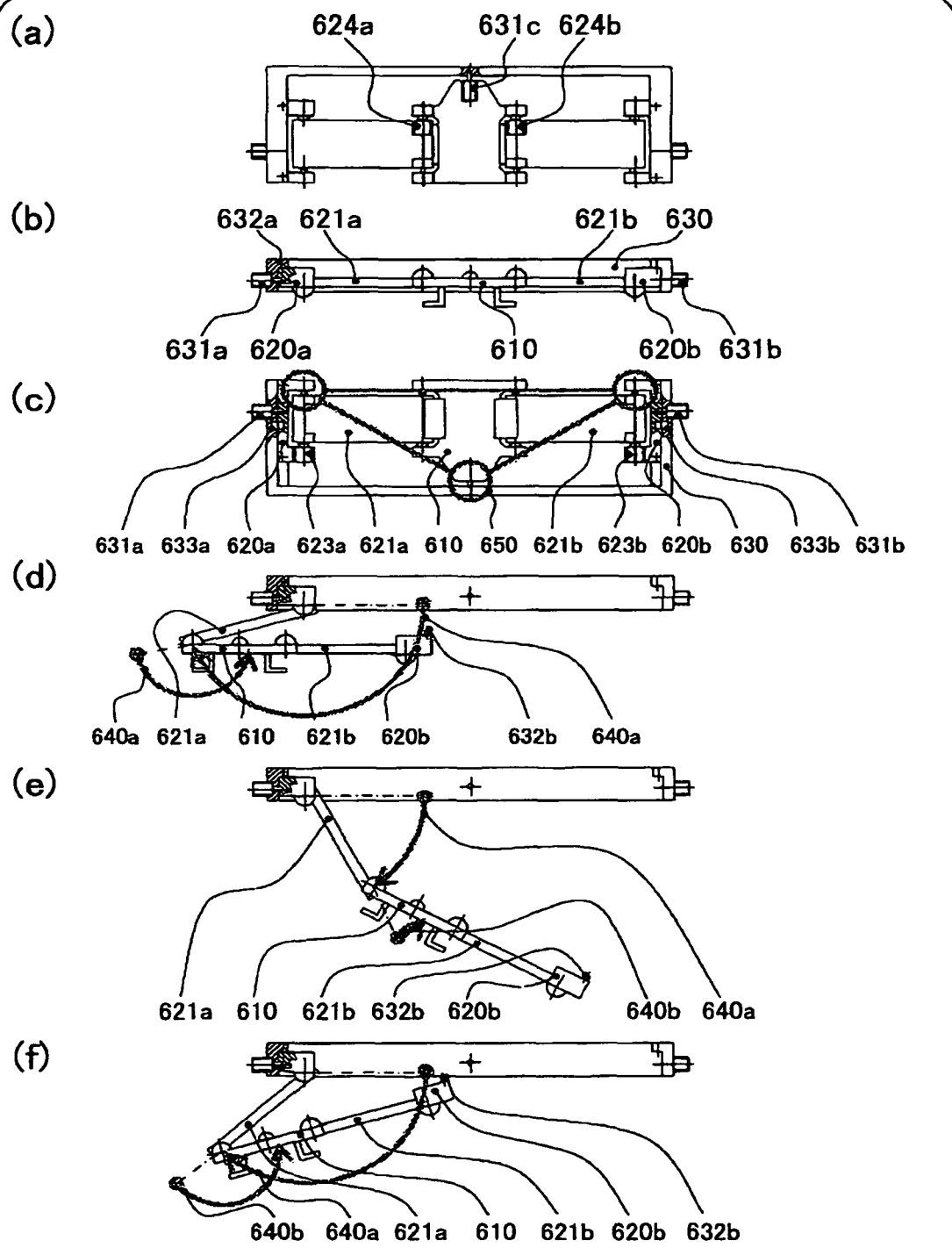
FIG. 29 illustrates specific structural diagrams of a long double-opening door device based on intermediate members, for Models 1241*a*, 1241*b* and 1241*c*.
Figure 30:
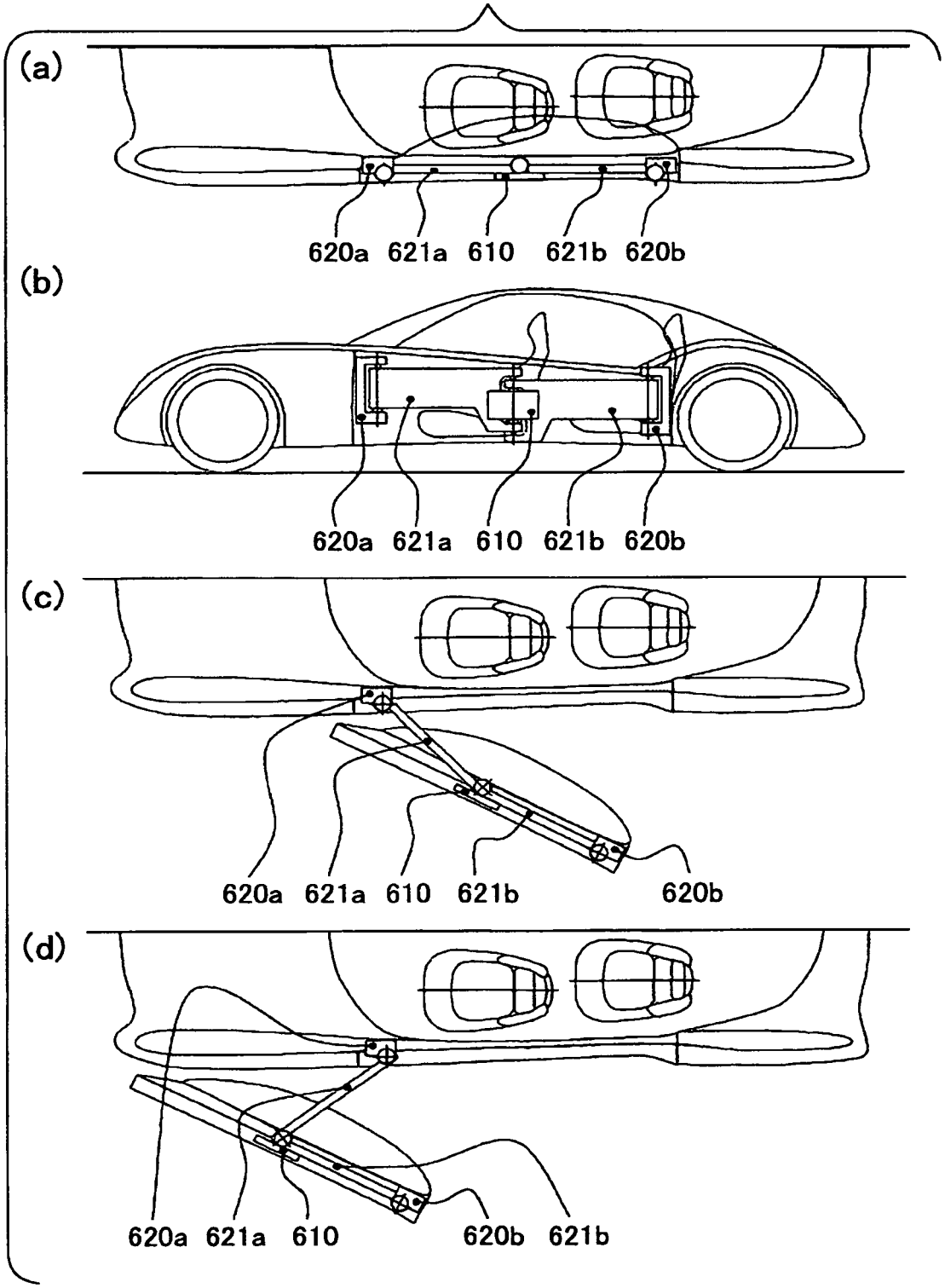
FIG. 30 illustrates schematic diagrams of a four-seat coupe installing Model 1311*b* or 1411*c*.
Figure 31:
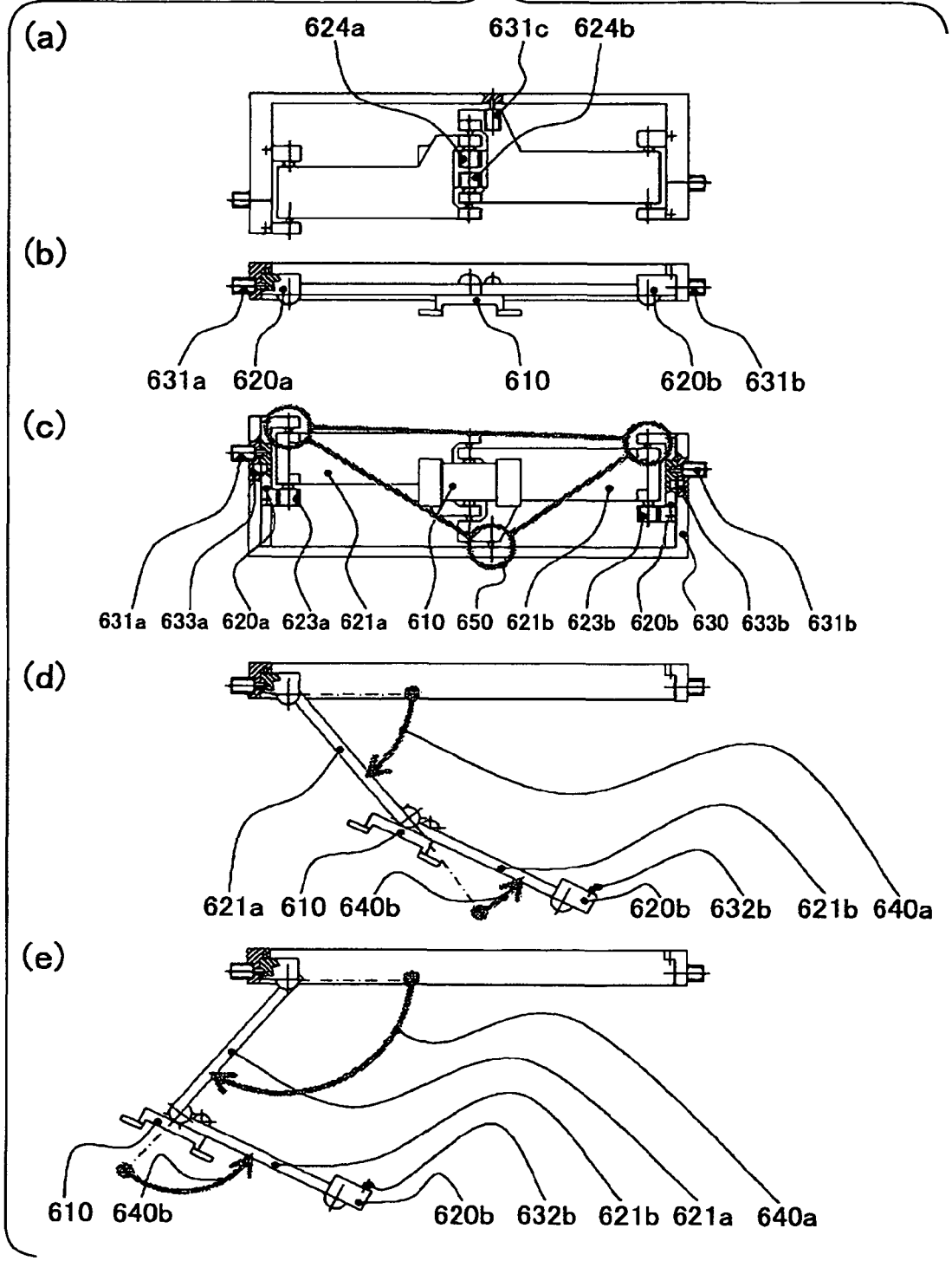
FIG. 31 illustrates specific structural diagrams of a long double-opening door device based on intermediate members, for Models 1311*b* and 1411*c*.
Figure 33:
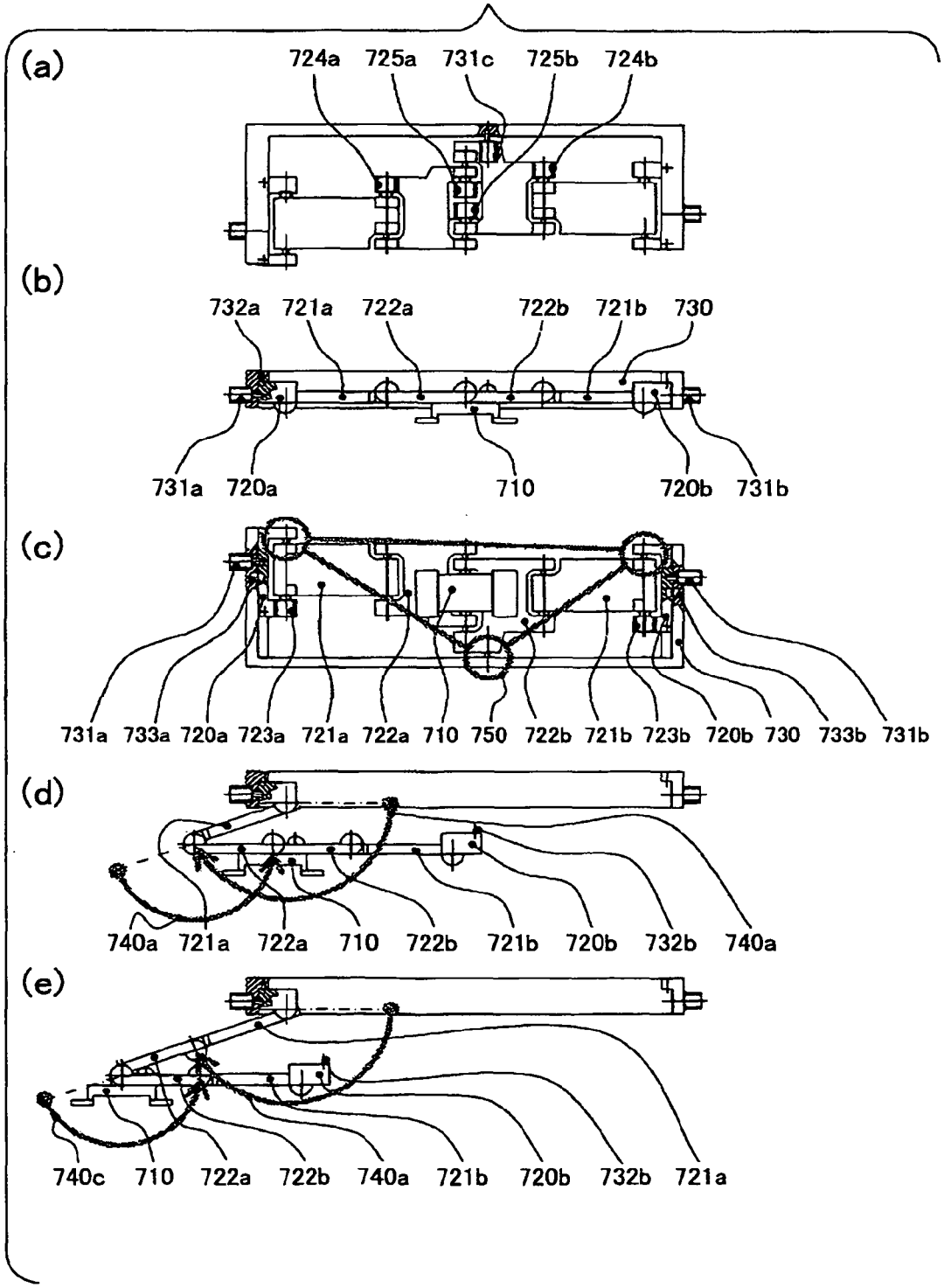
FIG. 33 illustrates specific structural diagrams of a long double-opening door device based on intermediate members, for Models 1312*a* and 1412*a*.
Figure 35:
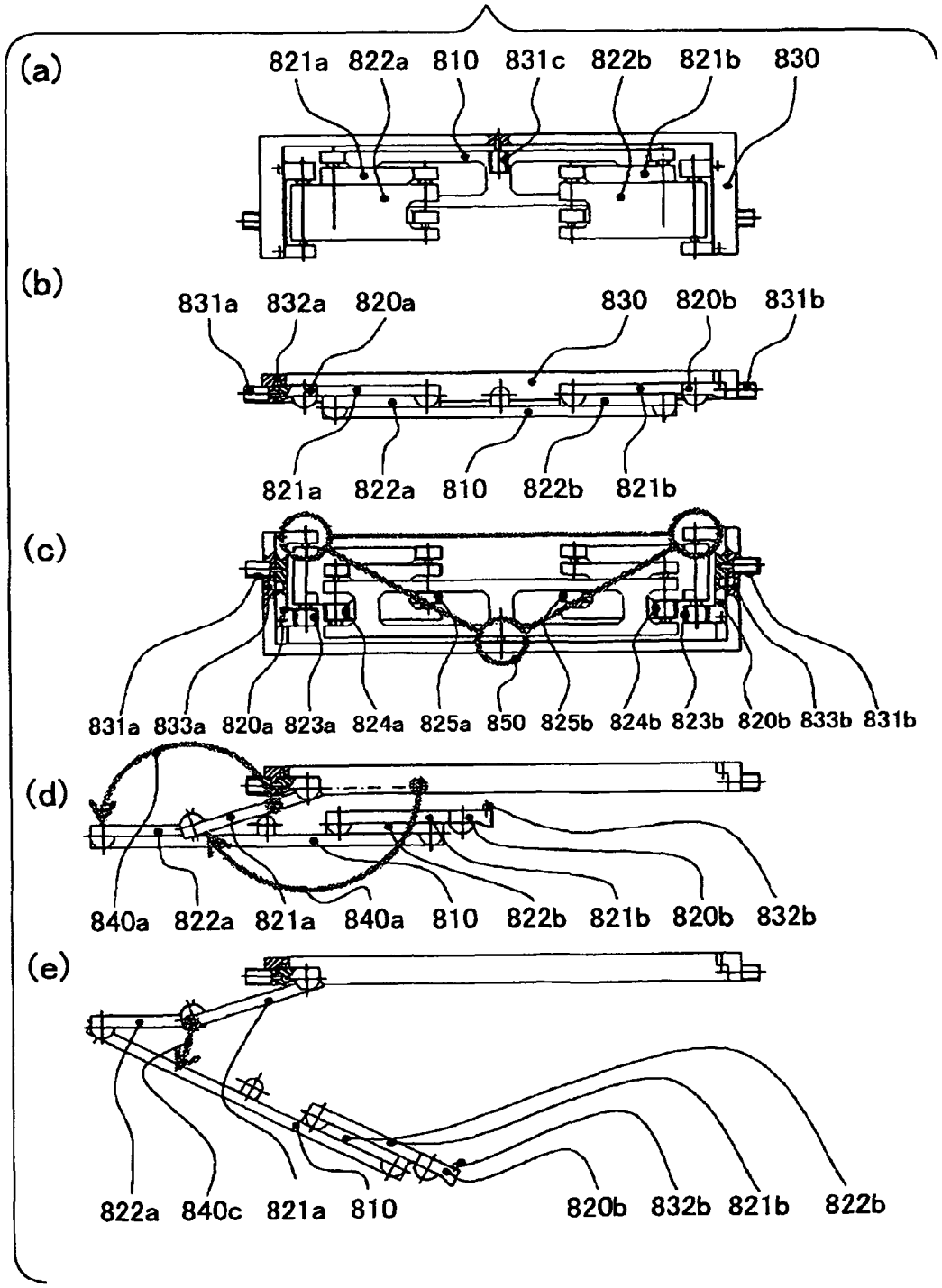
FIG. 35 illustrates specific structural diagrams of a long double-opening door device based on intermediate members, for Models 1313*b* and 1413*b*.
Figure 36:
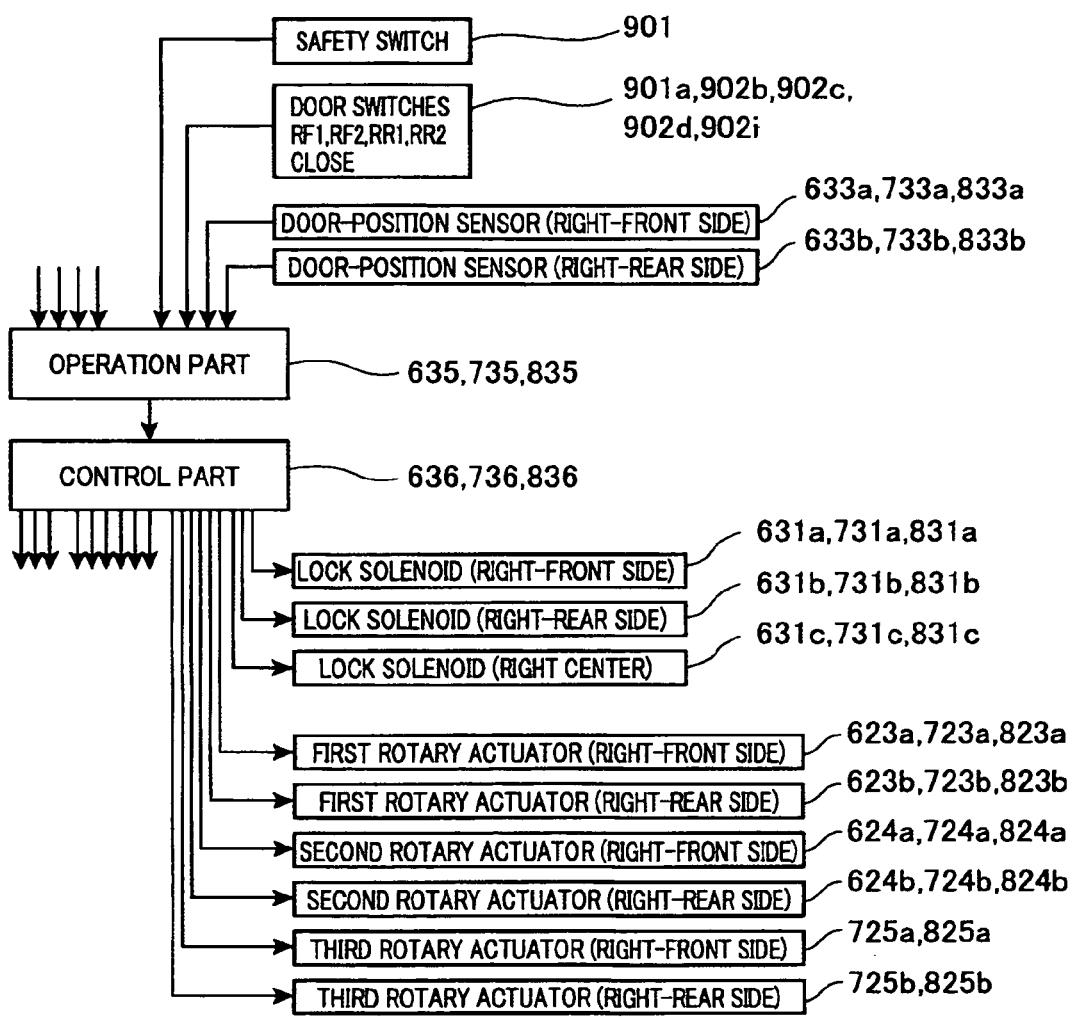
FIG. 36 illustrates a configuration diagram of a motive-power drive control system, for Models 124, 131, 141, 131+124 and 141+124.
Figure 37:
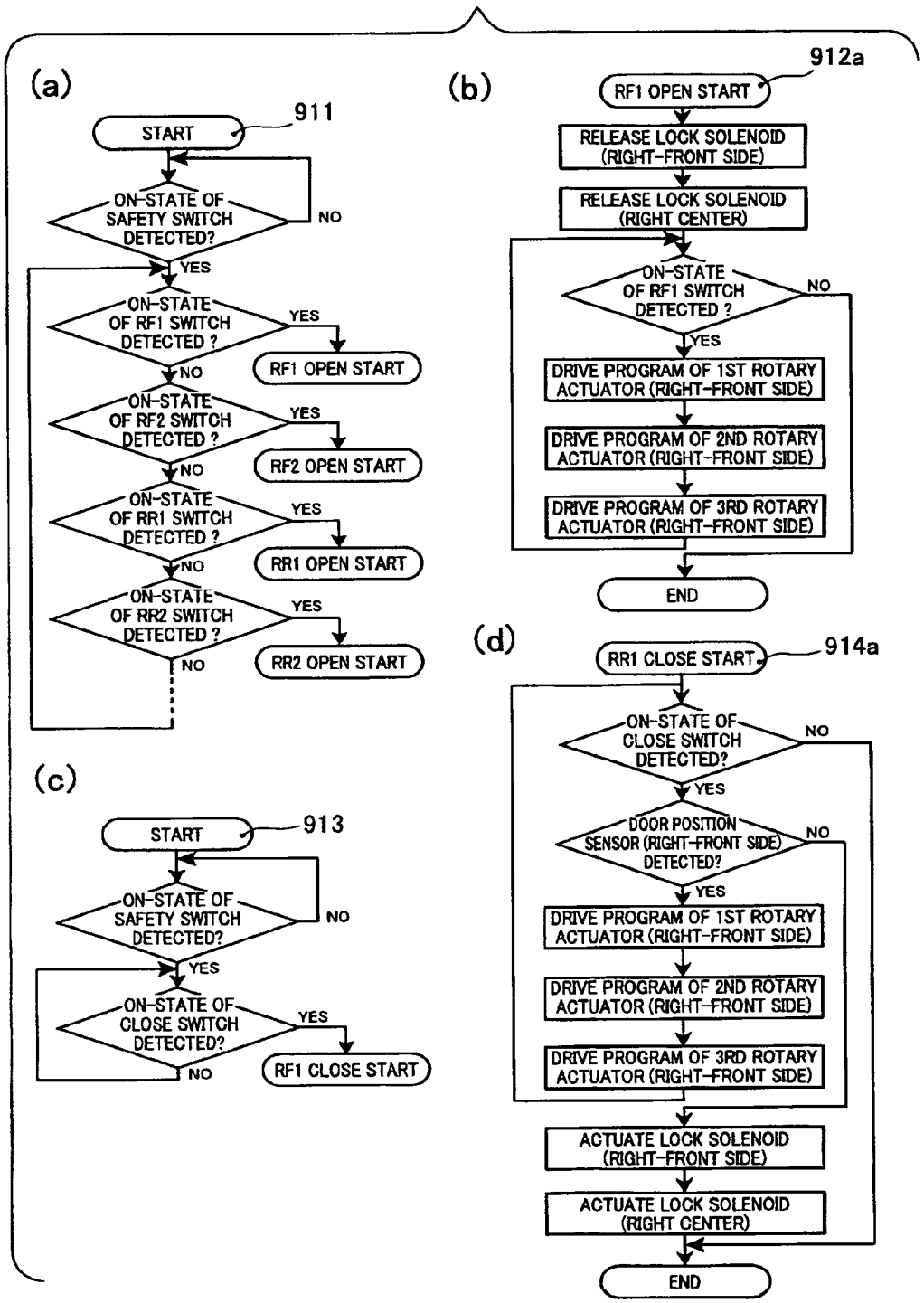
FIG. 37 illustrates flow diagrams for motive-power drive control, for Models 124, 131, 141, 131+124 and 141+124.
Figure 38:
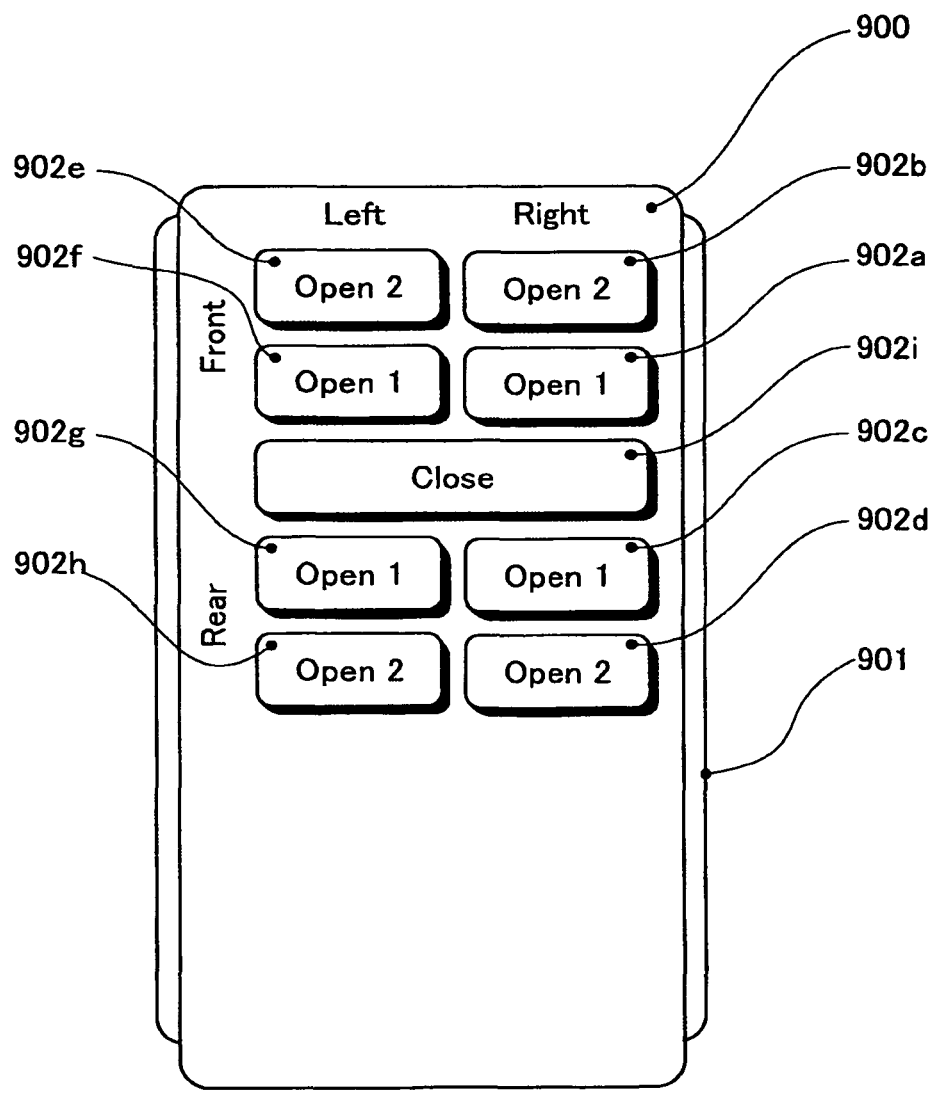
FIG. 38 illustrates an appearance diagram of a remote controller, for Models 124, 131, 141, 131+124 and 141+124.

1 Vehicle body
2 Front seat
3 Rear seat
10 Long double-opening door
110 Door-side bracket (single-hinge mechanism)
120*a* intermediate member (front side, single-hinge mechanism)
120*b* intermediate member (rear side, single-hinge mechanism)
121*a* Hinge (front side, single-hinge mechanism)
121*b* Hinge (rear side, single-hinge mechanism)
122*a* Buffer member (front side, single-hinge mechanism)
122*b* Buffer member (rear side, single-hinge mechanism)
130 Body-side bracket (single-hinge mechanism)
131*a* Lock solenoid (front side, single-hinge mechanism)
131*b* Lock solenoid (rear side, single-hinge mechanism)
131*c* Lock solenoid (center, single-hinge mechanism)
132*a* Door-position sensor (front side, single-hinge mechanism)
132*b* Door-position sensor (rear side, single-hinge mechanism)
133 Operation part (single-hinge mechanism)
134 Control part (single-hinge mechanism)
210 Door-side bracket (multi-joint link mechanism)
220*a* Intermediate member (front side, multi-joint link mechanism)
220*b* Intermediate member (rear side, multi-joint link mechanism)
221*a* First link (front side, multi-joint link mechanism)
221*b* First link (rear side, multi-joint link mechanism)
222*a* Second link (front side, multi-joint link mechanism)
222*b* Second link (rear side, multi-joint link mechanism)
223*a* First rotary actuator (front side, multi-joint link mechanism)
223*b* First rotary actuator (rear side, multi joint link mechanism)
224*a* Second rotary actuator (front side, multi-joint link mechanism)
224*b* Second rotary actuator (rear side, multi-joint link mechanism)
230 Body-side bracket (multi-joint link mechanism)
231*a* Lock solenoid (front side, multi-joint link mechanism)
231*b* Lock solenoid (rear side, multi-joint link mechanism)
231*c* Lock solenoid (center, multi-joint link mechanism)

232*a* Door-position sensor (front side, multi-joint link mechanism)
232*b* Door-position sensor (rear side, multi-joint link mechanism)
233 Operation part (multi-joint link mechanism)
234 Control part (multi-joint link mechanism)
310 Door-side bracket (slide opening/closing mechanism)
311 First rail
312 Second rail
320*a* Intermediate member (front side, slide opening/closing mechanism)
320*b* Intermediate member (rear side, slide opening/closing mechanism)
321*a* First slide actuator (front side)
321*b* First slide actuator (rear side)
322*a* Second slide actuator (front side)
322*b* Second slide actuator (rear side)
323*a* First link (front side, slide opening/closing mechanism)
323*b* First link (rear side, slide opening/closing mechanism)
324*a* Second link (front side, slide opening/closing mechanism)
324*b* Second link (rear side, slide opening/closing mechanism)
325*a* Third link (front side, slide opening/closing mechanism)
325*b* Third link (rear side, slide opening/closing mechanism)
326*a* Connecting link (front side)
326*b* Connecting link (rear side)
327*a* Connecting shaft (front side)
327*b* Connecting shaft (rear side)
328*a* Rotary actuator (front side, slide opening/closing mechanism)
328*b* Rotary actuator (rear side, slide opening/closing mechanism)
330 Body-side bracket (slide opening/closing mechanism)
331*a* Lock solenoid (front side, slide opening/closing mechanism)
331*b* Lock solenoid (rear side, slide opening/closing mechanism)
332*a* Door-position sensor (front side, slide opening/closing mechanism)
332*b* Door-position sensor (rear side, slide opening/closing mechanism)
333 Operation part (slide opening/closing mechanism)
334 Control part (slide opening/closing mechanism)
400 Remote controller
401*a* Door switch (front side)
401*b* Door switch (rear side)
402 Safety switch
410 Remote door key
411 Door switch (remote door key)
500*a* Retractable door handle (front side)
500*b* Retractable door handle (rear side)
501*a* Door handle sensor (front side, single-hinge mechanism, multi-joint link mechanism)
501*b* Door handle sensor (rear side, single-hinge mechanism, multi-joint link mechanism)
502*a* Door handle sensor (front side, slide opening/closing mechanism)
502*b* Door handle sensor (rear side, slide opening/closing mechanism)
503*a* Door handle actuator (front side)
503*b* Door handle actuator (rear side)
510 Opening-direction stress (multi-joint link mechanism)
511 Closing-direction stress (multi-joint link mechanism)
512 Opening-direction input (multi-joint link mechanism)
513 Closing-direction input (multi-joint link mechanism)
515 Opening-direction stress (slide opening/closing mechanism)
516 Closing-direction stress (slide opening/closing mechanism)
517 Opening-direction input (slide opening/closing mechanism)
518 Closing-direction input (slide opening/closing mechanism)
610 Door-side bracket (Models 1241, 1311, 1411, 1311+1241 and 1411+1241)
620*a* Intermediate member (front side) (Models 1241, 1311, 1411, 1311+1241 and 1411+1241)
620*b* Intermediate member (rear side) (Models 1241, 1311, 1411, 1311+1241 and 1411+1241)
621*a* Link (front side) (Models 1241, 1311, 1411, 1311+1241 and 1411+1241)
621*b* Link (rear side) (Models 1241, 1311, 1411, 1311+1241 and 1411+1241)
623*a* First rotary actuator (front side) (Models 1241, 1311, 1411, 1311+1241 and 1411+1241)
623*b* First rotary actuator (rear side) (Models 1241, 1311, 1411, 1311+1241 and 1411+1241)
624*a* Second rotary actuator (front side) (Models 1241, 1311, 1411, 1311+1241 and 1411+1241)
624*b* Second rotary actuator (rear side) (Models 1241, 1311, 1411, 1311+1241 and 1411+1241)
630 Body-side bracket (Models 1241, 1311, 1411, 1311+1241 and 1411+1241)
631*a* Lock solenoid (front side) (Models 1241, 1311, 1411, 1311+1241 and 1411+1241)
631*b* Lock solenoid (rear side) (Models 1241, 1311, 1411, 1311+1241 and 1411+1241)
631*c* Lock solenoid (center) (Models 1241, 1311, 1411, 1311+1241 and 1411+1241)
632*a* Lock pin (front side) (Models 1241, 1311, 1411, 1311+1241 and 1411+1241)
632*b* Lock pin (rear side) (Models 1241, 1311, 1411, 1311+1241 and 1411+1241)
633*a* Door-position sensor (front side) (Models 1241, 1311, 1411, 1311+1241 and 1411+1241)
633*b* Door-position sensor (rear side) (Models 1241, 1311, 1411, 1311+1241 and 1411+1241)
634 Operation part (Models 1241, 1311, 1411, 1311+1241 and 1411+1241)
635 Control part (Models 1241, 1311, 1411, 1311+1241 and 1411+1241)
640*a* θ1 (Models 1241, 1311, 1411, 1311+1241 and 1411+1241)
640*b* θ2 (Models 1241, 1311, 1411, 1311+1241 and 1411+1241)
650 Truss structure (Models 1241, 1311, 1411, 1311+1241 and 1411+1241)
710 Door-side bracket (Models 1312, 1412, 1312+1241 and 1412+1241)
720*a* Intermediate member (front side) (Models 1312, 1412, 1312+1241 and 1412+1241)
720*b* Intermediate member (rear side) (Models 1312, 1412, 1312+1241 and 1412+1241)
721*a* First link (front side) (Models 1312, 1412, 1312+1241 and 1412+1241)
721*b* First link (rear side) (Models 1312, 1412, 1312+1241 and 1412+1241)
722*a* Second link (front side) (Models 1312, 1412, 1312+1241 and 1412+1241)

722b Second link (rear side) (Models 1312, 1412, 1312+1241 and 1412+1241)
723a First rotary actuator (front side) (Models 1312, 1412, 1312+1241 and 1412+1241)
723b First rotary actuator (rear side) (Models 1312, 1412, 1312+1241 and 1412+1241)
724a Second rotary actuator (front side) (Models 1312, 1412, 1312+1241 and 1412+1241)
724b Second rotary actuator (rear side) (Models 1312, 1412, 1312+1241 and 1412+1241)
725a Third rotary actuator (front side) (Models 1312, 1412, 1312+1241 and 1412+1241)
725b Third rotary actuator (rear side) (Models 1312, 1412, 1312+1241 and 1412+1241)
730 Body-side bracket (Models 1312, 1412, 1312+1241 and 1412+1241)
731a Lock solenoid (front side) (Models 1312, 1412, 1312+1241 and 1412+1241)
731b Lock solenoid (rear side) (Models 1312, 1412, 1312+1241 and 1412+1241)
731c Lock solenoid (center) (Models 1312, 1412, 1312+1241 and 1412+1241)
732a Lock pin (front side) (Models 1312, 1412, 1312+1241 and 1412+1241)
732b Lock pin (rear side) (Models 1312, 1412, 1312+1241 and 1412+1241)
733a Door-position sensor (Models 1312, 1412, 1312+1241 and 1412+1241)
733b Door-position sensor (rear side) (Models 1312, 1412, 1312+1241 and 1412+1241)
734 Operation part (Models 1312, 1412, 1312+1241 and 1412+1241)
735 Control part (Models 1312, 1412, 1312+1241 and 1412+1241)
740a $\theta 1$ (Models 1312, 1412, 1312+1241 and 1412+1241)
740b $\theta 2$ (Models 1312, 1412, 1312+1241 and 1412+1241)
740c $\theta 3$ (Models 1312, 1412, 1312+1241 and 1412+1241)
750 Truss structure (Models 1312, 1412, 1312+1241 and 1412+1241)
810 Door-side bracket (Models 1313, 1413, 1313+1241 and 1413+1241)
820a Intermediate member (front side) (Models 1313, 1413, 1313+1241 and 1413+1241)
820b Intermediate member (rear side) (Models 1313, 1413, 1313+1241 and 1413+1241)
821a First link (front side) (Models 1313, 1413, 1313+1241 and 1413+1241)
821b First link (rear side) (Models 1313, 1413, 1313+1241 and 1413+1241)
822a Second link (front side) (Models 1313, 1413, 1313+1241 and 1413+1241)
822b Second link (rear side) (Models 1313, 1413, 1313+1241 and 1413+1241)
823a First rotary actuator (front side) (Models 1313, 1413, 1313+1241 and 1413+1241)
823b First rotary actuator (rear side) (Models 1313, 1413, 1313+1241 and 1413+1241)
824a Second rotary actuator (front side) (Models 1313, 1413, 1313+1241 and 1413+1241)
824b Second rotary actuator (rear side) (Models 1313, 1413, 1313+1241 and 1413+1241)
825a Third rotary actuator (front side) (Models 1313, 1413, 1313+1241 and 1413+1241)
825b Third rotary actuator (rear side) (Models 1313, 1413, 1313+1241 and 1413+1241)
830 Body-side bracket (front side) (Models 1313, 1413, 1313+1241 and 1413+1241)
831a Lock solenoid (front side) (Models 1313, 1413, 1313+1241 and 1413+1241)
831b Lock solenoid (rear side) (Models 1313, 1413, 1313+1241 and 1413+1241)
831c Lock solenoid (center) (Models 1313, 1413, 1313+1241 and 1413+1241)
832a Lock pin (front side) (Models 1313, 1413, 1313+1241 and 1413+1241)
832b Lock pin (rear side) (Models 1313, 1413, 1313+1241 and 1413+1241)
833a Door-position sensor (front side) (Models 1313, 1413, 1313+1241 and 1413+1241)
833b Door-position sensor (rear side) (Models 1313, 1413, 1313+1241 and 1413+1241)
834 Operation part (Models 1313, 1413, 1313+1241 and 1413+1241)
835 Control part (Models 1313, 1413, 1313+1241 and 1413+1241)
840a $\theta 1$ (Models 1313, 1413, 1313+1241 and 1413+1241)
840b $\theta 2$ (Models 1313, 1413, 1313+1241 and 1413+1241)
840c $\theta 3$ (Models 1313, 1413, 1313+1241 and 1413+1241)
850 Truss structure (Models 1313, 1413, 1313+1241 and 1413+1241)
900 Remote controller (Models 124, 131, 141, 131+124 and 141+124)
901 Safety switch (Models 124, 131, 141, 131+124 and 141+124)
902 Door switches (Models 124, 131, 141, 131+124 and 141+124)
902a RF1 switch (Models 124, 131, 141, 131+124 and 141+124)
902b RF2 switch (Models 124, 131, 141, 131+124 and 141+124)
902c RR1 switch (Models 124, 131, 141, 131+124 and 141+124)
902d RR2 switch (Models 124, 131, 141, 131+124 and 141+124)
902e LF1 switch (Models 124, 131, 141, 131+124 and 141+124)
902f LF2 switch (Models 124, 131, 141, 131+124 and 141+124)
902g LR1 switch (Models 124, 131, 141, 131+124 and 141+124)
902h LR2 switch (Models 124, 131, 141, 131+124 and 141+124)
902i CLOSE switch (Models 124, 131, 141, 131+124 and 141+124)
911 Open switch detection flow 921a RR1 OPEN door control flow
913 Close switch detection flow 914a RR1 CLOSE door control flow

What is claimed is:
1. A door device for vehicles comprising:
a single door arranged at an opening formed on a side of a vehicle body of a vehicle in a longitudinal direction of the vehicle, the opening ranging from front seats to rear seats arranged in the vehicle, the front and rear seats being arranged respectively in two front and rear rows in a the vehicle body of the vehicle;
two intermediate members provided between each of a front end portion and a rear end portion of the door in the longitudinal direction and the vehicle body;
two first connecting mechanisms that connect the door to the two intermediate members such that the door is allowed to perform at least one of rotation and parallel translation from and to the vehicle body; and two second connecting mechanisms that detachably connects the two intermediate members to the vehicle body; and a controller that, when one of the two intermediate members acts as an intermediate member assigned to a supporting side of the door being opened and the other of the two intermediate members act as an intermediate member assigned to an opening side of the door being opened, controls:

the opening-side second connecting mechanism to release a connection thereof to separate the opening-side intermediate member from the vehicle body, the supporting-side second connecting mechanism to fix the supporting-side intermediate member to the vehicle body, the supporting-side first connecting mechanism to open the door which becomes integral with both the opening-side first connecting mechanism and the opening-side intermediate member, and the supporting-side first and second connecting mechanisms to enable the supporting-side first and second connecting mechanisms and the supporting-side intermediate member to act as one unit to sustain a special positional relationship between the door and the vehicle body against a stress applied to the door.

2. The door device according to claim 1, wherein each of the two first connecting mechanisms includes a motion enabling mechanism configured to sustain the door against the stress and enable the door to perform at least one of a motion in a rotational direction of the door being opened and a motion in the longitudinal direction of the vehicle body, and the controller is configured to control the motion enabling mechanisms of both the two first connecting mechanism and the two second connecting mechanisms to enable the door to perform at least one of the motions in the rotational direction and the longitudinal direction.

3. The door device according to claim 1, wherein each of the two first connecting mechanisms comprises a hinge member that connects the door and a corresponding one of the two intermediate members, and a buffer member that connects the door and a corresponding one of the two intermediate members to sustain a spatial positional relationship between the door and the corresponding intermediate member.

4. The door device according to claim 1, wherein each of the two first connecting mechanisms comprises a first link and a second link whose lengths are different from each other, each of the first and second links have two ends one of which is connected to the door and the other of which is connected to a corresponding one of the two intermediate members.

5. The door device according to claim 2, wherein each of the first connecting mechanisms comprise a rail portion provided at the door, and a clamp portion provided at a corresponding one of the two intermediate members for engagement with the rail portion and formed to be slidably movable in the longitudinal direction of the vehicle.

6. The door device according to claim 2, wherein each of the two first connecting mechanisms comprises a link having two ends one of which is rotatably connected to a corresponding one of the two intermediate members and the other of which is rotatably connected to the door; and the controller is configured to sequentially enable both rotation of the link relative to a corresponding one of the two intermediate members and rotation of the door relative to the link.

7. The door device according to claim 2, wherein each of the two first connecting mechanisms comprises first and second links each having two ends, one of the two ends of the first link being mutually connected to one of the two ends of the second link, the other of the two ends of the first link being connected to a corresponding one of the two intermediate members, the other of the two ends of the second link being connected to the door; and the controller is configured to sequentially enable rotation of the first link relative to a corresponding one of the two intermediate members, rotation of the second link relative to the first link, and rotation of the door relative to the second link.

8. The door device according to claim 1, wherein one of the two first connecting mechanisms is configured to enable the door to have a closed state a first opened state in which the door is opened to provide the opening with an entry/exit space to/from either the front seats or the rear seats; and the other of the two first connecting mechanisms is configured to enable the door to have the closed state and a second opened state in which the door is opened to provide the opening with an entry/exit space to/from both the front and rear seats.

9. The door device according to claim 1, wherein each of the two first connecting mechanisms is configured to enable the door to have a closed state and an opened state in which the door is opened to provide the opening with an entry/exit space to/from both the front and rear seats.

10. The door device according to claim 2, wherein one of the two first connecting mechanisms is configured to enable the door to have a closed state and a first opened state in which the door is opened to provide the opening with an entry/exit space to/from either the front seats or the rear seats; and the other of the two first connecting mechanisms is configured to enable the door to have the closed state, the first opened state, and a second opened state in which the door is opened to provide the opening with an entry/exit space to/from both the front and rear seats front-seat occupants and rear-seat occupants;

the controller is configured to receive a command indicative of opening/closing the door and control the operations of the two first connecting mechanisms and the two second connecting mechanisms to selectively obtain the closed state, the first opened state, and the second opened state.

11. The door device according to claim 2, wherein each of the two first connecting mechanisms is configured to enable the door to have a closes state, a first opened state in which the door is opened to provide the opening with an entry/exit space to/from either the front seats or the rear seats, and a second opened state in which the door is opened to provide the opening with an entry/exit space to/from both the front and rear seats; and the controller is configured to receive a command indicative of opening/closing the door and control the operations of the two first connecting mechanisms and the two second connecting mechanisms to selectively obtain the closed state, the first opened state, and the second opened state.

* * * * *